US009699383B2

(12) United States Patent
Matsubara et al.

(10) Patent No.: US 9,699,383 B2
(45) Date of Patent: Jul. 4, 2017

(54) IMAGE PROCESSING APPARATUS HAVING A FIRST DISPLAY UNIT DISPLAYING A COURSE SELECTION SCREEN AND A SECOND DISPLAY UNIT DISPLAYING AN ADJUSTMENT SCREEN AND AN EDITING SCREEN

(71) Applicant: FURYU CORPORATION, Tokyo (JP)

(72) Inventors: Natsumi Matsubara, Kyoto (JP); Wakako Sakahara, Kyoto (JP)

(73) Assignee: FURYU CORPORATION, Tokyo (JP)

( * ) Notice: Subject to any disclaimer, the term of this patent is extended or adjusted under 35 U.S.C. 154(b) by 0 days.

(21) Appl. No.: 14/573,528

(22) Filed: Dec. 17, 2014

(65) Prior Publication Data

US 2015/0304554 A1 Oct. 22, 2015

(30) Foreign Application Priority Data

Dec. 19, 2013 (JP) ................................ 2013-262921

(51) Int. Cl.

*H04N 5/222* (2006.01)
*G03B 15/00* (2006.01)
*H04N 1/387* (2006.01)
*H04N 5/232* (2006.01)
*G03B 17/53* (2006.01)

(52) U.S. Cl.

CPC ......... *H04N 5/23293* (2013.01); *G03B 17/53* (2013.01); *H04N 5/23222* (2013.01)

(58) Field of Classification Search

CPC .. G03B 17/53; G03B 15/00; G03B 2217/241; H04N 1/00289; H04N 1/00161; H04N 1/00167; H04N 1/00188; H04N 1/387

USPC ............ 348/135, 161, 207.1, 207.11, 207.2; 396/2; 392/2

See application file for complete search history.

(56) References Cited

U.S. PATENT DOCUMENTS 6,148,148 A * 11/2000 Wain ...................... G03B 17/53 348/61
2002/0030834 A1* 3/2002 Watanabe ............ G06F 3/0481 358/1.9

(Continued)

FOREIGN PATENT DOCUMENTS

JP 2003348317 A 12/2003
JP 2005006342 A 1/2005

(Continued)

*Primary Examiner* — Chia-Wei A Chen
(74) *Attorney, Agent, or Firm* — Capitol City TechLaw

(57) ABSTRACT

An image processing apparatus having a photographing space and an image processing space, comprising a first display unit disposed in the photographing space that displays a course selection screen, a shooting unit that acquires shot images of a user as an object, a second display unit disposed in the image processing space, the second display displaying an adjustment screen for adjusting an identification photograph image which is any one shot image to a user having selected a first course and finished shooting and displaying an editing screen for editing the shot images without displaying the adjustment screen to a user having selected a second course and finished shooting, an adjusting unit that adjusts the identification photograph image according to a user operation to the adjusting screen, and an editing unit that edits the shot images to creates edited images according to a user operation to the editing screen.

18 Claims, 67 Drawing Sheets

(56) References Cited

U.S. PATENT DOCUMENTS

2002/0093568 A1* 7/2002 Chumbley ............. G03B 17/53 348/207.99
2004/0028397 A1* 2/2004 Maekawa ............... G07F 17/26 396/2
2004/0081440 A1* 4/2004 Miwa ..................... G03B 15/00 396/2
2004/0114193 A1* 6/2004 Inage .................... G06T 11/001 358/302
2004/0120008 A1* 6/2004 Morgan .................. G07F 17/26 358/1.18
2004/0179233 A1* 9/2004 Vallomy ................ G03B 17/53 358/1.15
2007/0103729 A1* 5/2007 Yoda .................. H04N 1/00289 358/1.18
2007/0136208 A1* 6/2007 Hamashima ............... B41J 3/44 705/62
2008/0052090 A1* 2/2008 Heinemann ............ G03B 17/53 705/16
2008/0228866 A1* 9/2008 Minatogawa ...... H04N 1/00132 709/203
2009/0091770 A1* 4/2009 Kano ................. H04N 1/00132 358/1.1
2010/0008657 A1* 1/2010 Gassman ............... G03B 15/00 396/2
2010/0188707 A1* 7/2010 Gassman ............... G03B 15/00 358/1.18
2010/0296801 A1* 11/2010 Lane ...................... G03B 17/53 396/2
2011/0234779 A1* 9/2011 Weisberg ............... G03B 17/53 348/61
2013/0188063 A1* 7/2013 Cameron ............... H04N 5/272 348/207.1
2014/0029022 A1* 1/2014 Johnson .................. G06T 11/60 358/1.2
2014/0279192 A1* 9/2014 Selby ................. G06Q 30/0631 705/26.7

FOREIGN PATENT DOCUMENTS

JP 2005111945 A 4/2005
JP 2013038459 A 2/2013

* cited by examiner

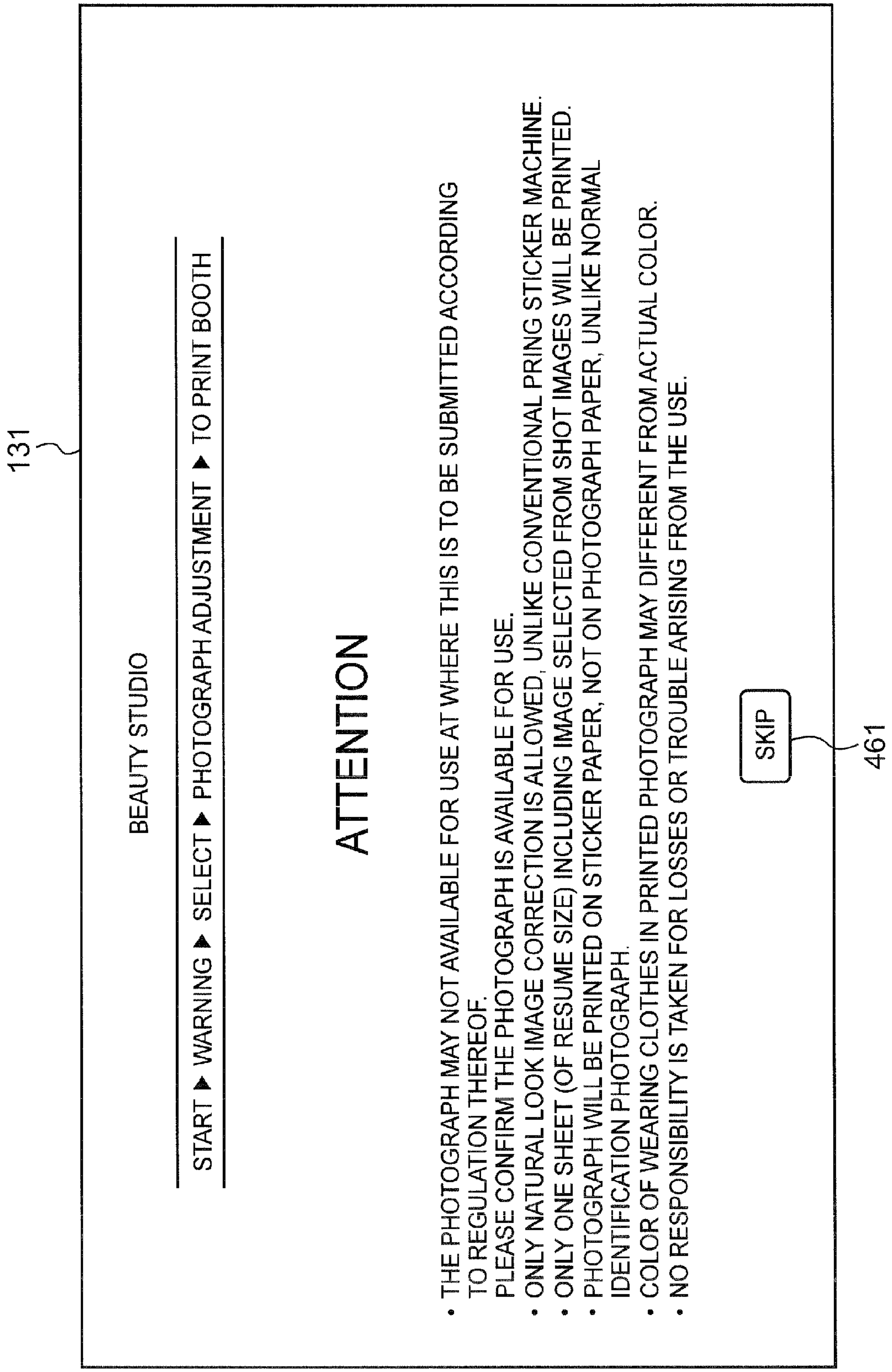

Fig. 29

BEAUTY STUDIO 131

START ▲ WARNING ▲ SELECT ▲ PHOTOGRAPH ADJUSTMENT ▲ TO PRINT BOOTH

ATTENTION

- THE PHOTOGRAPH MAY NOT AVAILABLE FOR USE AT WHERE THIS IS TO BE SUBMITTED ACCORDING TO REGULATION THEREOF.
PLEASE CONFIRM THE PHOTOGRAPH IS AVAILABLE FOR USE.
- ONLY NATURAL LOOK IMAGE CORRECTION IS ALLOWED, UNLIKE CONVENTIONAL PRING STICKER MACHINE.
- ONLY ONE SHEET (OF RESUME SIZE) INCLUDING IMAGE SELECTED FROM SHOT IMAGES WILL BE PRINTED.
- PHOTOGRAPH WILL BE PRINTED ON STICKER PAPER, NOT ON PHOTOGRAPH PAPER, UNLIKE NORMAL IDENTIFICATION PHOTOGRAPH.
- COLOR OF WEARING CLOTHES IN PRINTED PHOTOGRAPH MAY DIFFERENT FROM ACTUAL COLOR.
- NO RESPONSIBILITY IS TAKEN FOR LOSSES OR TROUBLE ARISING FROM THE USE.

SKIP 461

*Fig.36*

| MODE | SKIN BRIGHTNESS | SKIN TYPE | EYE IMPRESSION | HAIR COLOR |
|---|---|---|---|---|
| CLEAN | RECOMMENDED (NATURAL) | RECOMMENDED (NATURAL) | TENDER | DARK |
| HEALTHY | HEALTHY | MATTE | RECOMMENDED (NATURAL) | RECOMMENDED (NATURAL) |
| GORGEOUS | BRIGHT | SOFT | SHARP | BRIGHT |

131

IMAGE PROCESSING APPARATUS HAVING A FIRST DISPLAY UNIT DISPLAYING A COURSE SELECTION SCREEN AND A SECOND DISPLAY UNIT DISPLAYING AN ADJUSTMENT SCREEN AND AN EDITING SCREEN

BACKGROUND OF THE INVENTION

1. Technical Field

The present disclosure relates to an image processing apparatus and an image processing method and, more particularly, to an image processing apparatus and an image processing method that enable performing of a series of operations including shooting to acquire an image which can be used as an identification photograph, and adjusting the image, while moving between spaces.

2. Related Art

A box-type identification photograph apparatus is often used for making an identification photograph which is to be attached to a resume, or the like.

A user enters a booth of the identification photograph apparatus installed in a train station, etc., sits on a chair put in the booth, selects a purpose of use, a size, and the like following a guidance on a screen, then performs shooting, and so on. After adjusting the image quality and the like of the shot image, the user instructs to start the printing, and then obtains photographs which are printed on a gloss paper (for example, See Patent Document 1 (JP 2013-038459 A)).

SUMMARY OF THE INVENTION

The present disclosure provides an image processing apparatus capable of causing a user to perform a series of operations, including shooting to acquire an image which can be used as an identification photograph, and adjusting the image.

An image processing apparatus according to one aspect of the present invention is an image processing apparatus having a photographing space and an image processing space formed therein. In the photographing space, a shooting is performed. In the image processing space, image processing of a shot image, which is acquired by the shooting in the photographing space, is performed. The image processing apparatus includes: a first display unit disposed in the photographing space, the first display unit displaying a course selection screen used for selecting either one of a first course for creating one type of identification photograph image (image for an identification photograph) and a second course for creating multiple types of edited images; a shooting unit that performs a plurality of shootings of a user as an object (object to be shot) to acquire a plurality of shot images; a second display unit disposed in the image processing space, the second display unit displaying an adjustment screen used for adjusting the identification photograph image using any one shot image as the identification photograph image, to the user who has selected the first course and finished the shooting, and displaying an editing screen used for editing the plurality of shot images without displaying the adjustment screen, to the user who has selected the second course and finished the shooting; an adjusting unit that adjusts the identification photograph image according to an operation to the adjustment screen by the user; and an editing unit that edits the shot images to create the edited images according to an operation to the editing screen by the user.

BRIEF DESCRIPTION OF DRAWINGS

FIG. 29 is a drawing illustrating an example of a warning screen.

FIG. 36 is a diagram of an example of combinations of picture conditions.

DETAILED DESCRIPTION OF EMBODIMENTS

<Configuration of Appearance of Photograph Sticker Creating Apparatus>

[Overall Configuration]

Figure 1:
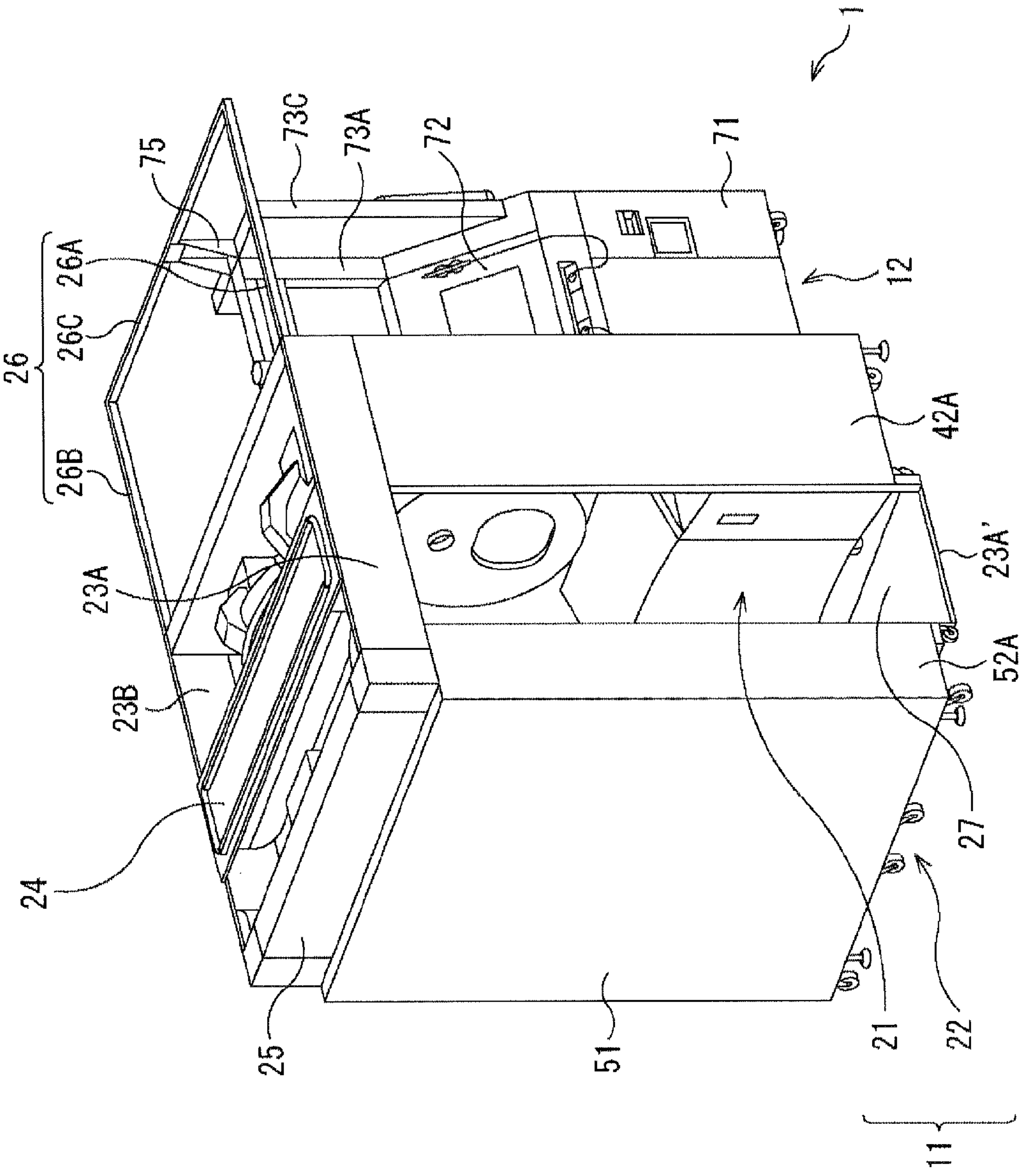
FIG. 1 is a perspective view of an exemplary configuration of an appearance of a photograph sticker creating apparatus according to one embodiment of the present invention.

FIG. 1 is a perspective view of a photograph sticker creating apparatus 1 (an image processing apparatus), showing an exemplary configuration of an appearance thereof.

The photograph sticker creating apparatus 1 is a gaming apparatus that causes a user to perform operations such as shooting, editing, and the like as a game to provide an image to the user. The provision of the image is performed not only in the form of an image printed on a sticker sheet, but may also performed in a form of an image printed on a print medium other than the sticker sheet (such as a photograph paper), or in a form of an image transmitted to a server to allow the user to view the image on a mobile terminal of the user. The photograph sticker creating apparatus 1 is installed in a store, such as a game arcade.

In order to obtain an edited image, a user, who is playing with the photograph sticker creating apparatus 1, performs the shooting of the user himself/herself as an object, and edits the shot image to obtain a decorated image by combining composite-use images such as hand-written characters and stamp images with the shot image acquired by the shooting, etc. The user obtains a sticker sheet with the edited image printed thereon which is the edited shot image, and the series of games comes to an end.

The photograph sticker creating apparatus 1 has a function of providing the user with an identification photograph image which is an image to be used as the identification photograph. When the user starts to use the photograph sticker creating apparatus 1, the user first selects whether to perform a game for obtaining edited images or to perform a game to obtain an identification photograph image.

In order to obtain the identification photograph image, the user performs the shooting of the user himself/herself as the object. The user creates an identification photograph image by adjusting picture conditions of the shot image acquired by the shooting. When the user receives a sticker sheet with the identification photograph image printed thereon, the series of games come to an end.

In many cases a user group including a plurality of persons, such as two or three persons, tries to obtain a sticker sheet with the edited images printed thereon. In contrast, in many cases, one user tries to obtain a sticker sheet with an identification photograph image printed thereon.

Hereinafter, among courses prepared in the photograph sticker creating apparatus 1, a course for obtaining edited images will be referred to as "normal course", and a course for obtaining an identification photograph image will be referred to as "identification photograph course", appropriately.

A series of process steps in the normal course includes: shooting, editing of a shot images acquired by the shooting, and printing of the edited images acquired by the editing. The editing the shot images includes a process of combining a predetermined composite-use image, which is prepared using an editing tool prepared in advance, with a position designated by the user using a stylus pen on a shot image to be edited, in addition to a process of adjusting the picture conditions such as the brightness of the object and the color of the skin.

On the other hand, a series of process steps of the identification photograph course includes: shooting, adjusting an identification photograph image selected from shot images acquired by the shooting, and the printing of the identification photograph image after the adjustment. The adjustment for the identification photograph image includes a process of adjusting the position and the size of a person shown as the object and/or a process of adjusting the picture conditions such as the brightness of the skin and the color of the hair.

As shown in FIG. 1, the photograph sticker creating apparatus 1 is basically configured by installing a photographing unit 11 and an image processing unit 12 in contact with each other.

The photographing unit 11 includes a photographing apparatus 21 and a background member 22. The photographing apparatus 21 and the background member 22 are installed away from each other. The photographing apparatus 21 and the background member 22 form a space therebetween, which is a photographing space enabling a user to perform the shooting.

The photographing apparatus 21 is an apparatus that performs a shooting process for the user as the object. The photographing apparatus 21 is positioned in a front portion that is positioned at a direction toward which the user, who entered the photographing space, faces in order to perform the shooting process. A camera, a touch panel monitor, etc., used for various types of operation, are disposed in front of the photographing apparatus 21 facing the photographing space. Referring to a surface on the right side seen from the user present in the photographing space as "right side surface" and a surface on the left side thereof as "left side surface", the right side surface of the photographing apparatus 21 includes a side panel 42A and the left side surface includes a side panel 42B (FIG. 3).

Figure 3:
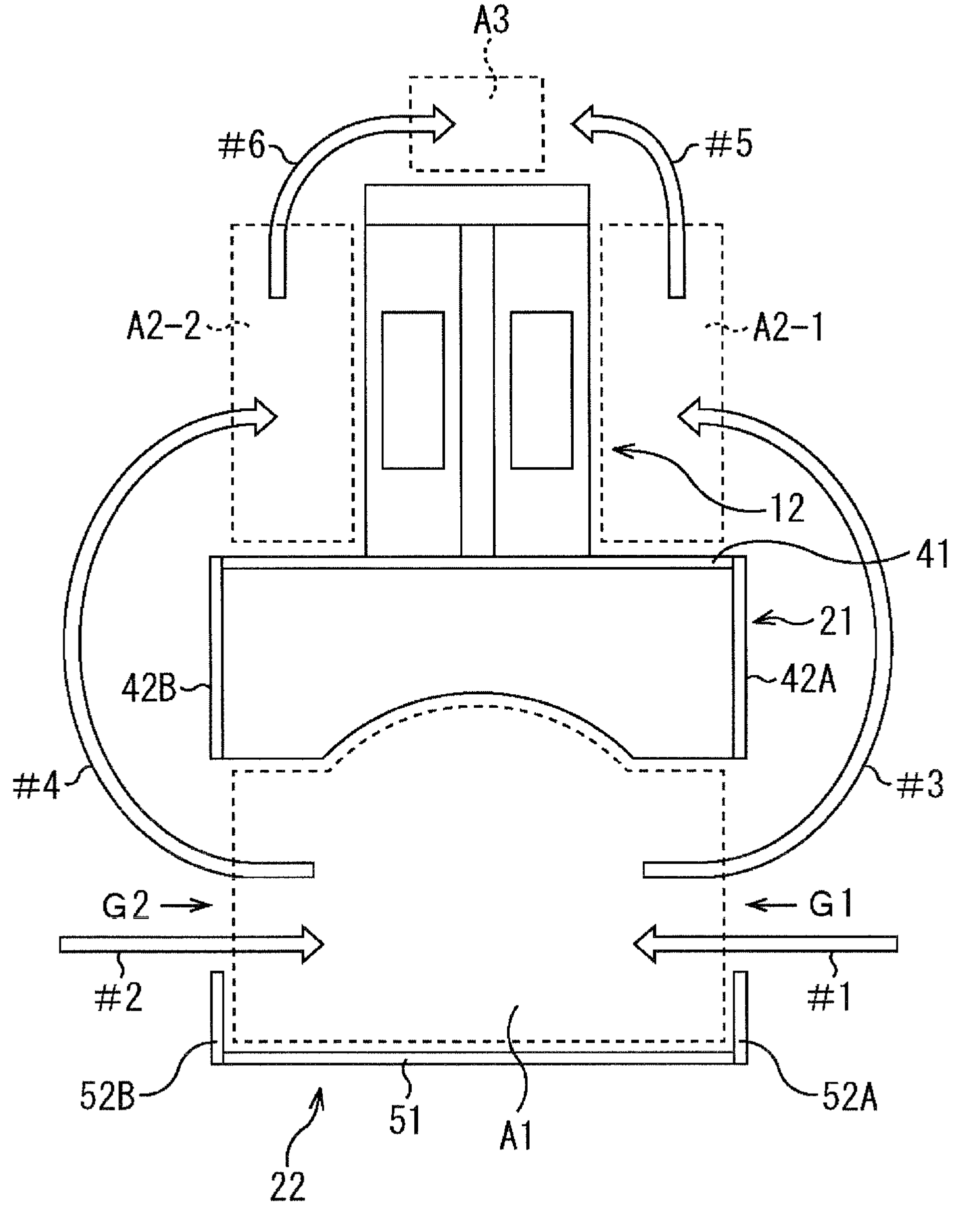
FIG. 3 is a drawing for describing moves of a user.

The background member 22 includes: a back panel 51 that is a board-like member positioned behind the user facing to the front direction and performing the shooting; a side panel 52A that is a board-like member attached on the right edge of the back panel 51 and having a transverse width less than that of the side panel 42A; and a side panel 52B that is a board-like member attached on the left edge of the back panel 51 and having a transverse width less than that of the side panel 42B (FIG. 3).

The side panel 42A having the right side surface of the photographing apparatus 21 and the side panel 52A of the background member 22 are aligned in a substantially same plane. The side panel 42A and the side panel 52A are connected to each other in their upper portions via a connecting member 23A which is a board-like member, and are connected to each other in their lower portions via a connecting member 23A which is, for example, a metal member disposed on a floor. Similarly, the side panel 42B having the left side surface of the photographing apparatus 21 and the side panel 52B of the background member 22 are disposed in a substantially same plane, are connected to each other in their upper portions via a connecting member 23B, and are connected to each other in their lower portions via a connecting member 23B' (not shown) that is a metal member disposed on the floor.

An opening is formed surrounded by the side panel 42A of the photographing apparatus 21, the connecting member 23A, and the side panel 52A of the background member 22, and it is an entrance/exit of the photographing space. Another opening is formed surrounded by the side panel 42B of the photographing apparatus 21, the connecting member 23B, and the side panel 52B of the background member 22, and it is also an entrance/exit of the photographing space. A flooring material 27 is installed inside the photographing space. The user enters the photographing space, stands on the flooring material 27, and performs the shooting.

A background curtain unit 25 is disposed on the upper portion of the background member 22 while being supported by the back panel 51, the side panel 52A, and the side panel 52B. The background curtain unit 25 accommodates a roll-up background curtain to be used as a green background for a chroma key. The background curtain unit 25 operates in conjunction with the shooting by a camera and the like disposed in the photographing apparatus 21 to drop the curtain for the shooting and to roll up the curtain after the shooting ends. Instead of the above-mentioned background curtain or in addition to the above-mentioned background curtain, the background curtain unit 25 may be configured to accommodate plurality of roll-up background curtains each having a color or a design different from each other and each to be used as the background, and configured to operate in conjunction with the shooting by the camera or the like disposed in the photographing apparatus 21 to drop a curtain, having a user-selected color for example, and to roll up the other curtains for the shooting.

An opening is formed above the photographing space, which is surrounded by the front surface of the photographing apparatus 21, the connecting member 23A, the connecting member 23B, and the background curtain unit 25, and a ceiling strobe unit 24 is disposed such that it covers a portion of the opening. The ceiling strobe unit 24 has its one end fixed to the connecting member 23A and another end fixed to the connecting member 23B. The ceiling strobe unit 24 incorporates therein a strobe that emits a light toward the inside of the photographing space at the shooting. The ceiling strobe unit 24 also has a fluorescent lamp disposed therein in addition to the strobe, so that it also functions as a lighting apparatus for the photographing space.

The image processing unit 12 is an apparatus that performs an editing process for a shot image in the normal course and an adjusting process for an identification photograph image in the identification photograph course. Hereinafter, when the editing of a shot image and the adjusting of an identification photograph image will not necessarily distinguished from each other, they will be collectively referred to as an "image processing".

The image processing unit 12 is disposed and joined to the photographing unit 11 such that one side surface of the image processing unit 12 contacts the back surface of the photographing apparatus 21. The image processing unit 12 includes a tablet built-in monitor or the like disposed therein to be used by the user at the image processing.

Components of the image processing unit 12 which can partially be seen in FIG. 1 shall be a component on a front side. Each configuration used for the image processing are disposed on the front side and the back side of the image processing unit 12. This configuration enables two groups of users to perform the image processing at the same time.

The front surface of the image processing unit 12 is a surface perpendicular to the floor surface, and includes a surface 71 being a surface in substantially parallel to the side panel 42A, and an inclined surface 72 disposed above the surface 71. The inclined surface 72 has a configuration disposed thereon used at the work steps of the image processing. A column-like support member 73A supporting one end of the lighting apparatus 74 (FIG. 2) is disposed on the right of the inclined surface 72. Another column-like support member 73B (FIG. 2) supporting the other end of the lighting apparatus 74 is also disposed on the left of the inclined surface 72. A board-like panel 73C having a side surface of the image processing unit 12 is disposed on the right of the support member 73A. A support member 75 supporting a curtain rail 26 is disposed on the upper surface of the panel 73C.

The curtain rail 26 is attached above the image processing unit 12. The curtain rail 26 is configured by assembling three rails 26A to 26C to form a squared C-shape when seen from above. Ends of the rail 26A and the rail 26B disposed in parallel to each other are fixed to the connecting member 23A and the connecting member 23B, respectively, and both ends of the rail 26C are joined to the other ends thereof.

The curtains are attached to the curtain rails 26 such that the inside of a space in front of the front surface of the image processing unit 12 and the inside of a space in front of the back surface thereof are invisible from the outside. The space in front of the front surface of the image processing unit 12 and the space in front of the back surface thereof each being to be surrounded by the curtains attached to the curtain rails 26 are image processing spaces allowing users to edit shot images and to adjust the identification photograph images.

Figure 2:
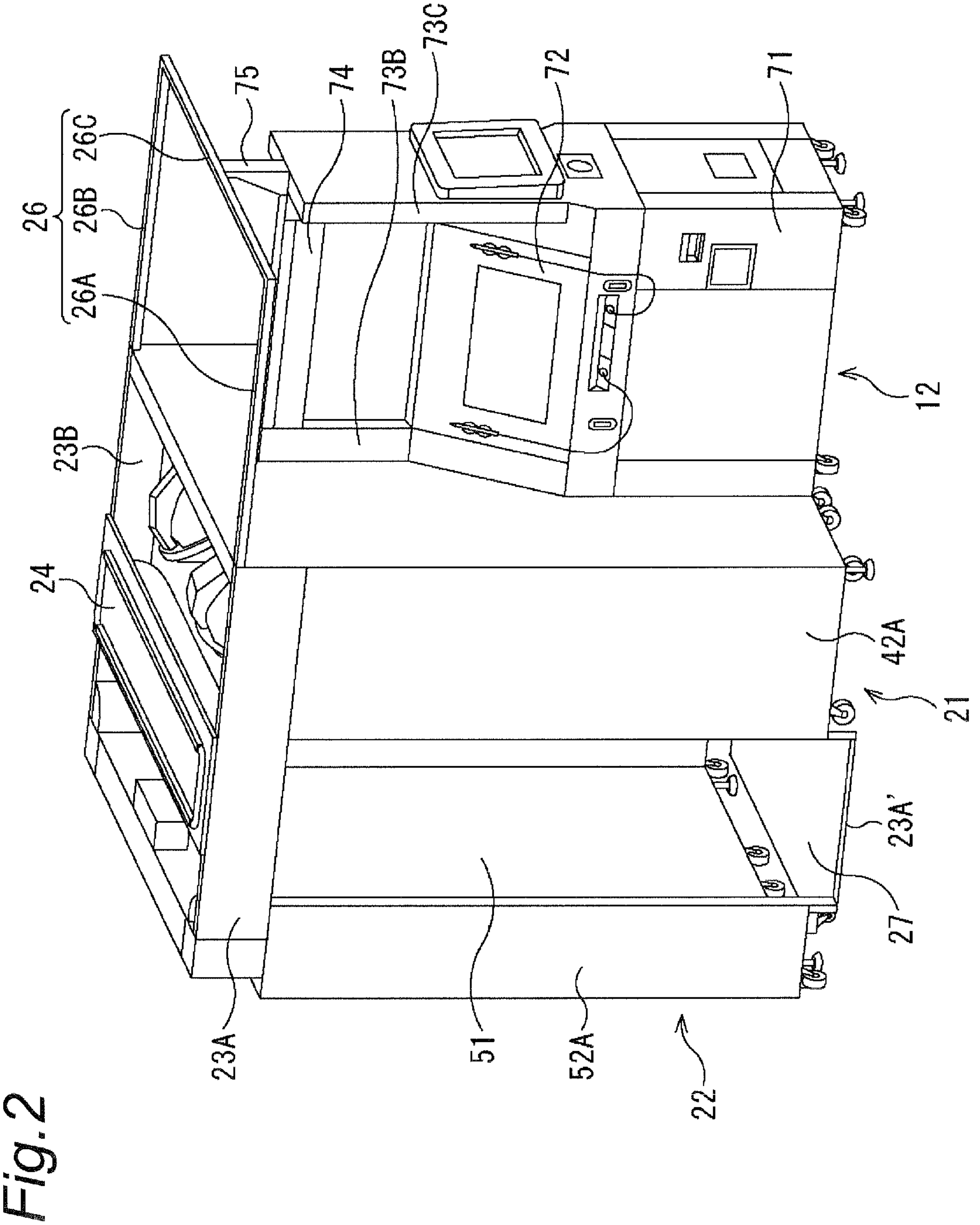
FIG. 2 is a perspective view of the photograph sticker creating apparatus, in which the appearance is seen from another angle.

FIG. 2 is a perspective view of the photograph sticker creating apparatus 1 seen from another angle.

As described later, the tablet built-in monitor, a sticker sheet ejecting opening for ejecting a printed sticker sheet, and the like are disposed on the right side surface of the image processing unit 12. The tablet built-in monitor disposed on the side surface of the image processing unit 12 is used when the user uses a post-editing service function during waiting for a completion of printing of an image. The post-editing service function includes functions such as that of transmitting the edited image or the identification photograph image to the server. The space in front of and on the right side of the image processing unit 12 is a post-editing service space allowing the user to use the post-editing service function.

The flow of a photograph sticker creating game and a move of the user associated therewith will be described below. The move of the user is same in both of the normal course and the identification photograph course.

FIG. 3 is a plan view of the photograph sticker creating apparatus 1 seen from above.

The user of the photograph sticker creating apparatus 1 enters a photographing space A1 formed between the photographing apparatus 21 and the background member 22 from an entrance/exit C1 as indicated by an outline arrow #1 or from an entrance/exit G2 as indicated by an outline arrow #2. The user then selects a course, and thereafter, performs the shooting corresponding to the course by using the camera, the touch panel monitor, etc., disposed in the photographing apparatus 21.

After finishing the shooting, the user exits the photographing space A1 through the entrance/exit G1 and moves to an image processing space A2-1 as indicated by an outline arrow #3, or exits the photographing space A1 through the entrance/exit G2 and moves to an image processing space A2-2 as indicated by an outline arrow #4.

The image processing space A2-1 is an image processing space on the front side of the image processing unit 12, and the image processing space A2-2 is an image processing space on the back side of the image processing unit 12. Which space of the image processing space A2-1 and the image processing space A2-2 to move is guided to the user by, for example, a screen display by the touch panel monitor of the photographing apparatus 21. For example, if one of the two image processing spaces is empty, the empty one is guided as a destination of the move.

The user who moved to the image processing space A2-1 or the image processing space A2-2 starts editing a shot image if the user has selected the normal course, or starts adjusting the identification photograph image if the user has selected the identification photograph course. The user in the image processing space A2-1 and the user in the image processing space A2-2 can simultaneously perform the image processing.

After the image processing is finished, printing of the edited image or identification photograph image starts. During the printing of the image, after finishing the image processing at the image processing space A2-1, the user moves from the image processing space A2-1 to a post-editing service space A3 as indicated by an outline arrow #5 and uses the post-editing service function. In addition, after finishing the image processing at the image processing space A2-2, the user moves from the image processing space A2-2 to the post-editing service space A3 as indicated by an outline arrow #6 and uses the post-editing service function.

On completion of the printing of the image, the user receives a sticker sheet from the sticker sheet ejecting opening, and the series of photograph sticker creating games comes to an end.

[Configuration of Photographing Unit]

Figure 4:
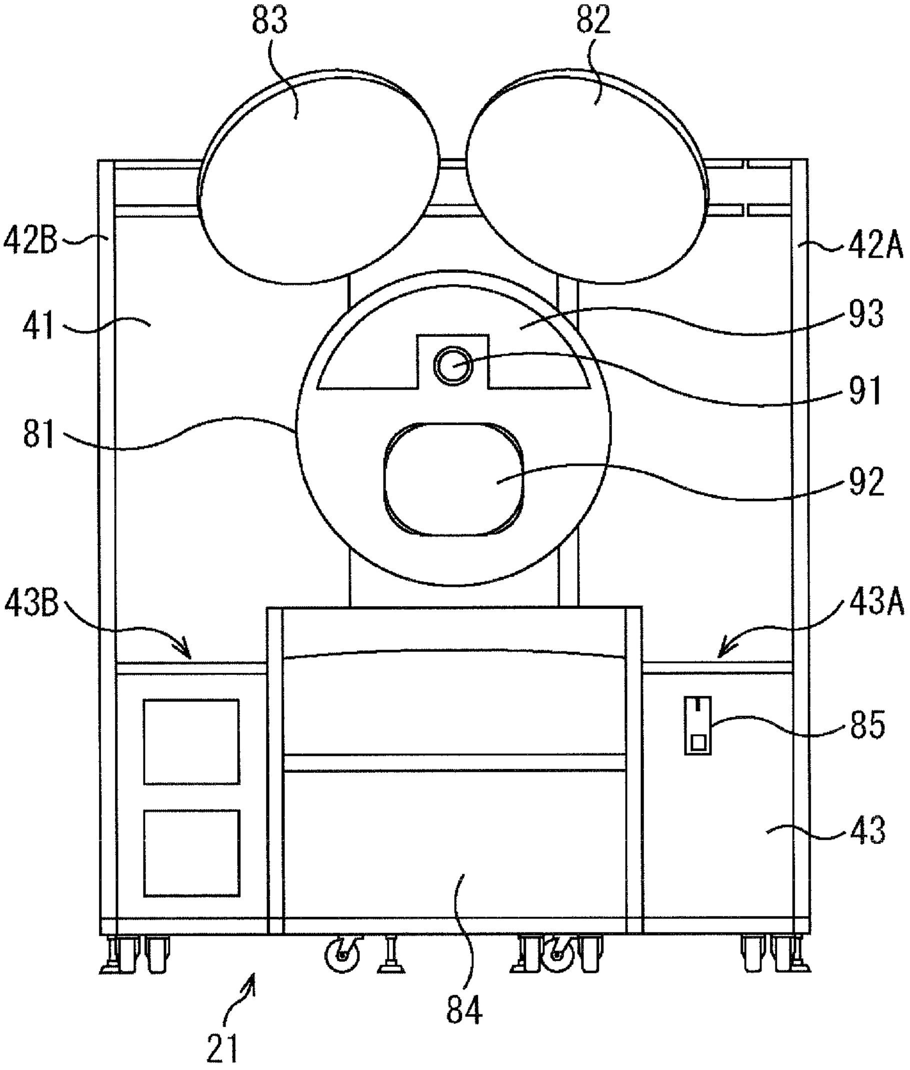
FIG. 4 is a drawing illustrating an exemplary configuration of a photographing apparatus.

FIG. 4 is a drawing illustrating an exemplary configuration of the front surface of the photographing apparatus 21.

The photographing apparatus 21 is configured by attaching a front panel 41, the side panel 42A, and the side panel 42B to a base portion 43 having a box-like shape.

A shooting and displaying unit 81 is disposed at a position somewhat above the center of the front panel 41. The shooting and displaying unit 81 includes the camera 91, the touch panel monitor 92, and a front strobe 93.

The camera 91 is, for example, a single-lens reflex camera, and is attached inside the shooting and displaying unit 81 such that the lens thereof is exposed. The camera 91 is configured to include an imaging device such as a CCD (Charge Coupled Device) and to shoot the user present in the photographing space A1. A moving image captured by the camera 91 is displayed on the touch panel monitor 92 in real time. A still image is captured by the camera 91 at a predetermined timing, and is stored as a shot image. Two or more cameras 91 may be disposed.

The touch panel monitor 92 is disposed under the camera 91, and includes a monitor such as an LCD (Liquid Crystal Display) and a touch panel laminated thereon. The touch panel monitor 92 has a function of displaying the moving image captured by the camera 91 as a live view monitor, and a function of displaying various types of GUI (Graphical User Interface) image and receiving the selection operation by the user through the touch panel. The touch panel monitor 92 appropriately displays thereon the moving image (the live view) and the shot image captured by the camera 91.

The front strobe 93 includes a light-emitting surface having a milky-white acrylic board with a semi-circular shape surrounding the upper side and the right and left sides of the camera 91, and the front strobe 93 emits light at the time of the shooting by the camera 91, and illuminates the face and its vicinity of the user as an object from the front side.

An upper right strobe 82 and an upper left strobe 83 are disposed above the shooting and display unit 81, each of which has a curved light-emitting surface facing the user. The upper right strobe 82 and the upper left strobe 83 illuminate the user from above by emitting light at the time of the shooting by the camera 91.

A foot strobe 84 illuminating the feet of the user is disposed on the front surface of the base portion 43. A coin input/return port 85 is disposed on the right of the foot strobe 84, allowing the user to insert coins thereinto.

Spaces 43A and 43B are disposed above the base portion 43 and on the right and left side of the upper surface of the foot strobe 84, respectively, such that the spaces 43A and 43B sandwiches the upper surface of the foot strobe 84. The spaces 43A and 43B are used as storing spaces for putting a baggage, etc. thereon by the user who performs the shooting. A speaker is also disposed in, for example, the vicinity of the ceiling of the front panel 41, that outputs sounds such as a guidance audio, BGM (Back Ground Music), and a sound effect for the shooting process.

[Configuration of Background Member]

Figure 5:
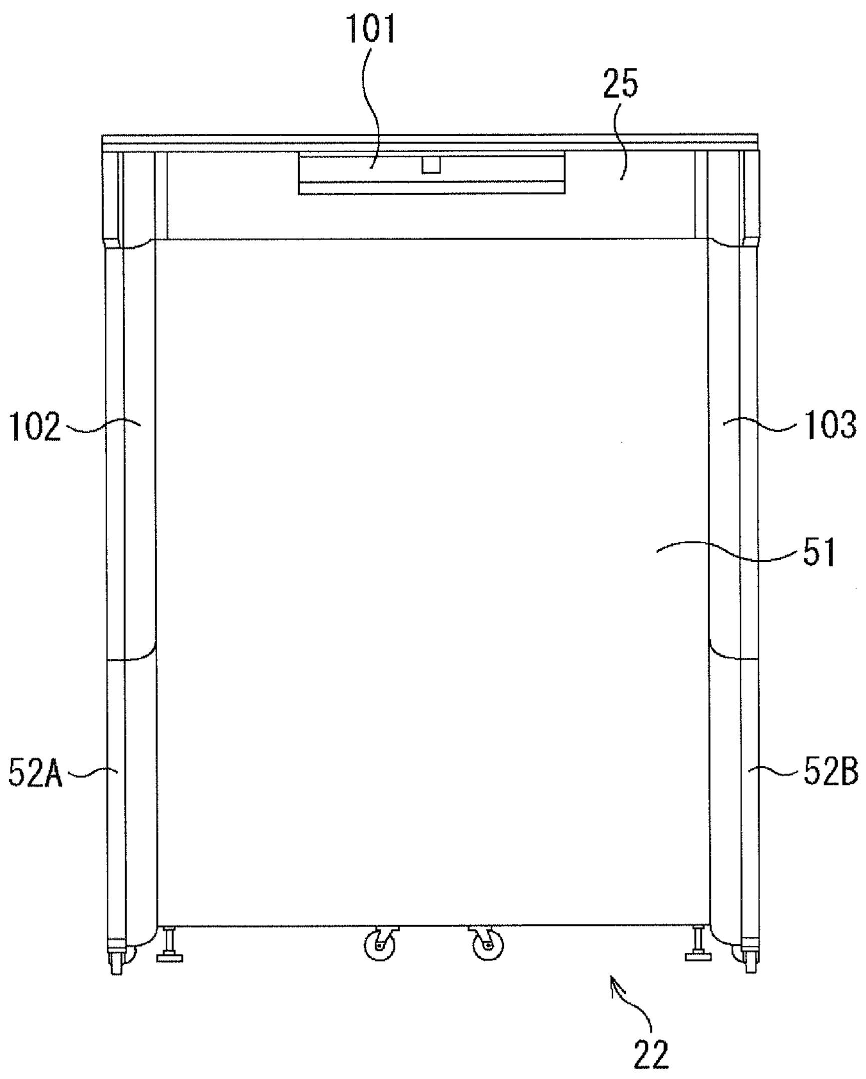
FIG. 5 is a drawing illustrating an exemplary configuration of a background member.

FIG. 5 is a drawing illustrating an exemplary configuration of the background member 22 on the side of the photographing space A1.

The background curtain unit 25 is disposed above the back panel 51. At the substantial center of the background curtain unit 25, a center rear strobe 101 is disposed that illuminates the user performing the shooting process in the photographing space A1 from the center of the rear side.

A right rear strobe 102 illuminating the user performing the shooting process in the photographing space A1 from right rear side is attached at a position on the entrance/exit G1 side of the back panel 51. A left rear strobe 103 illuminating the user performing the shooting process in the photographing space A1 from left rear side is attached at a position on the entrance/exit G2 side of the back panel 51.

[Configuration of Image Processing Unit]

Figure 6:
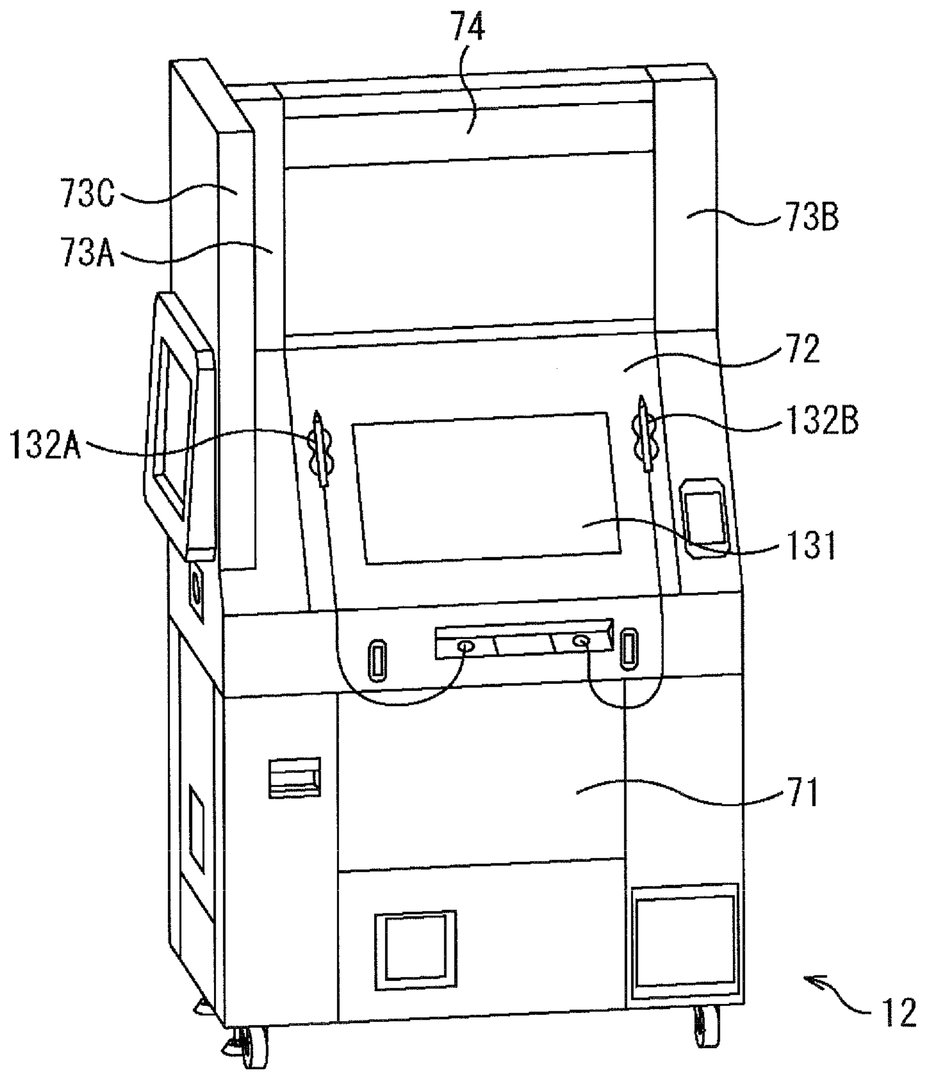
FIG. 6 is a drawing illustrating an exemplary configuration of a rear surface of an image processing unit.

FIG. 6 is a drawing illustrating an exemplary configuration on the rear side (on the side of the image processing space A2-2) of the image processing unit 12.

A tablet built-in monitor 131 is disposed at the substantial center of the inclined surface 72. Sandwiching the tablet built-in monitor 131, a stylus pen 132A is disposed on the left side thereof and a stylus pen 132B is disposed on the right side thereof.

The tablet built-in monitor 131 is configured by disposing and laminating a tablet on a monitor such as an LCD, into which an operational input can be entered by using the stylus pen 132A or 132B. The tablet built-in monitor 131 displays thereon, for example, an editing screen during in the normal course. The editing screen is a screen used for the editing of a shot image. When two users concurrently perform the editing, one user facing the tablet built-in monitor 131 and present on the left side thereof uses the stylus pen 132A, and the other user facing the tablet built-in monitor 131 and present on the left side thereof uses the stylus pen 132B.

The tablet built-in monitor 131 displays thereon, for example, an adjustment screen during in the identification photograph course. The adjustment screen is a screen used for the adjustment of an identification photograph image. The adjustment is performed by using, for example, either of the stylus pen 132A and the stylus pen 132B.

Figure 7:
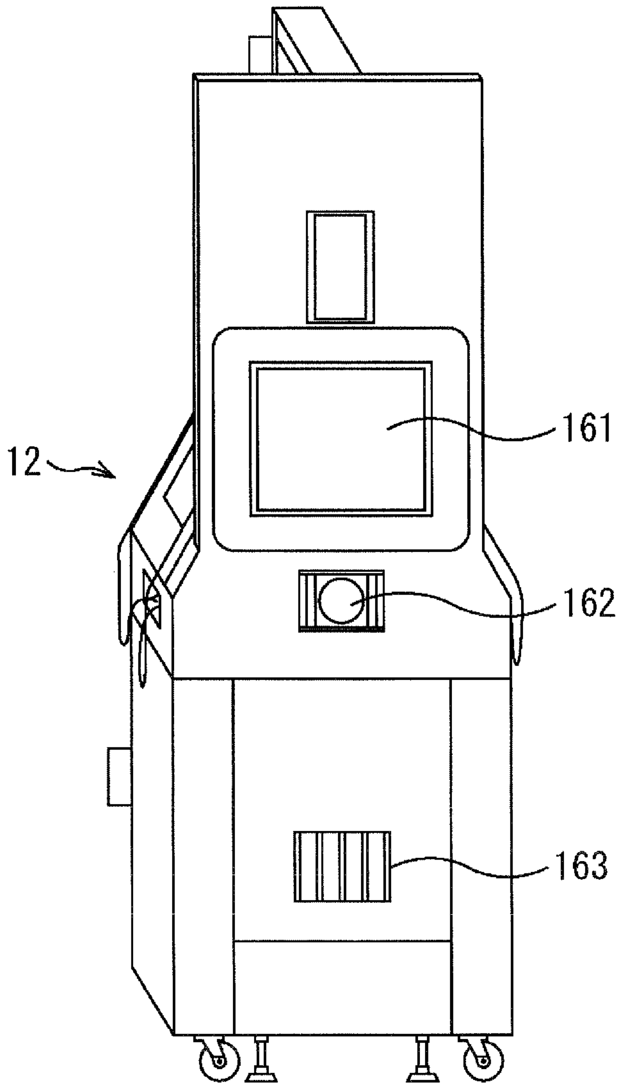
FIG. 7 is a drawing illustrating an exemplary configuration of a side surface of the image processing unit.

FIG. 7 is a drawing illustrating an exemplary configuration of a right side surface of the image processing unit 12.

A tablet built-in monitor 161 is disposed on the side surface of the image processing unit 12. The tablet built-in monitor 161 displays thereon the screen that is used when the post-editing service function is used.

A speaker 162 is disposed under the tablet built-in monitor 161, and outputs sounds such as guidance audio, BGM, and a sound effect for the post-editing service function. A sticker sheet ejecting opening 163 is disposed under a speaker 162. A printer is disposed inside the image processing unit 12. An edited image or an identification photograph image is printed in a predetermined layout on a sticker sheet, and is ejected from the sticker sheet ejecting opening 163.

<Example of Sticker Sheet>

Figure 8B:
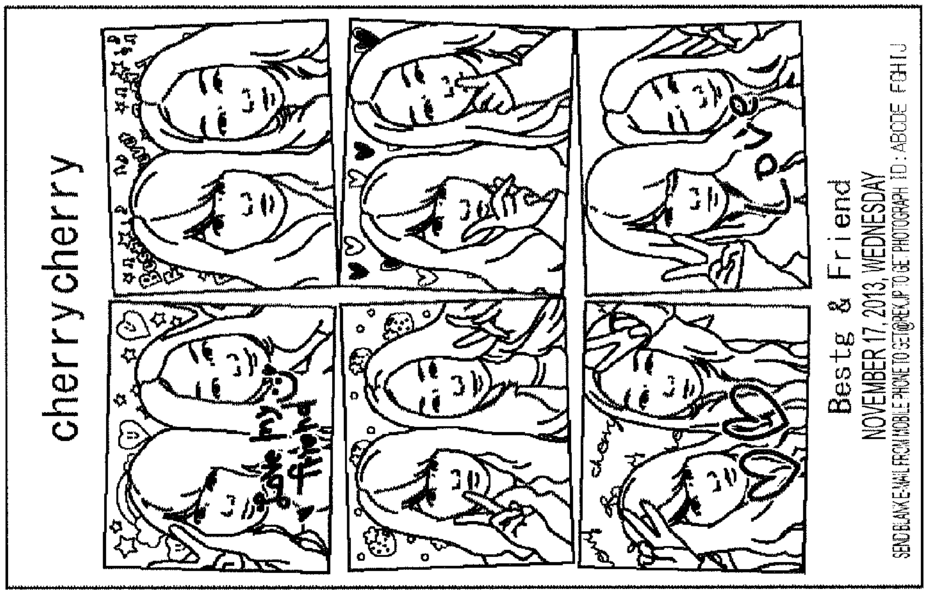
FIGS. 8A and 8B show drawings illustrating examples of sticker sheets with edited images printed thereon.
Figure 8A:
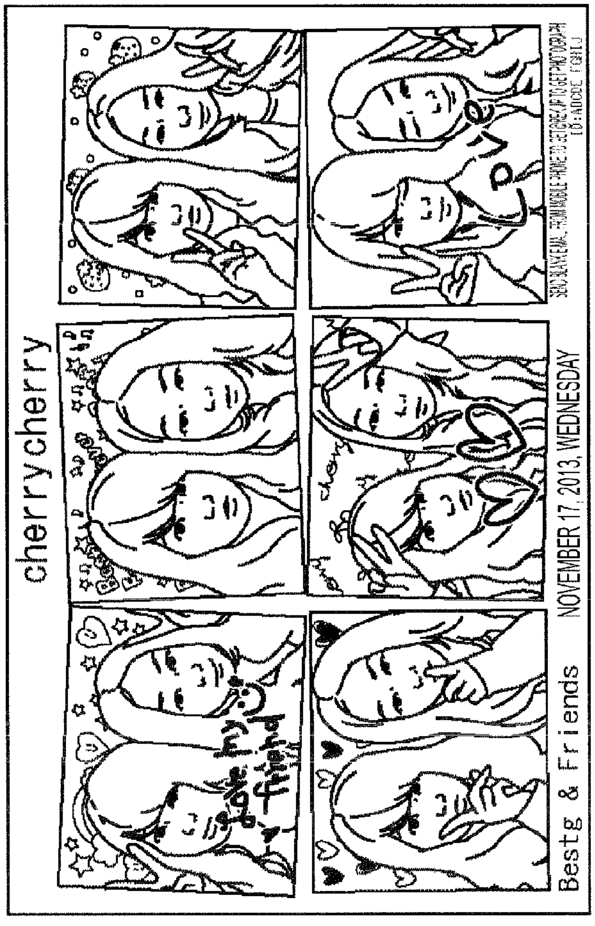

FIGS. 8A and 8B are drawings illustrating examples of sticker sheets with edited images printed thereon.

FIG. 8A depicts a sticker sheet with six edited images printed thereon which are arranged in a two-row and three-column layout. FIG. 8B depicts a sticker sheet with six edited images printed thereon which are arranged in a three-row and two-column layout.

The six edited images are six types of images each showing two users in a composition different from each other. During the normal course, for example, the shootings for still images are performed six times, and the editing is performed for each of the six shot images. Thereafter, the edited images are printed on the sticker sheet. In the examples of FIGS. 8A and 8B, the shot images are each printed being somewhat inclined.

A background image having a predetermined color or a predetermined design is combined on the background of the users shown in each of the shot images. A composite-use image such as hand-written characters or a stamp image is superimposed on the foreground. For example, the characters "Love my friend" are hand-written characters, which are included in an edited image in the upper row and left column in the six images of FIG. 8A, and the heart-shaped image is a stamp image, that is included an edited image in the lower row and center column.

An e-mail address and an ID are printed in a blank space area on an edge of the sticker sheet, in addition to a name of machine model and the date of shooting. The e-mail address and the ID printed in the blank space area are used when the edited images transmitted to the server are viewed on a mobile terminal such as a mobile phone.

Figure 9:
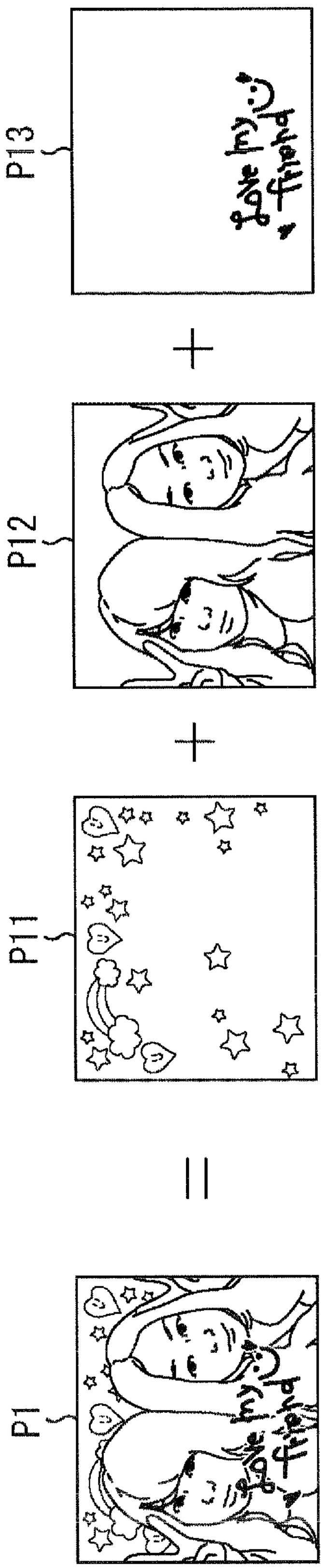
FIG. 9 is a drawing showing an example of a layer structure of the edited image.

FIG. 9 is a drawing illustrating an example of a layer structure of the edited image.

An edited image P1 includes layers that are a background image P11, a shot image P12, and a foreground image P13. The background image P11 of FIG. 9 is an image presenting designs such as hearts and stars on a background of a predetermined color. The foreground image P13 is an image including the hand-written characters of "Love my friend" input by graffiti.

The edited image P1 is produced by superimposing the area of the object of the shot image P12 on the background image P11 and further superimposing the foreground image P13 thereon.

Figure 10:
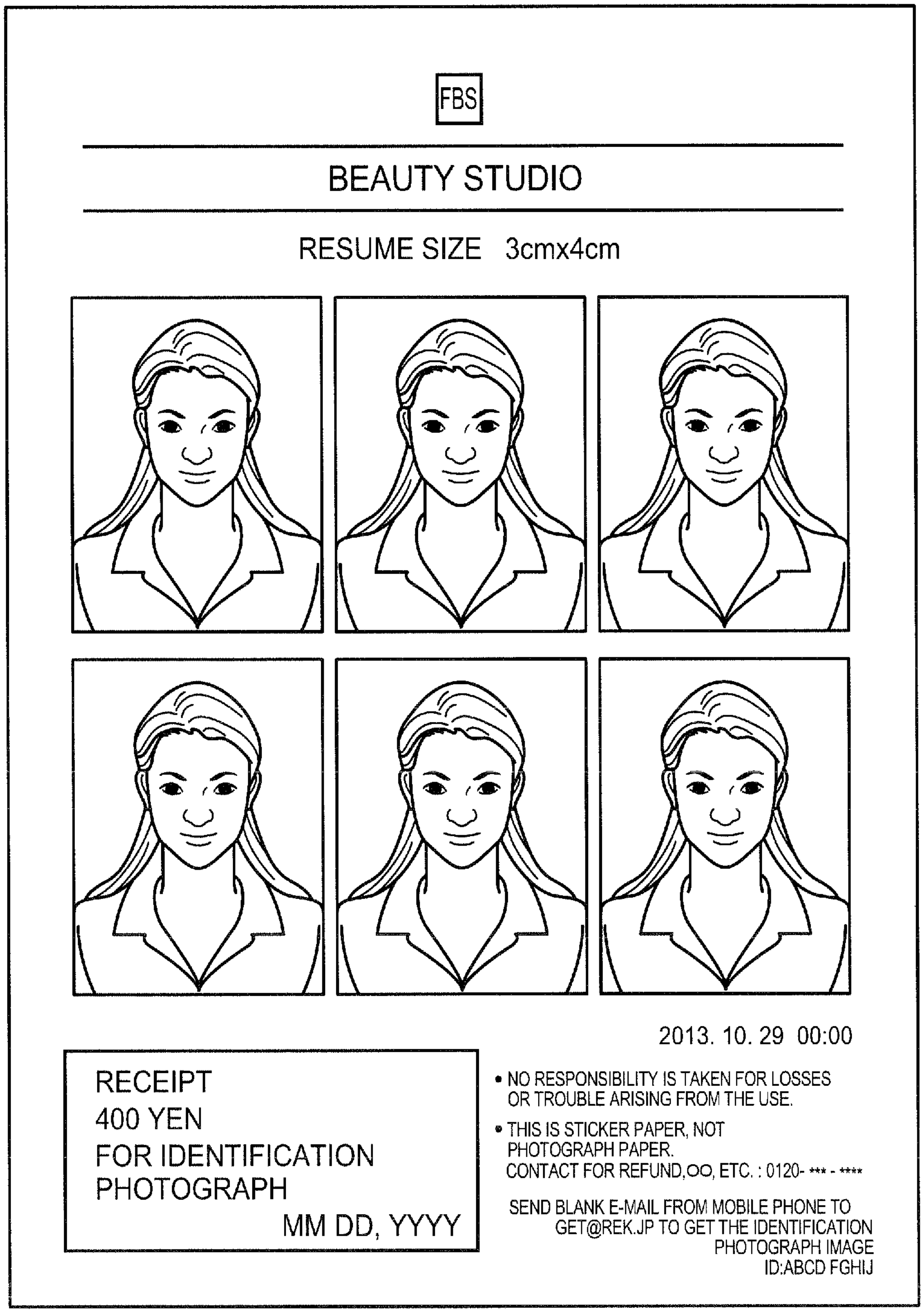
FIG. 10 is a drawing of an example of a sticker sheet with identification photograph images printed thereon.

FIG. 10 is a drawing illustrating an example of a sticker sheet with identification photograph images printed thereon.

The sticker sheet of FIG. 10 is a sticker sheet with six identification photograph images printed thereon arranged in a two-row and three-column layout.

The six identification photograph images are images of one type having the same composition showing one user in substantially the center thereof from substantially the user's chest up to a position somewhat above the user's head. During the identification photograph course, for example, shootings for a still images are performed four times, and one shot image is selected from the four shot images as an identification photograph image to be adjusted and thereafter to be printed on a sticker sheet.

A receipt including descriptions of the price, the date, etc., is printed in the lower left of the sticker sheet. A cautionary statement about usage, etc. of the identification photograph images are printed in the lower right area of the sticker sheet. Under the cautionary statement, the e-mail address and the ID are printed that are used when the identification photograph images transmitted to the server are viewed on a mobile phone. Hereinafter, a mechanism to transmit an edited image or an identification photograph image to a server to enable the image to be viewed on a mobile phone will appropriately be referred to "to-mobile transmission").

The user will cut the sticker sheet with the identification photograph images into pieces by using a pair of scissors, and will use a cut image by attaching it on a document such as a resume. Since the print medium is a sticker sheet, any pasting work for attaching a photograph on a resume, etc. is unnecessary.

Figure 11:
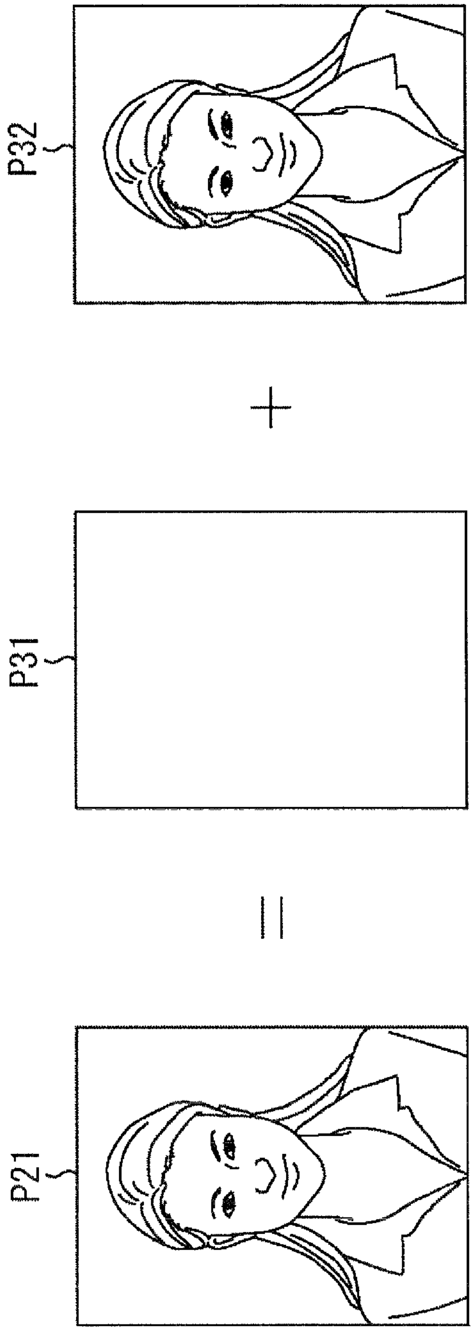
FIG. 11 is a drawing showing an example of a layer structure of an identification photograph image.

FIG. 11 is a drawing illustrating an example of the layer structure of the identification photograph image.

An identification photograph image P21 includes layers that are a background image P31 and a shot image P32. The background image P31 of FIG. 11 is a plain image of a predetermined color and does not include any design such as designs present in background images used in the normal course.

The identification photograph image P21 is produced by superimposing the area of the object of the shot image P32 on the background image P31.

The photograph sticker creating apparatus 1 having the exterior configuration as described above creates sticker sheets with edited images printed thereon or sticker sheets with identification photograph images printed thereon.

<Internal Configuration of Photograph Sticker Creating Apparatus>

[Hardware Configuration]

Figure 12:
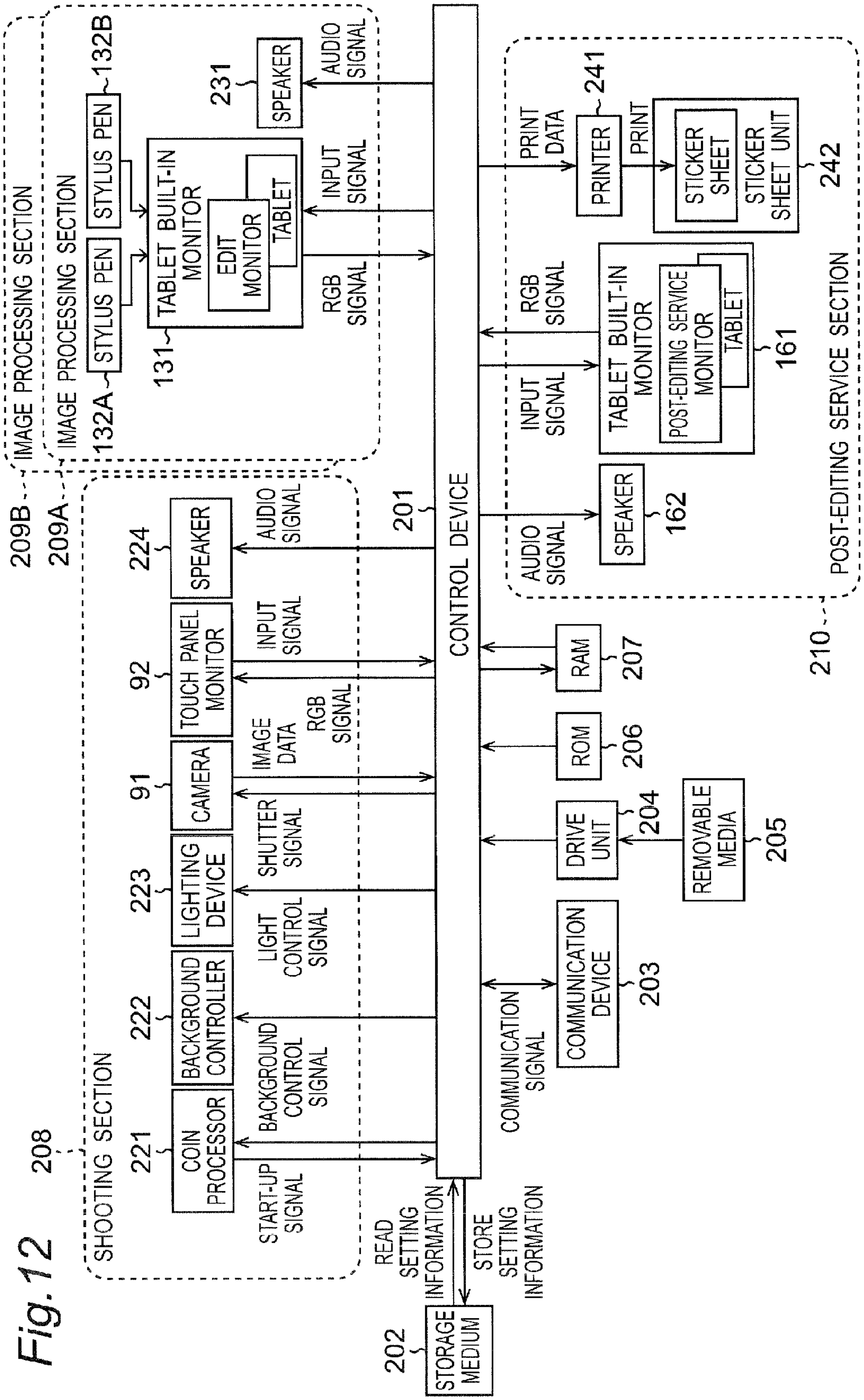
FIG. 12 is a block diagram of an exemplary internal configuration of the photograph sticker creating apparatus.

FIG. 12 is a block diagram of an exemplary internal configuration of the photograph sticker creating apparatus 1. The same configurations as the configurations as described above are given the same reference numerals. Repetition of the description will appropriately be omitted.

The control device 201 includes a CPU (Central Processing Unit), etc., and performs programs stored in a ROM (Read Only Memory) 206 and storage medium 202 to control operations of the overall photograph sticker creating apparatus 1. The control device 201 is connected to the storage medium 202, a communication device 203, a drive 204, the ROM 206, and a RAM (Random Access Memory) 207. The control device 201 is also connected to a shooting section 208, an image processing section 209A, an image processing section 209B, and a post-editing service section 210.

The storage medium 202 includes non-volatile storing media, such as a hard disc and a flash memory, which stores various types of setting information, etc., transmitted from the control device 201. The information stored in the storage medium 202 is appropriately read by the control device 201.

The communication device 203 is an interface for a network such as the Internet, and performs communication with external apparatuses in accordance with the control by the control device 201. The communication device 203 transmits the edited images and the identification photograph images to the server.

The drive 204 is appropriately attached with a removable medium 205 that includes an optical disc, a semiconductor memory, or the like. Computer programs and data read by the drive 204 from the removable medium 205 are transmitted to the control device 201, are stored in the storage medium 202, are installed, etc.

The ROM 206 stores programs and data which are to be performed by the control device 201. The RAM 207 temporarily stores data and programs which are to be processed by the control device 201.

The shooting section 208 performs the shooting process for user (s) as object (s) present in the photographing space A1. The shooting section 208 includes a coin processor 221, a background controller 222, a lighting device 223, the camera 91, the touch panel monitor 92, and a speaker 224.

The coin processor 221 detects an insertion of a coin into the coin insertion/return port 85. When the coin processor 221 detects that coins corresponding to a predetermined price such as 400 yen are inserted, the coin processor 221 outputs a start-up signal indicating the detected insertions to the control device 201.

The background controller 222 controls the background curtain unit 25 in accordance with a background control signal transmitted from the control device 201 to perform the roll-up and roll-down of background curtains. The rolling up or rolling-down of the background curtains may manually be performed by a user.

For example, different background curtains are used between two courses of the identification photograph course and the normal course. For example, color tones are different between a background curtain used in the identification photograph course and a background curtain used in the normal course. For example, a background curtain used in the identification photograph course is white, whereas a background curtain used in the normal course is green. Alternatively, a background curtain used in the identification photograph course is green, whereas a background curtain used in the normal course is white. The background curtain is shot together with the user and constitutes the area of the background in the shot image. On an area of the background of the shot image, the image of the background curtain used when the shooting may be used as it is, however, as described below, the image on the area of the background of the shot image may be replaced with a predetermined background image by using a chroma key process. In this case, in the identification photograph course, the background area of the shot image may be replaced with an area having a subtle color (a color with low saturation and high brightness) (see 514 of FIG. 31).

The lighting device 223 controls the light emission of each of the strobes in the photographing space A1 according to a light control signal transmitted from the control device 201. In the photographing space A1, in addition to the strobe of the ceiling strobe unit 24, the upper right strobe 82, the upper left strobe 83, the foot strobe 84, and the front strobe 93 of the photographing apparatus 21, as well as the center rear strobe 101, the right rear strobe 102, and the left rear strobe 103 of the background member 22 are disposed.

For example, when the shooting of still images is performed, different strobes operate between the identification photograph course and the normal course. In addition, the amount of emitted light and shades of the light of strobes are switched between the identification photograph course and those for the normal course.

The camera 91 performs shooting in accordance with the control by the control device 201 and outputs images acquired by the shooting to the control device 201.

The image processing section 209A performs image processing for the user present in the image processing space A2-1 as the object. The image processing section 209A includes the tablet built-in monitor 131, the stylus pens 132A and 132B, and a speaker 231. The image processing section 2095 has the same configuration as that of the image processing section 209A and performs image processing for the user present in the image processing space A2-2 as the object.

The tablet built-in monitor 131 displays an edited image or an adjusted image according to the control by the control device 201, and detects operations to the screen by the user. A signal indicating the content of the operation by the user is transmitted to the control device 201 and the image processing is performed in response to the operation by the user.

A post-editing service section 210 performs a post-editing service process for the user present in the post-editing service space A3 as the object. The post-editing service process is a process of providing the user with the post-editing service function. The post-editing service section 210 includes the tablet built-in monitor 161, the speaker 162, and the printer 241. A sticker sheet unit 242 is attached to the printer 241.

The printer 241 prints the edited image or the identification photograph image on a sticker sheet accommodated in the sticker sheet unit 242, based on print data transmitted from the control unit 201. The printer 241 then ejects the printed sticker sheet to the sticker sheet ejecting opening 163. Image data in which each image is arranged is transmitted as the print data from the control device 201 to the printer 241.

[Configuration of Control Device]

Figure 13:
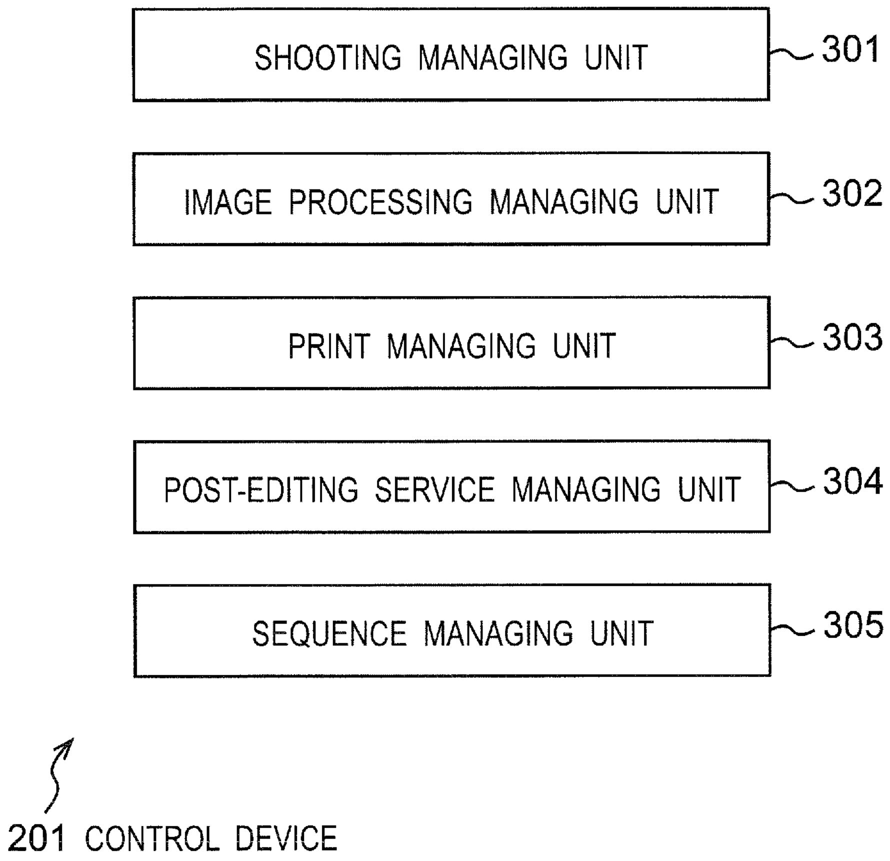
FIG. 13 is a block diagram illustrating an exemplary functional configuration of a control device.

FIG. 13 is a block diagram illustrating an exemplary functional configuration of the control device 201 of FIG. 12. At least a portion of the functional parts depicted in FIG. 13 is realized by the performing of the predetermined programs by the CPU in the control device 201.

The control device 201 realizes a shooting managing unit 301, an image processing managing unit 302, a print managing unit 303, a post-editing service managing unit 304, and a sequence managing unit 305.

The shooting managing unit 301 controls each part in the shooting section 208 to perform a process relating to the charge to be inserted when the photograph sticker creating apparatus 1 is used and the shooting process. The image processing managing unit 302 controls each part of the image processing section 209A and the image processing section 209B, to perform the image processing. The print managing unit 303 controls the printer 241 in the post-editing service section 210 to perform a printing process. The post-editing service managing unit 304 performs the post-editing service process, by controlling the tablet built-in monitor 161 of the post-editing service section 210, etc. The sequence managing unit 305 manages the sequence of the overall game performed by the user.

Figure 14:
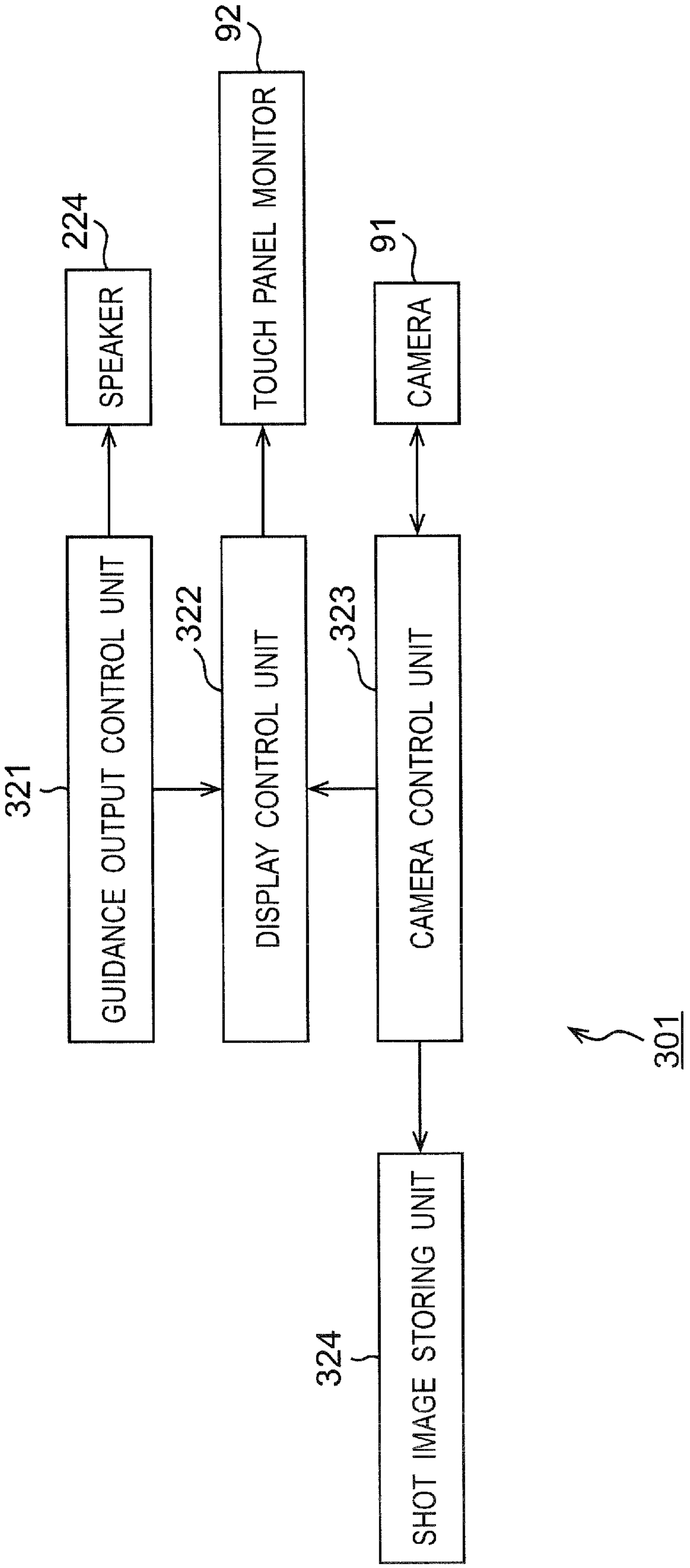
FIG. 14 is a block diagram illustrating an exemplary configuration of a shooting managing unit of FIG. 13.

FIG. 14 is a block diagram of an exemplary configuration of the shooting managing unit 301.

The shooting managing unit 301 includes a guidance output control unit 321, a display control unit 322, a camera control unit 323, and a shot image storing unit 324.

The guidance output control unit 321 controls outputting of guidance for describing how to perform the shooting, etc. The guidance output control unit 321 controls the display control unit 322 to display a screen for describing how to perform the shooting and to output audio from the speaker 224.

The display control unit 322 controls the display on the touch panel monitor 92. For example, the display control unit 322 causes the touch panel monitor 92 to display thereon a live view based on a moving image transmitted from the camera control unit 323.

When the shooting process is started, the camera control unit 323 controls the camera 91 to shoot a moving image. The moving image shot by the camera control unit 323 is used for the display of the live view. The camera control unit 323 shoots a still image at a predetermined timing and outputs the shot image to the display control unit 322 and the shot image storing unit 324. The shot image output to the display control unit 322 is used for a confirmation of the shooting result.

The shot image storing unit 324 stores the shot image transmitted from the camera control unit 323. At the start of the editing process or at the start of the adjusting process, the shot image stored in the shot image storing unit 324 is read by the image processing managing unit 302.

Figure 15:
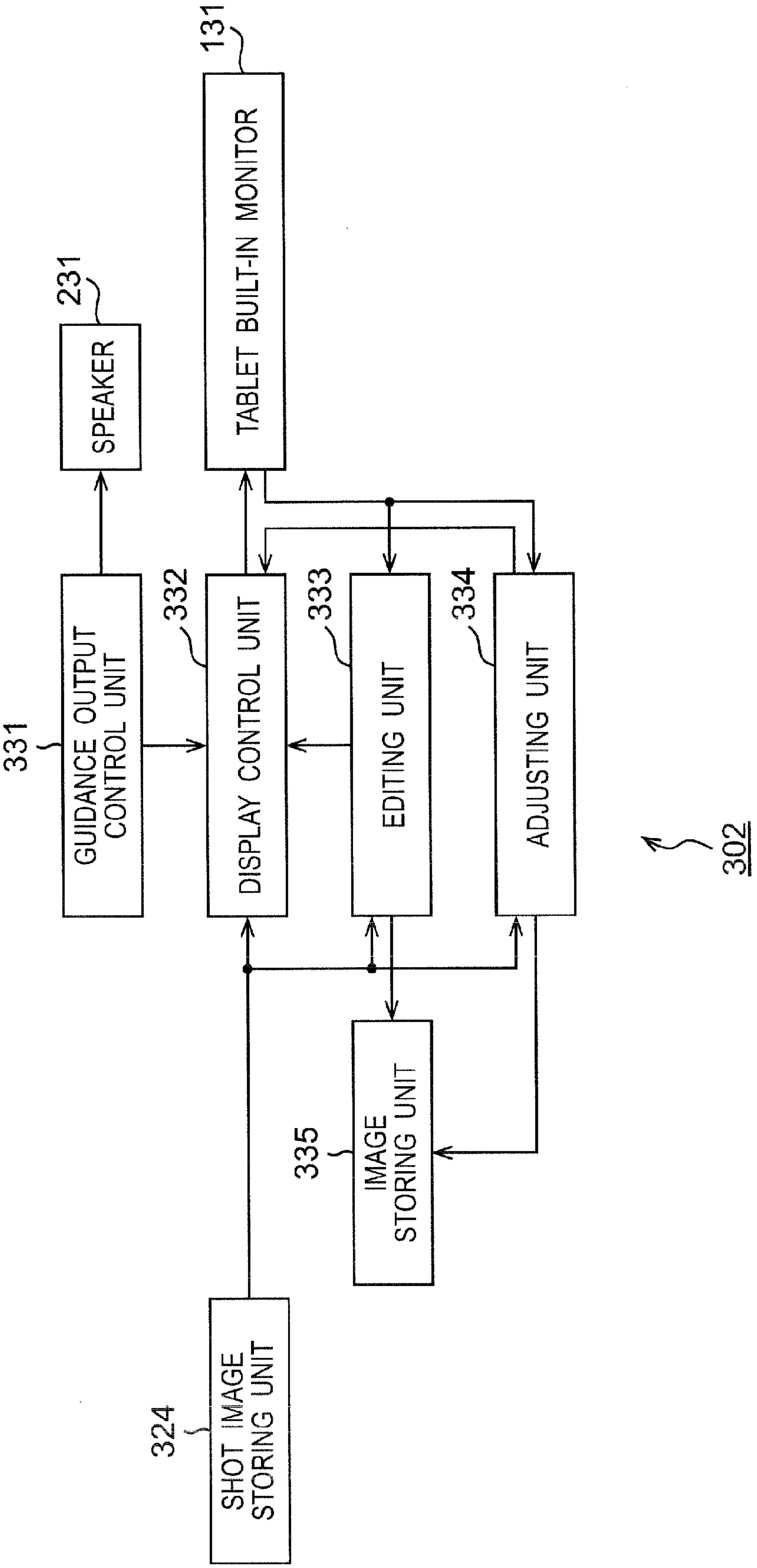
FIG. 15 is a block diagram illustrating an exemplary configuration of an image processing managing unit of FIG. 13.

FIG. 15 is a block diagram of an exemplary configuration of the image processing managing unit 302.

The image processing managing unit 302 includes a guidance output control unit 331, a display control unit 332, an editing unit 333, an adjusting unit 334, and an image storing unit 335.

The guidance output control unit 331 controls outputting of guidance for describing how to perform the editing and the adjustment, etc. The guidance output control unit 331 controls the display control unit 332 to display a screen for describing how to perform the editing and the adjustment and to output an audio from the speaker 231.

The display control unit 332 controls the display of the tablet built-in monitor 131. For example, when the user who has selected the normal course finishes the shooting, the display control unit 322 causes the tablet built-in monitor 131 to display thereon the editing screen. In addition, when the user who has selected the identification photograph course finishes the shooting, the display control unit 322 causes the tablet built-in monitor 131 to display thereon the adjustment screen.

The editing unit 333 performs editing (graffiti) of the shot image. The editing unit 333 performs the process when a user presenting in the image processing space A2-1 or the image processing space A2-2 is the user who has selected the normal course.

The editing of the shot image is performed according to the operation by the user, by combining the composite-use image such as hand-written characters and stamp images with the shot image, or the like. A signal indicating the content of the operation by the user is transmitted from the tablet built-in monitor 131. The result of the processing by the editing unit 333 is transmitted to the display control unit 332 and is displayed in the editing screen. The editing unit 333 outputs the edited image that is the edited shot image to the image storing unit 335.

The adjusting unit 334 adjusts the identification photograph image. The adjusting unit 334 performs the process when a user present in the image processing space A2-1 or the image processing space A2-2 is the user who has selected the identification photograph course.

The adjustment of the identification photograph image is performed according to the operation by the user, by changing the position of the object, the brightness thereof, the color of background image, etc. A signal indicating the content of the operation by the user is transmitted from the tablet built-in monitor 131. The result of the processing by the adjusting unit 334 is transmitted to the display control unit 332 and is displayed in the adjustment screen. The adjusting unit 334 outputs the adjusted identification photograph image to the image storing unit 335.

The image storing unit 335 stores the edited image transmitted from the editing unit 333 or the identification photograph image transmitted from the adjusting unit 334. At the start of the printing process, the images stored in the image storing unit 335 are read by the print managing unit 303.

Figure 16:
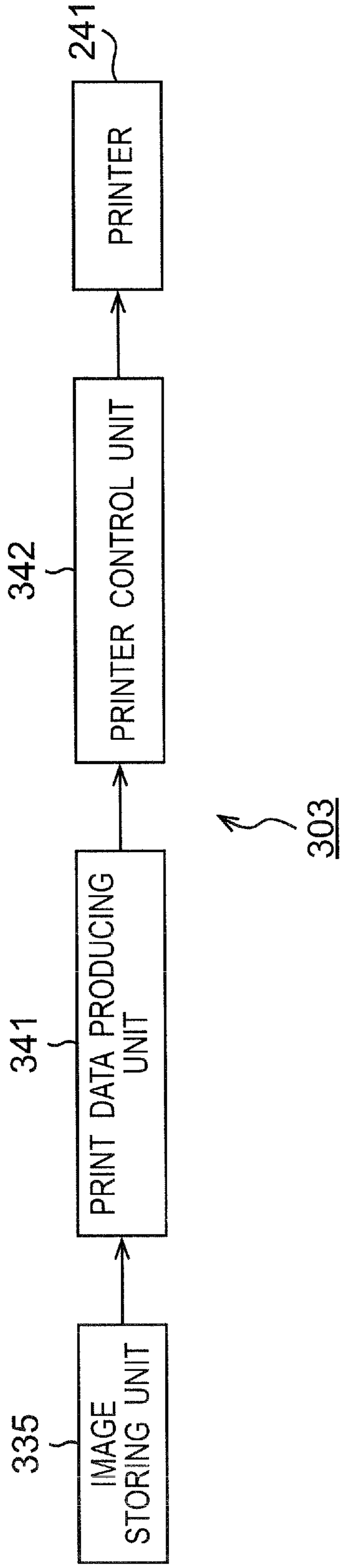
FIG. 16 is a block diagram illustrating an exemplary configuration of a print managing unit of FIG. 13.

FIG. 16 is a block diagram of an exemplary configuration of the print managing unit 303.

The print managing unit 303 includes a print data producing unit 341 and a printer control unit 342.

At the start of the printing process in the normal course, the print data producing unit 341 produces image data by reading the edited image stored in the image storing unit 335 and arranging the read edited image in a predetermined layout. At the start of the printing process in the identification photograph course, the print data producing unit 341 produces image data by reading the identification photograph image stored in the image storing unit 335 and arranging the read image in a predetermined layout. The print data producing unit 341 outputs the produced image data to the printer control unit 342 as print data.

The printer control unit 342 controls the printer 241 to print the images on the sticker sheet based on the print data produced by the print data producing unit 341.

Figure 17:
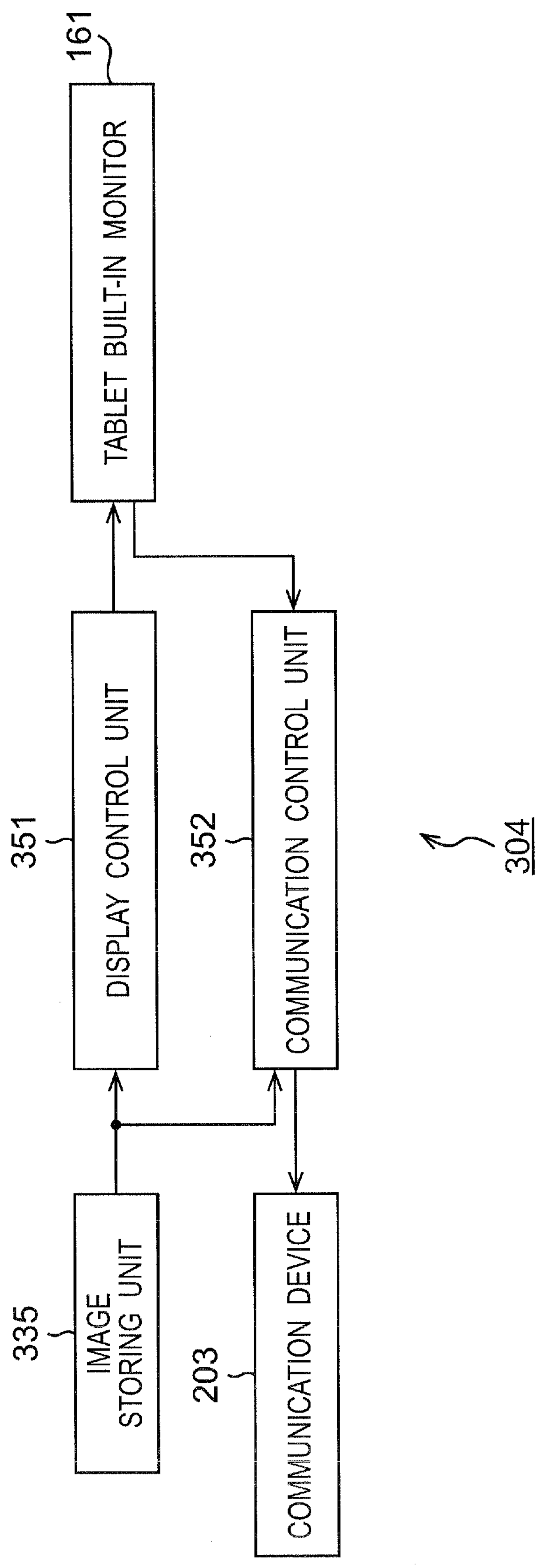
FIG. 17 is a block diagram illustrating an exemplary configuration of a post-editing service managing unit of FIG. 13.

FIG. 17 is a block diagram of an exemplary configuration of the post-editing service managing unit 304.

The post-editing service managing unit 304 includes a display control unit 351 and a communication control unit 352.

The display control unit 351 controls the display of the tablet built-in monitor 161. For example, when it is selected to use the function of to-mobile transmission, the display control unit 351 causes the tablet built-in monitor 161 to display thereon an input screen for an e-mail address of a mobile terminal used by the user.

The communication control unit 352 controls the communication device 203 to transmit the edited image or the identification photograph image to the server. The communication control unit 352 transmits the e-mail address input by the user to the server.

<Operation of Photograph Sticker Creating Apparatus>

An operation of the photograph sticker creating apparatus 1 having the above-described configuration will be described below.

[Sticker Creating Game Provision Process]

Figure 18:
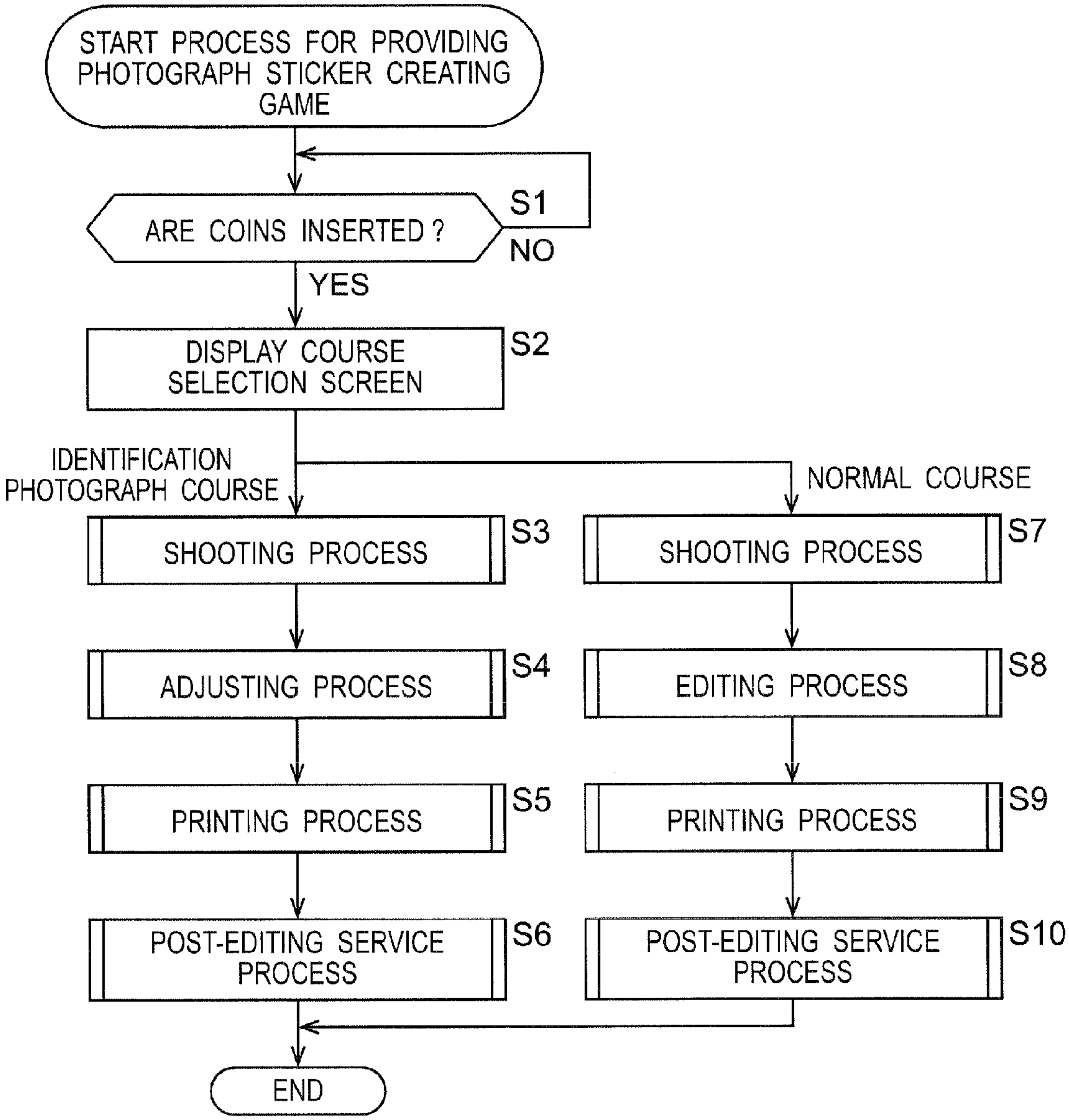
FIG. 18 is a flowchart for describing a sticker creating game process.

With reference to a flowchart of FIG. 18, a series of process steps of the photograph sticker creating apparatus 1 providing the sticker creating game will be described.

As step S1, the control device 201 of the photograph sticker creating apparatus 1 determines whether coins corresponding to the predetermined price are inserted, based on the signal transmitted from the coin processor 221, and stands by until determining that the coins are inserted.

When the control device 201 determines at step S1 whether the coins are inserted, and the display control unit 322 of the shooting managing unit 301 causes, at step S2, the touch panel monitor 92 to display thereon a course selection screen.

In this manner, in the photograph sticker creating apparatus 1, the course is selected after the coins are inserted as the charge. Even when the identification photograph image is provided in the identification photograph course, the price is same as the price for the case where the user plays in the normal course.

Figure 19:
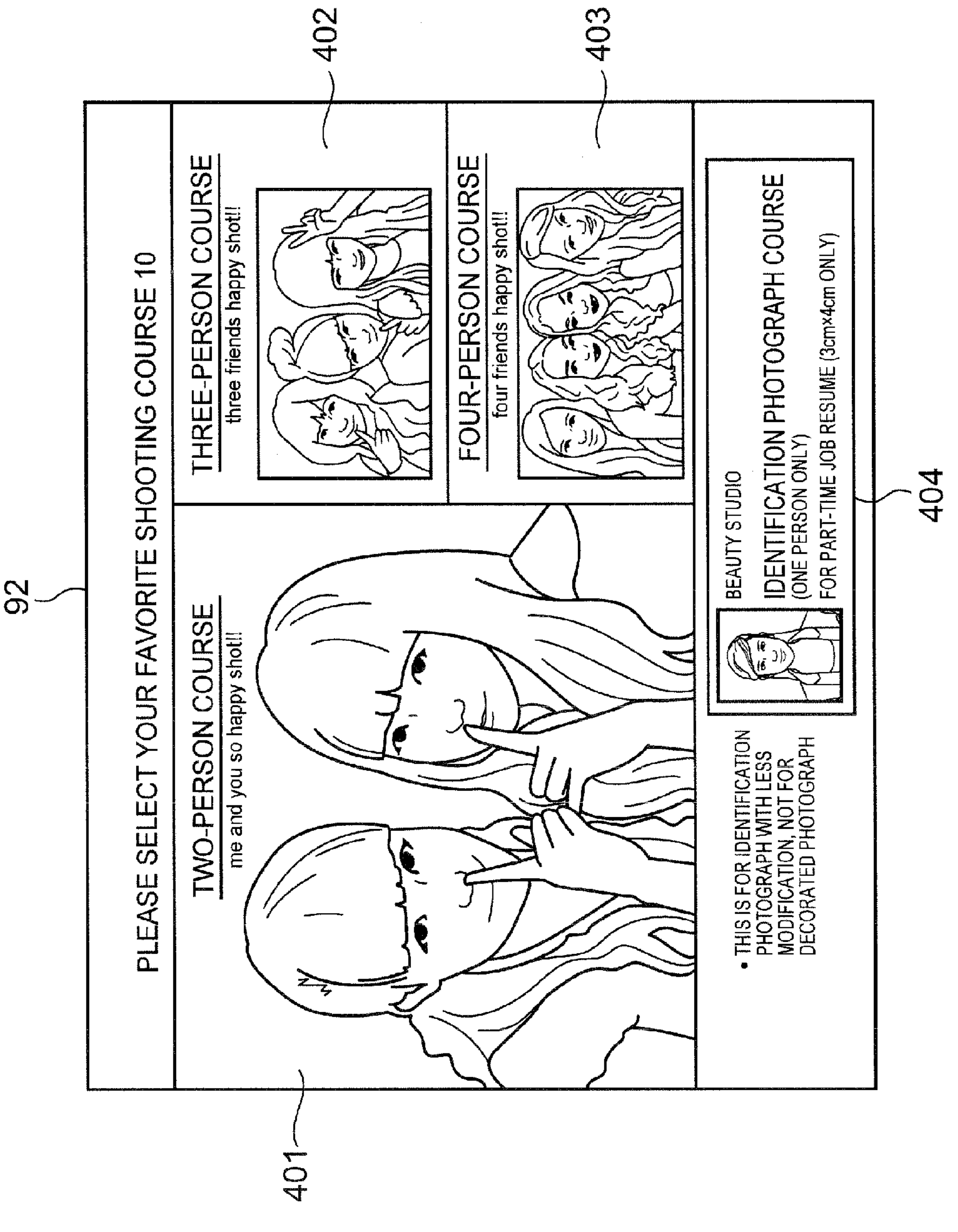
FIG. 19 is a drawing illustrating an example of a course selection screen.

FIG. 19 is a drawing illustrating an example of the course selection screen.

The message "PLEASE SELECT YOUR FAVORITE SHOOTING COURSE" is displayed in the upper portion of the course selection screen. A number displayed next to the message indicates a limited time period set for selecting a course.

In the left side of the middle row of the course selection screen, a two-person course selection button 401 is displayed that is a large and substantially square button to be operated to select the two-person course. A sample of an image, which was acquired when the shooting was performed in the two-person course, is displayed inside the two-person course selection button 401.

A three-person course selection button 402 and a four-person course selection button 403 are vertically arranged and displayed on the right side of the two-person course selection button 401, the three-person course selection button 402 being a rectangular button to be operated to select the three-person course, and the four-person course selection button 403 being a rectangular button to be operated to select the four-person course. One sample of an image, which was acquired when shooting was performed in the three-person course, is displayed inside the three-person course selection button 402. One sample of an image, which was acquired when shooting was performed in the four-person course, is displayed inside the four-person course selection button 403.

The display of the sample images enables the user to check the angle of view of the image acquired in each course. As shown in FIG. 19, the image acquired when a shooting course for larger number of persons is selected has a lager length in the horizontal direction than the length in the vertical direction, when comparing to the image acquired when a shooting course for smaller number of persons is selected.

An identification photograph course selection button 404 is displayed in a lower portion of the course selection screen, and is a button to be operated to select the identification photograph course. Inside the identification photograph course selection button 404, one sample of the identification photograph image displayed, as well as pieces of information informing that this course is intended for one person and that the identification photograph image is suitable for a resume (width×height is 3 cm×4 cm).

Figure 20:
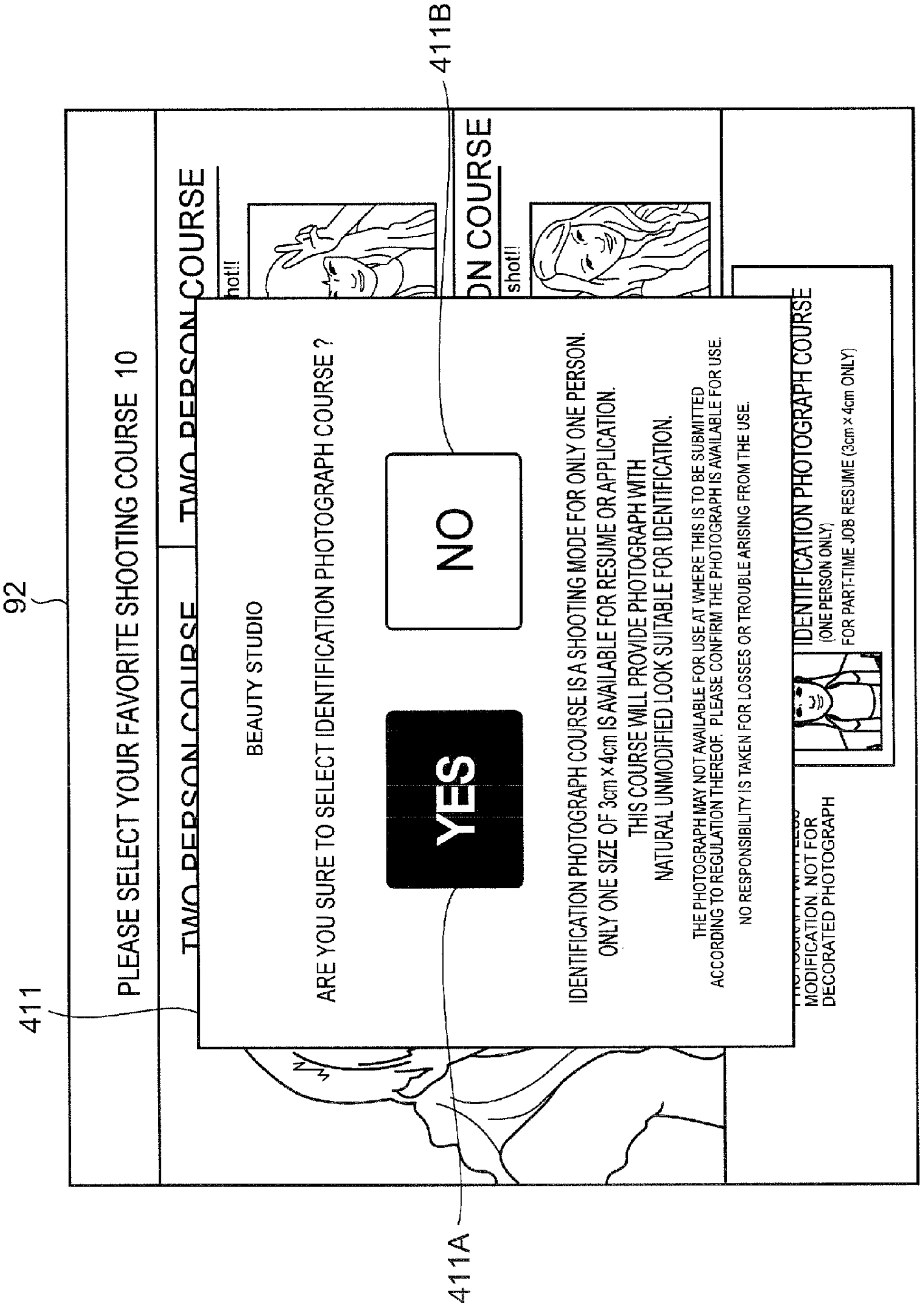
FIG. 20 is a drawing illustrating another example of the course selection screen.

FIG. 20 is a drawing illustrating an example of a pop-up window displayed and superimposed on the course selection screen when the identification photograph course selection button 404 is operated.

When the identification photograph course selection Button 404 is operated, a window 411 is displayed and superimposed on the course selection screen. A message is displayed in the window 411 to ask whether to start the game in the identification photograph course. A button 411A and a button 411B are displayed being arranged side by side under the message, the button 411A being a YES button to be operated to start the game in the identification photograph course, and the button 411B being a NO button to be operated to reselect a course.

Pieces of information are displayed under the button 411A and the button 411B, that indicates that the identification photograph course is a course intended for one person and that the size of the identification photograph image is the size available for a resume or an application form (width×height is 3 cm×4 cm). In addition, descriptions on the picture condition of the identification photograph image are displayed. In this case, other sizes may be displayed as sizes available for a resume or an application form, to enable the user to select other sizes.

When the button 411A which is a YES button is operated, the game in the identification photograph course is started. On the other hand, when the button 411B which is a NO button is operated, the window 411 is closed and the display on the touch panel monitor 92 returns to the state where the course selection screen of FIG. 19 is displayed.

Displaying the confirmation screen when the identification photograph course is selected prevents the user, who intends to make an edited image in the normal course, from wrongly selecting the identification photograph course.

The user selecting the identification photograph course can be notified the size and the like of the identification photograph image acquired by pursuing the game.

The information representing the course selected by the user by using the course selection screen is transmitted to the sequence managing unit 305. When the limited time period elapses with no course selected, for example, the two-person course is automatically selected.

When the identification photograph course is selected by operating the identification photograph course selection button 404 in the course selection screen and subsequently operating the button 411A that is the YES button of FIG. 20, the shooting managing unit 301 performs, at step 93, the shooting process in the identification photograph course.

At step 94, the image processing managing unit 302 controls either one of the image processing section 209A and the image processing section 209B corresponding to an image processing space which is selected from between the image processing space A2-1 and the image processing space A2-2 to be the destination of the move by the user who finished the shooting, to perform the adjusting process in the identification photograph course. In the adjusting process, a shot image to be used as an identification photograph image is selected, and the adjustment is performed for the selected identification photograph image.

At step S5, the print managing unit 303 performs the printing process in the identification photograph course. By the printing process, the identification photograph image after the adjustment is printed on a sticker sheet in a predetermined layout.

At step S6, the post-editing service managing unit 304 performs the post-editing service process for the user waiting for the completion of the printing. The post-editing service process is performed in parallel with the printing process. The post-editing service managing unit 304 performs a process, as the post-editing service process, for transmitting the identification photograph image to a mobile terminal.

When the printing is completed, the sticker sheet with the identification photograph images printed thereon is ejected to the sticker sheet ejecting opening 163. The user takes the sticker sheet out from the sticker sheet ejecting opening 163, and a series of games ends. The details of each of the processes performed when the identification photograph course is selected will be described later.

On the other hand, when the normal course is selected by operating the two-person course selection button 401, the three-person course selection button 402, or the four-person course selection button 403 in the course selection screen, the shooting managing unit 301 performs, at step S7, the shooting process in the normal course.

At step S8, the image processing managing unit 302 controls the image processing section 209A or the image processing section 209B corresponding to an image processing space, which is selected from between the image processing space A2-1 and the image processing space A2-2 to be the destination of the move by the user who finished the shooting, to perform the editing process in the normal course. In the editing process, the editing is performed on the image to be edited, while the image to be edited is appropriately switched among a plurality of shot images.

At step S9, the print managing unit 303 performs the printing process in the normal course. By the printing process, the plurality of edited images are printed on a sticker sheet in a layout selected by the user.

At step S10, the post-editing service managing unit 304 performs the post-editing service process for the user waiting for the completion of the printing. The post-editing service managing unit 304 performs a process, as the post-editing service process, for transmitting the edited images to a mobile terminal.

When the printing is completed, the sticker sheet with the edited images printed thereon is ejected to the sticker sheet ejecting opening 163. The user takes the sticker sheet out from the sticker sheet ejecting opening 163 and a series of games ends. The details of each of the processes performed when the normal course is selected will be described later.

The processes are performed appropriately in parallel, in accordance with the number of users utilizing the photograph sticker creating apparatus 1, the timing of start of the use of the photograph sticker creating apparatus 1, etc. The timing of the every process is controlled by the sequence managing unit 305.

As described above, the user can perform the photographing of an identification photograph image by using the photograph sticker creating apparatus 1, which is installed in a game arcade, and so on. In addition, the user can perform the photographing of the identification photograph image by using the opportunity to play the game for obtaining a sticker sheet with edited images printed thereon. This eliminates the need to visit a place where a dedicated apparatus is installed or a photograph studio, avoiding bothering the user.

The main users of the photograph sticker creating apparatus 1 are female junior-high and high school students, while some female junior-high and high school students think that it is hard for them to enter a dedicated apparatus for photographing an identification photograph. Enabling the photographing of an identification photograph image by the photograph sticker creating apparatus 1 installed in a game arcade, etc., allows the user to perform lightheartedly the photographing of an identification photograph image.

The identification photograph image can be shot for the price same as the price for the game for obtaining a sticker sheet with edited images printed thereon. This also leads to the light-hearted shooting of the identification photograph image.

Further, a user, who is accustomed to the game for receiving the sticker sheet with edited images printed thereon, can shoot and adjust the identification photograph image while moving the places similarly to the game. Therefore, such a user can pursue the photographing, etc., of the identification photograph image without having any difficulty in operating the apparatus. The user has little unwillingness against continuously staying in the same space, because the user can perform the adjustment after the shooting in the space different from the photographing space A1.

The photographing space A1 is a large space where multiple persons are able to enter and perform the shooting. Since such a large space is secured, the unwillingness against entering this space is little, compared to the case where the shooting is performed in a small space where one person barely able to scarcely enter.

[Shooting Process in Identification Photograph Course]

Figure 21:
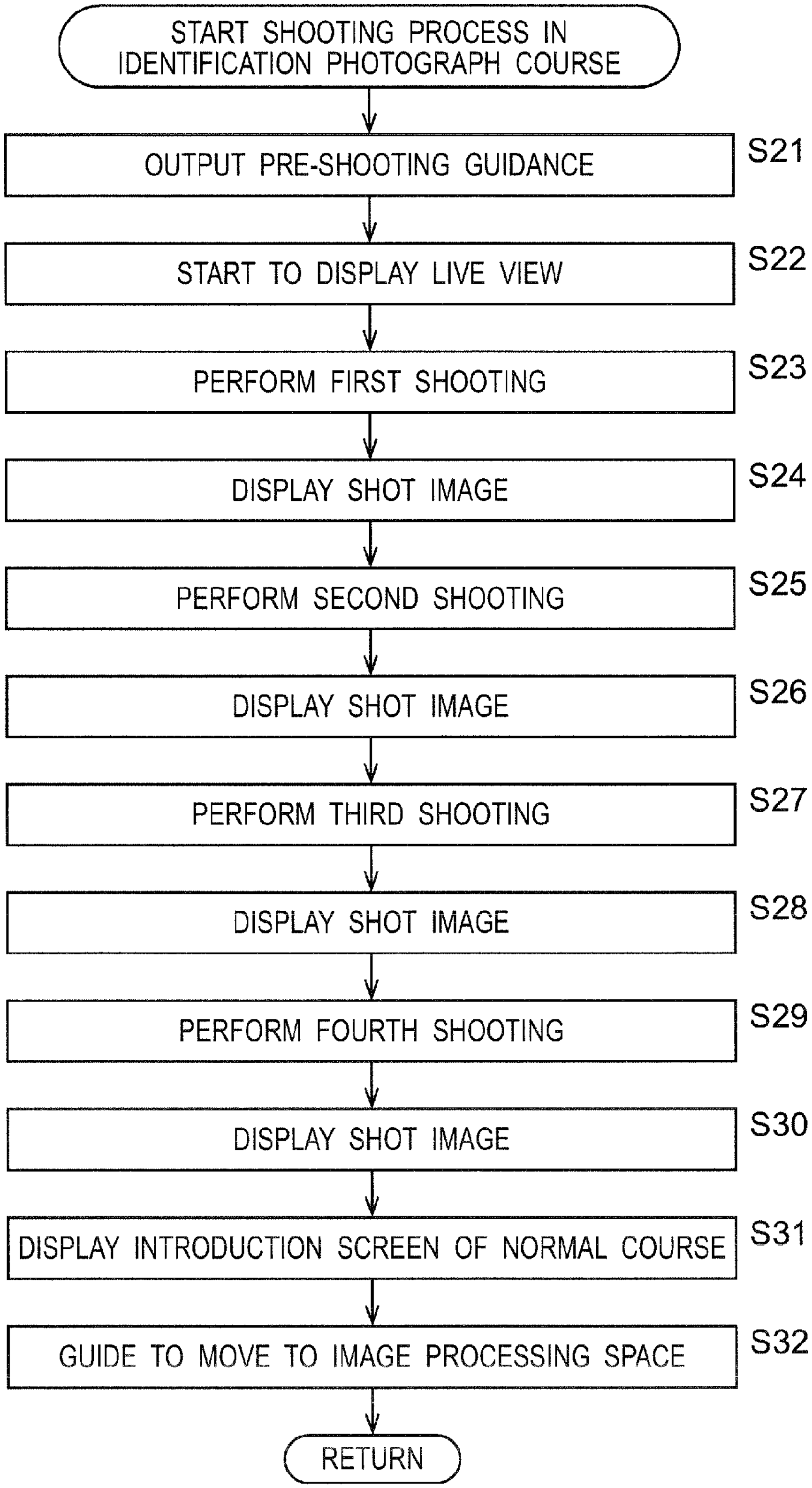
FIG. 21 is a flowchart for describing a shooting process in an identification photograph course performed at step S3 of FIG. 18.

With reference to a flowchart of FIG. 21, the shooting process in the identification photograph course performed at step S3 of FIG. 18 will be described below.

At step S21, the guidance output control unit 321 of the shooting managing unit 301 controls the display control unit 322 and outputs the pre-shooting guidance by causing the touch panel monitor 92 to display the screen for describing how to perform the shooting, etc.

Figure 22:
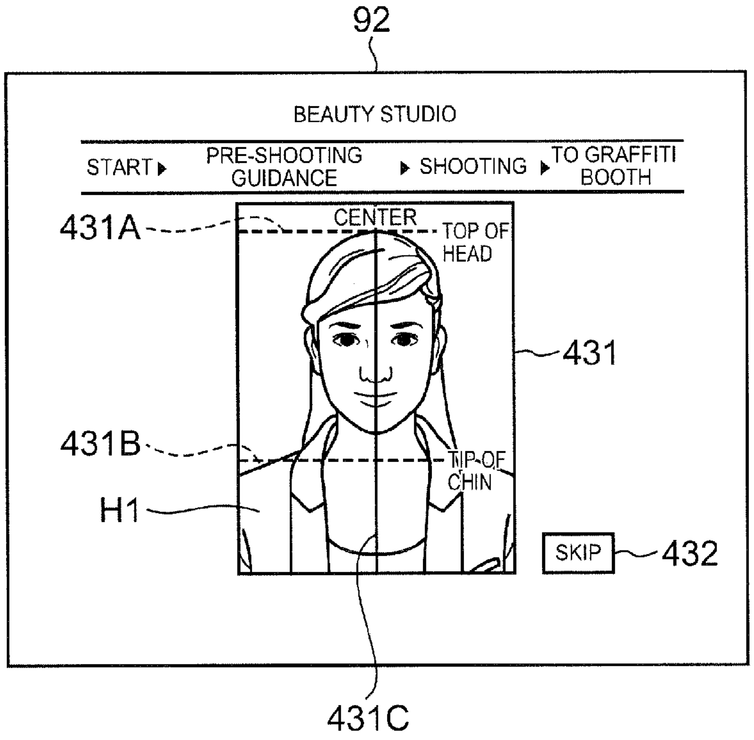
FIG. 22 is a drawing illustrating an example of a pre-shooting guidance screen.

FIG. 22 is a drawing illustrating an example of a pre-shooting guidance screen.

An image display area 431, which is a longitudinally elongated rectangular area, is disposed at the substantial center of the pre-shooting guidance screen. The ratio width: height of the image display area 431 is, for example, 3:4 which is same as the ratio of the identification photograph image. As described above, the size width×height of the identification photograph image is 3 cm×4 cm.

In the image display area 431 in the pre-shooting guidance screen, a moving image showing a person H1 to be a model is first displayed. In the example of FIG. 22, a region from substantially the person's chest up to a position somewhat above the head of the person H1 is displayed. The moving image displayed in the image display area 431 shows the person H1 adjusting the person's clothes.

During the moving image is displayed, the guidance output control unit 321 outputs an audio massage from the speaker 224, such as, for example, "Please check your clothes first. Set your forelock not to hang in the eyes, and check your hair style. Check closely up to your collar, and straighten your clothes."

Subsequently to the moving image showing the person H1 adjusting the person's clothes, in the image display area 431, a still image of a region from substantially the person's chest up to the position somewhat above the head of the person H is displayed. Alternatively to the still image, a moving image of the person H1 adjusting the position of the head, and so on, may be displayed.

As shown in FIG. 22, guiding lines indicating rough standards of the position and size of the face are displayed and superimposed on the still image of the person H1. The guiding lines include a horizontal line 431A representing the height to be a rough standard of the position of the highest point of the head (the top of the head), a horizontal line 431B representing the height to be a rough standard of the position of the chin, and a vertical line 431C representing the position to be a rough standard of the center of the face in the horizontal direction. In the display of the guiding lines, at least either one of a combination of the horizontal line 431A and the horizontal line 431B each representing the rough standard of the position in the up-and-down direction, and the vertical line 431C representing the rough standard of the position in the right-and-left direction (the horizontal direction) may be displayed.

The still image displayed in the image display area 431 is a still image of the person H1 that has the vertical line 431C run through the center of the face, that has the position of the top of the head positioned near the horizontal line 431A, and that has the position of the lowest point of the chin positioned near the horizontal line 431B.

During the still image is displayed, the guidance output control unit 321 causes the speaker 224 to output an audio message, such as, for example, "Next, please position the top of your head and the tip of your chin on the red guiding lines. Straighten your back and set your shoulders to be horizontal. Take care not to get off-centered. Draw your chin in a little. Pull up your mouth corners, open your eyes wide, and relax and look at the camera."

On a side of the image display area 431, pieces of textural information are appropriately displayed as descriptions of the points regarding the shooing, such as "Adjust your forelock", "Straighten your collar", "Straighten your back and set your shoulders to be horizontal", "Draw your chin in a little", "Pull up your mouth corners", and "Open your eyes wide".

A SKIP button 432 is displayed in the lower right of the image display area 431, and is operated to terminate the pre-shooting guidance.

When the SKIP button 432 is operated or when the pre-shooting guidance completely comes to an end, the display control unit 322 starts to display the live view at step S22. The shooting of the moving image by the camera 91 is started, and the moving image showing the user acquired by the shooting is transmitted from the camera control unit 323 to the display control unit 322.

Figure 23:
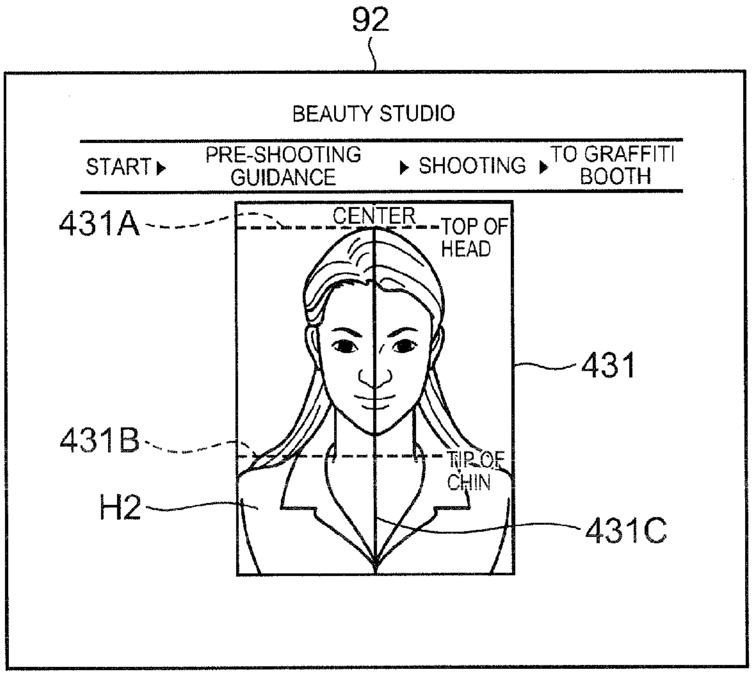
FIG. 23 is a drawing illustrating an example of a live view display screen.

FIG. 23 is a drawing illustrating an example of a live view display screen.

In the image display area 431 disposed at the substantial center of the live view display screen, the moving image showing a person H2 is displayed in real time. The person H2 is the user himself/herself. The user can check the user's clothes, etc., by looking at the picture condition of the user displayed in the image display area 431.

In the image display area 431, the guiding lines are displayed therein superimposed on the moving image of the user. The guiding lines include the horizontal line 431A, the horizontal line 431B, and the vertical line 431C which are same as those displayed in the pre-shooting guidance screen. The user will adjusts the position of the user's face by changing the standing position of the user to the front and back and right and left directions, so that the vertical line 431C run through the center of the face, the horizontal line 431A is on the top of the head of the user, and that the horizontal line 431B is on the tip of the chin of the user. The angle of the camera 91 is adjustable in the up-and-down direction (the vertical direction). The user can adjust the position by adjusting the angle in the up-and-down direction of the camera 91 with reference to the guiding lines.

The guiding lines are displayed superimposed on the live view as the rough standards of the position and size of the face, and therefore, this allows the user to confirm the standing position appropriate for performing the shooting.

Though the lines indicating the rough standards of the position and the size of the face are displayed as the guiding lines, the images showing the rough standards of the position and the size of the face are not limited to the images of the straight lines. For example, curved lines may indicate the rough standards of the position and the size of the face, or an image having a predetermined shape such as an oval shape may indicate the rough standards.

Though the images indicating the rough standards of the position and the size of the face are displayed, images may be displayed that indicate the position and the size of a portion of the person other than the face. For example, images may be displayed that indicate the positions and the sizes of the shoulders, the positions and the sizes of the eyes, and the position and the size of the nose.

Though the images which are the rough standards of both of the position and the size of the face are displayed, an image which is the rough standard of either one of the position and the size thereof may be displayed.

Because the shooting is performed with the user standing up, it is difficult for the user to accurately adjust the position and the size of the person (the user himself/herself) even if the user watches the live view as shown in FIG. 23. As described later, the adjustment of the position and size of the person shown in the shot image is performed when in the adjustment of the identification photograph image, and this adjustment finally determines the image.

First stage adjustment of the position and the size of the person, which is performed while the person is watching the live view during the shooting, is coarse adjustment performed when the user keeps standing up, and second stage adjustment performed during the adjustment of the identification photograph image is the final fine adjustment. During the shooting, the user only need to adjust the position at which the user stands up such that the user is shown having an approximate size at an approximate position.

The range of shooting (the angle of view) of the camera 91 is set to be wider than the range displayed in the image display area 431. A predetermined region in the moving image shot by the camera 91 is cut off and is used for the display in the image display area 431.

During the display of the live view, a sound guidance is also output that advise the user to adjust the user's clothes and to adjust the position of the face. After the live view is displayed for a predetermined time period, a countdown to perform shooting is started. The countdown is started, for example, 10 sec before the timing of the shooting.

Figure 24:
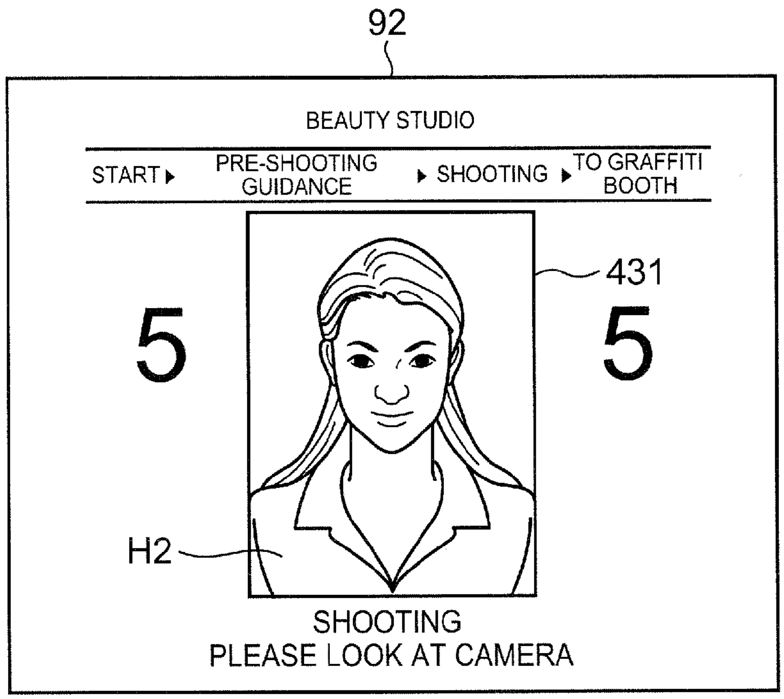
FIG. 24 is a drawing illustrating an example of the live view display screen.

FIG. 24 is a drawing illustrating an example of the live view display screen that includes the display of the countdown.

As shown in FIG. 24, when the countdown is started, the guiding lines are erased, and the number representing the time to the shooting is displayed in synchronization with the countdown by the audio. A message "SHOOTING. PLEASE LOOK AT CAMERA." is displayed under the image display area 431.

In the state that such a live view display screen is displayed on the touch panel monitor 92, when it comes to time for the shooting, the camera control unit 323 performs, at step S23, a first shooting of the still image.

A configuration may be adopted such that the time period from the start of the live view to the first shooting is longer for the identification photogram course than that for the normal course. If the display of the live view display screen depicted in FIG. 23 is started, the camera control unit 323 performs the first shooting after passing the time period longer than the time period up to the first shooting in the normal course.

The degree of freedom of the clothes, the position of the object, or the like is lower for the identification photograph image than that for the edited image acquired in the normal course, because of their natures. Securing the longer time to the first shooting after the start of the display of the live view permits the user performing the shooting in the identification photograph course to take a longer time to adjust the user's clothes and adjust the position to stand up.

The camera control unit 323 outputs the shot image that is the still image acquired by the first shooting to the display control unit 322, and also outputs it to the shot image storing unit 324 to cause the shot image storing unit 324 to store the shot image.

At step S24, the camera control unit 323 causes the touch panel monitor 92 to display thereon the result of the first shooting.

Figure 25:
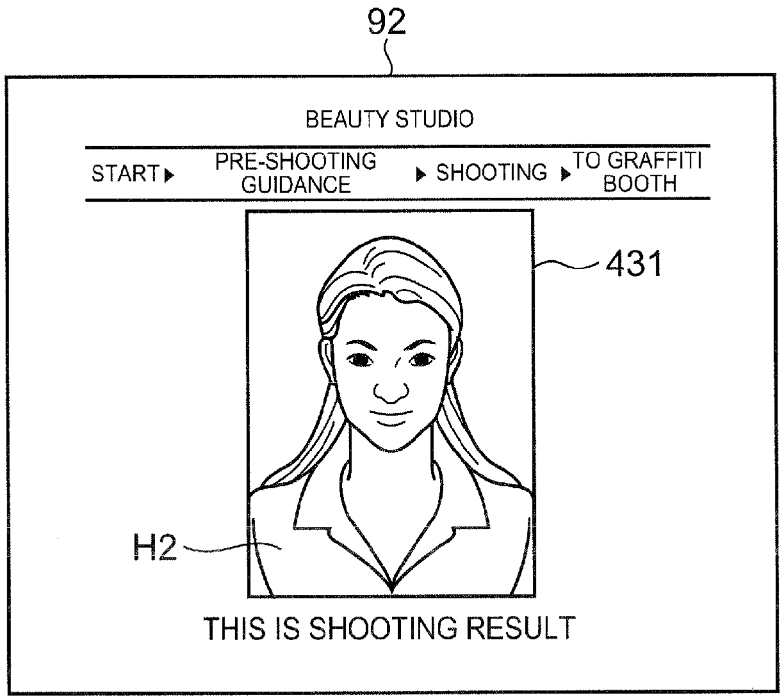
FIG. 25 is a drawing illustrating an example of a shooting result confirmation screen.

FIG. 25 is a drawing illustrating an example of a shooting result confirmation screen.

In the image display area 431 of the shooting result confirmation screen, the shot image acquired by the immediately previous shooting is displayed. A message "THIS IS SHOOTING RESULT." is displayed under the image display area 431. The user can confirm the shot image that is shot immediately previously, from the shooting result confirmation screen.

After the shooting result confirmation screen is displayed for a predetermined time period, the display of the live view is restarted and second and subsequent shootings are performed.

When the display control unit 322 displays the live view display screens of FIG. 23 and FIG. 24 and the timing for the second shooting comes, the camera control unit 323 performs, at step S25, the second shooting for a still image. The camera control unit 323 outputs the shot image acquired by the shooting to the display control unit 322, and also outputs it to the shot image storing unit 324 to cause the shot image storing unit 324 to store the shot image.

At step S26, the display control unit 322 causes the touch panel monitor 92 to display thereon the shooting result confirmation screen displaying the shot image acquired by the second shooting.

The above described processes are repeated a predetermined number of shootings. When the number of shootings is set to be, for example, four, the camera control unit 323 performs, at step S27, a third shooting, and the display control unit 322 causes, at step S28, the touch panel monitor 92 to display thereon the shooting result confirmation screen including the shot image acquired by the third shooting.

The camera control unit 323 performs, at step S29, a fourth shooting, and the display control unit 322 causes, at step S30, the touch panel monitor 92 to display thereon the shooting result confirmation screen including the shot image acquired by the fourth shooting.

A configuration may be adopted such that a time period from the immediately previous shooting to the next shooting, that is, a shooting interval is longer in the identification photograph course than that in the normal course. The display of the live view in the time period between the immediately previous shooting and the next shooting permits the user to take a longer time to adjust the user's clothes and adjust the position to stand at to a proper position.

At step S31, the display control unit 322 causes the touch panel monitor 92 to display thereon an introduction screen of the normal course. In the introduction screen of the normal course, an image presenting the content of the editing of the shot image, etc., capable of being performed in the normal course is displayed.

At step S32, the display control unit 322 guides the user who finished the shootings, to move to the image processing space A2-1 or the image processing space A22. The guiding of the move to the image processing space A2-1 or the image processing space A2-2 is performed by causing the touch panel monitor 92 to display thereon the screen, or by outputting an audio message from the speaker 224.

The user will exit the photographing space A1, move to the guided one of the image processing spaces, and adjust the identification photograph image. Thereafter, the procedure returns to step S3 of FIG. 18 and the subsequent processes are performed.

[Adjusting Process in Identification Photograph Course]

With reference to a flowchart of FIG. 26, the adjusting process for the identification photograph image performed at step S4 of FIG. 18 will be described below.

At step S41, the display control unit 332 of the image processing managing unit 302 reads and acquires, for example, four shot images acquired by the shooting process from the shot image storing unit 324, and causes the tablet built-in monitor 131 to display thereon an image selection screen. The image selection screen is a screen used for selecting one shot image as an identification photograph image from among the four shot images.

Figure 27:
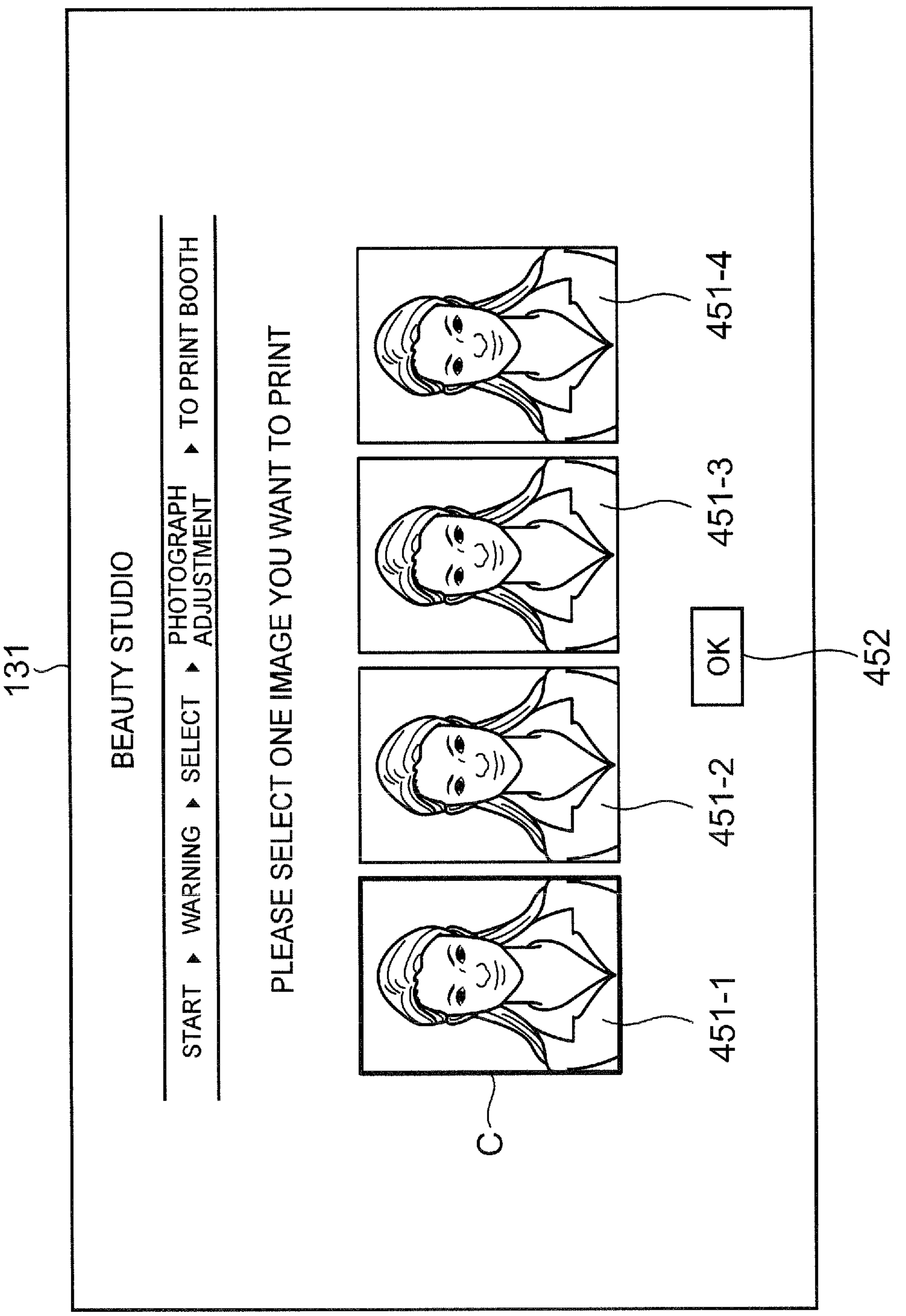
FIG. 27 is a drawing illustrating an example of an image selection screen.

FIG. 27 is a drawing illustrating an example of the image selection screen.

A message "PLEASE SELECT ONE IMAGE YOU WANT TO PRINT" is displayed at the center of the upper portion of the image selection screen for requiring the selection of an image. Under the message, the four shot images 451-1 to 451-4 are displayed arranged in raw in the order of the shooting timing. The shot images 451-1 to 451-4 acquired by the four shootings are four types of still image each having a composition different from each other.

The user selects a favorite shot image by touching the image selection screen using the stylus pen 132A or the stylus pen 132B. In the example of FIG. 27, the shot image 451-1 among the shot images 451-1 to 451-4 is currently selected and the frame of the shot image 451-1 is displayed in an emphasized manner by a cursor C.

An OK button 452 is displayed under the shot images 451-1 to 451-4 that is operated when a shot image is determined to be used as the identification photograph image.

Figure 28:
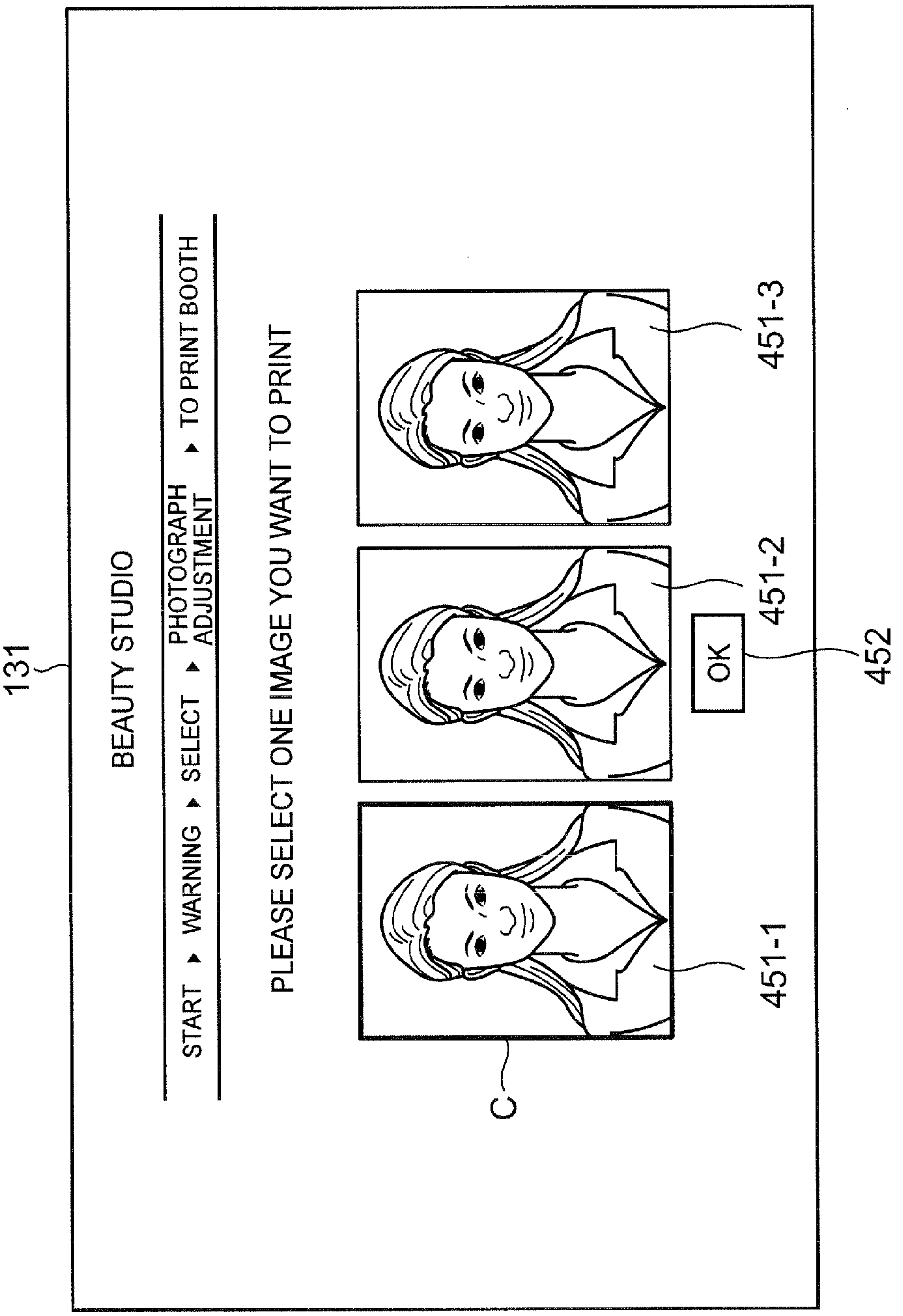
FIG. 28 is a drawing illustrating another example of the image selection screen.

FIG. 28 is a drawing illustrating an example of the image selection screen used when the number of shot images is three.

When the number of shootings in the shooting process is three, the user selects one shot image to be the identification photograph image from among the three shot images by using the image selection screen of FIG. 28.

As described above, the number of shootings can be set appropriately. The number of shot image to be determined as the identification photograph image is not limited to one, and a plurality of shot images may be selectable as identification photograph images.

When one shot image is selected from the image selection screen and the OK button 452 is operated, the display control unit 332 causes, at step S42, the tablet built-in monitor 131 to display thereon a warning screen that is a screen showing various types of summarized caution on the identification photograph image.

FIG. 29 is a drawing illustrating an example of the warning screen.

As shown in FIG. 29, caution messages are displayed in the warning screen regarding the usage of the identification photograph image, the content of the correction (adjustment) of the identification photograph image, the type of identification photograph image printed on the sticker sheet, the type of printing medium used to print the identification photograph image, and the color taste of the images actually printed.

A SKIP button 461 is displayed under the various types of caution messages, and is operated when the display of the warning screen is terminated.

When the SKIP button 461 is operated or when a predetermined time period elapses from when the waning screen is displayed, the guidance output control unit 331 controls, at step S43, the display control unit 322 to output a pre-adjustment guidance by causing the tablet built-in monitor 131 to display thereon a screen for describing how to adjust the identification photograph image, etc.

Figure 30:
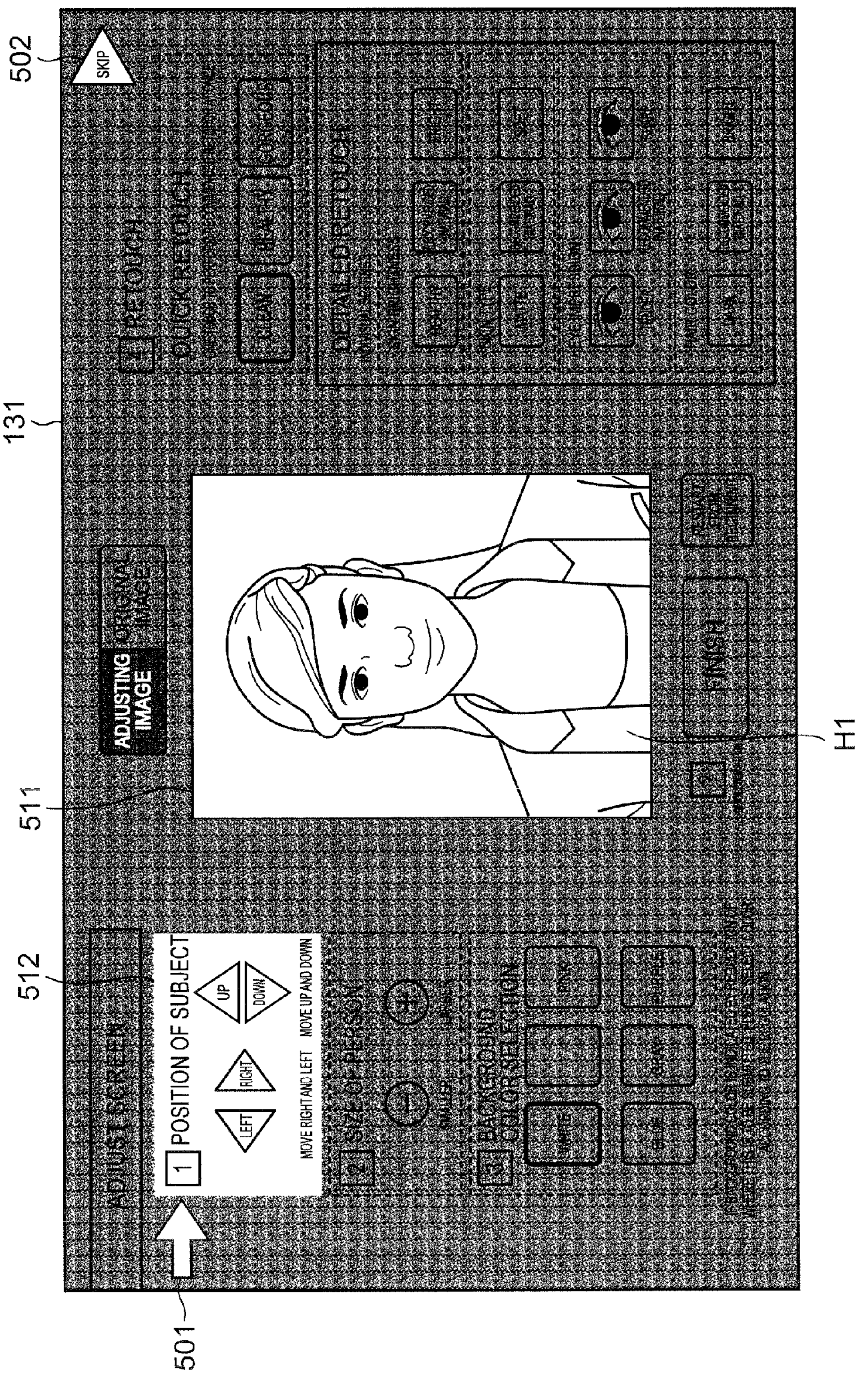
FIG. 30 is a drawing illustrating an example of a pre-adjustment guidance screen.

FIG. 30 is a drawing illustrating an example of the pre-adjustment guidance screen.

The pre-adjustment guidance screen is a screen, in which only a portion concerning the function to be described on the overall adjustment screen is displayed in color and the other portion is displayed in a grayout state.

In the example of FIG. 30, an adjusted image display area 511 and a button area 512 are displayed in color. The adjusted image display area 511 is a display area for the identification photograph image to be adjusted. The button area 512 is an area where buttons are displayed therein, and are used to adjust the position of the person. Because the pre-adjustment guidance is currently presented, the still image showing the person H1 who is the model is displayed on the adjusted image display area 511.

In the example of FIG. 30, an arrow image 501 pointing the button area 512 indicates that the adjustment function for the position is currently described that is performed by using the buttons displayed in the button area 512. An audio message "One, adjustment of a position of the person", etc., are output from the speaker 231 by the guidance output control unit 331 during the display of FIG. 30. For example, the adjustment of the identification photograph image is performed in order of the adjustment of the position of the person, the adjustment of the size of the person, the adjustment of the color of the background, and the adjustment of the picture condition. Not all these four types of adjustment may be performed and at least any one of the four types of adjustment may be performed. Other types of adjustment may be performed, such as adjustment of inclination of the person shown in the identification photograph image.

In the pre-adjustment guidance screen, the arrow image 501 moves in synchronous with the function being currently described, and the area displayed in color is changed in the order of an area including buttons displayed therein that are used to adjust the size of the person, an area including buttons displayed therein that are used to adjust the color of the background, and an area including buttons displayed therein that are used to adjust the picture condition.

In response to the changing of the area to be displayed in color, the speaker 231 outputs audio messages such as "Two, adjustment of a size of the person", "Three, selection of a background color", and "Four, adjustment of picture conditions." A SKIP button 502 to be operated to terminate the pre-adjustment guidance is also displayed in the upper right portion of the pre-adjustment guidance screen.

When the SKIP button 502 is operated or when the pre-adjustment guidance completed, the display control unit 332 causes, at step S44, the tablet built-in monitor 131 to display thereon the adjustment screen. The pre-adjustment guidance is also terminated when an operation is performed by pressing the pre-adjustment guidance screen by using the stylus pen 132A or the stylus pen 132B, without using the SKIP button 502.

Figure 31:
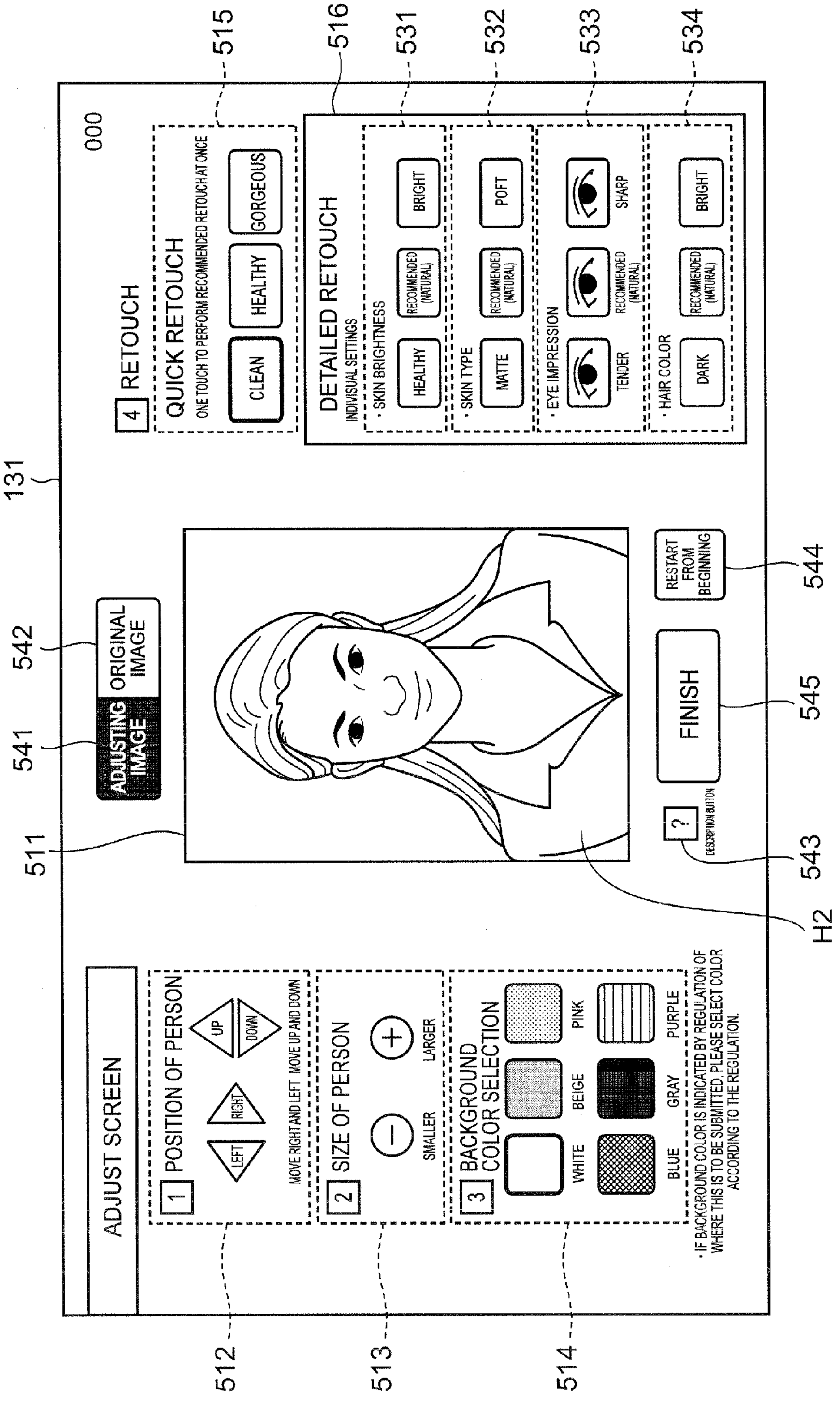
FIG. 31 is a drawing illustrating an example of an adjustment screen.

FIG. 31 is a drawing illustrating an example of the adjustment screen.

In adjusted image display area 511 at the substantial center of the adjustment screen, the identification photograph image showing the user (the person H2) is displayed. The identification photograph image displayed in the adjusted image display area 511 is the one shot image selected from among the four shot images in the image selection screen. The content of the adjustment performed using the various types of buttons in the adjustment screen is reflected in real time on the display of the identification photograph image in the adjusted image display area 511.

On the left side of the adjusted image display area 511, the button area 512, a button area 513 which is an area displaying buttons used to adjust the size of the person, and a button area 514 which is an area displaying buttons used to adjust the color of the background are displayed.

On the other hand, on the right side of the adjusted image display area 511, a button area 515 which is an area displaying buttons used for quick retouching, and a button area 516 which is an area displaying buttons used for detailed retouching are displayed. The button area 515 and the button area 516 are the areas displaying the buttons used to adjust the picture condition.

Figure 32:
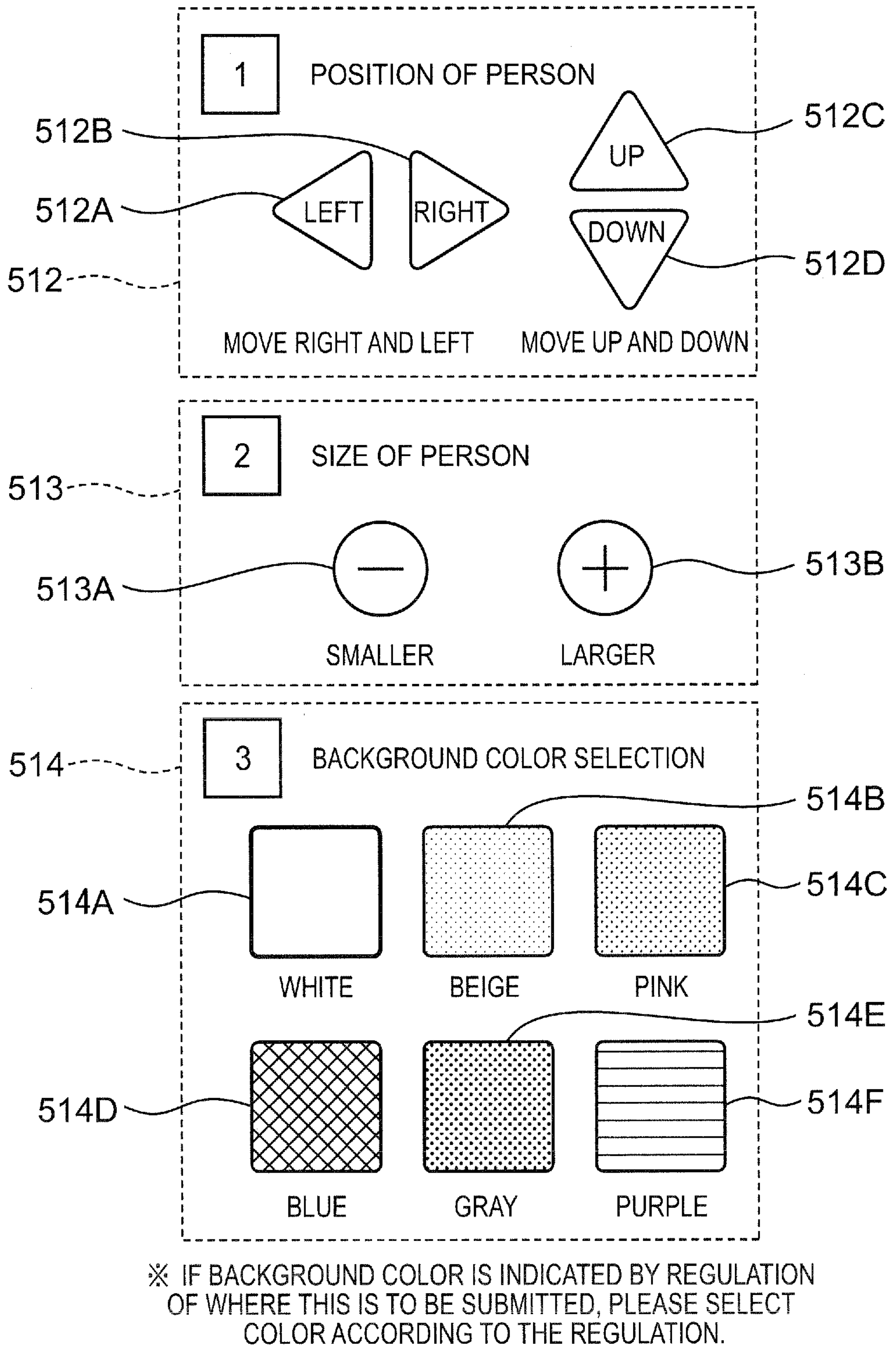
FIG. 32 shows an enlarged view of a portion of the adjustment screen of FIG. 31.

FIG. 32 shows an enlarged view of the button area 512, the button area 513, and the button area 514 of FIG. 31.

The button area 512 has a left button 512A, a right button 512B, an up button 512C, and a down button 512D displayed therein. The left button 512A is the button operated when the position of the person is moved leftward. The right button 512B is the button operated when the position of the person is moved rightward. The up button 512C is the button operated when the position of the person is moved upward. The down button 512D is the button operated when the position of the person is moved downward. The position of the person moves by a predetermined distance every time the button displayed in the button area 512 is pressed.

The button area 513 has a minus button 513A and a plus button 513B displayed therein. The minus button 513A is the button operated when the size of the person is reduced. The plus button 513B is the button operated when the size of the person is increased. The size of the person is varied by a predetermined amount every time the button displayed in the button area 513 is pressed.

The adjustment using the buttons displayed in the button area 512 and the buttons displayed in the button area 513 is the second stage adjustment for the position and the size of the person.

Figure 33:
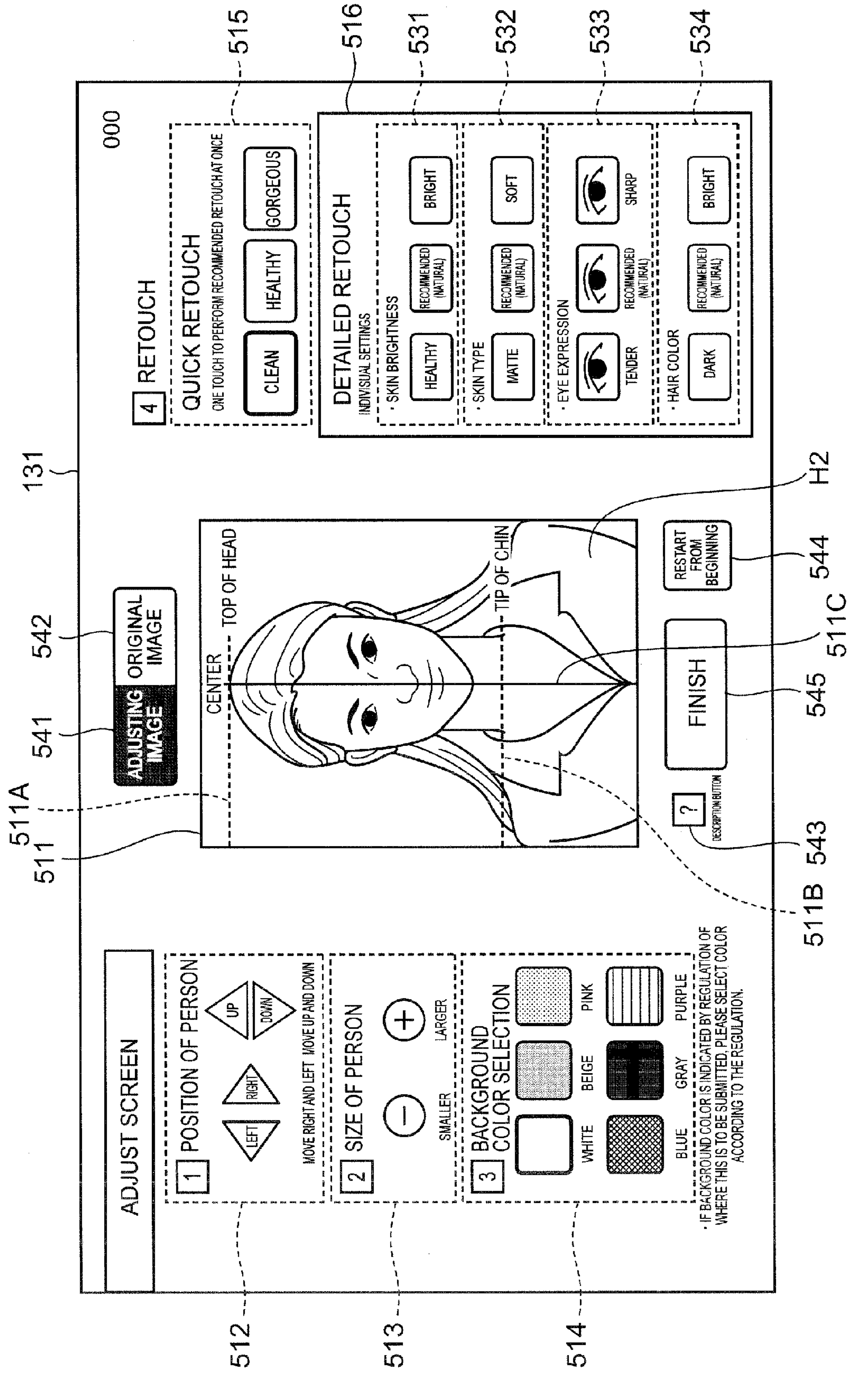
FIG. 33 is a drawing illustrating an example of the adjustment screen.

FIG. 33 is a drawing illustrating exemplary display of the adjustment screen for the second stage adjustment for the position and the size of the person.

During the adjustment of the position and the size of the person, in the adjusted image display area 511, guiding lines including a horizontal lines 511A and 511B, and a vertical line 511C are displayed, superimposed on the identification photograph image, similarly to the time during the live view display. At least any one of the horizontal lines 511A and 511B, and the vertical line 511C may be displayed as the display of the guiding lines. The horizontal line 511A indicates the height to be the rough standard of the highest position of the head. The horizontal line 511B indicates the height to be the rough standard of the position of the chin. The vertical line 511C indicates the position to be the rough standard in the horizontal direction of the center of the face.

For example, when the position of the person is adjusted, such an audio message is output from the speaker 231 by the guidance output control unit 331 as "The position of the person is adjusted. Please adjust the position to be matched with the position of the guiding line." When the size of the person is adjusted, such an audio message is output from the speaker 231 by the guidance output control unit 331 as "The size of the person is adjusted. Please adjust the size to be matched with the size of the guiding line."

By operating the buttons displayed in the button area 512 and the button area 513, the user adjusts the position of the face for the vertical line 511C to run in the center of the face, matches the highest position of the head with the horizontal line 511A, and matches the lowest position of the chin with the horizontal line 511B.

In this manner, only the coarse adjustment is performed when the shooting, and thereafter, the fine adjustment is performed in the adjustment of the identification photograph image by using the stylus pens 132A and 132B. Thereby, the position and the size of the person in the identification photograph image can accurately be adjusted.

Similarly to the first stage adjustment for the shooting, the images showing the rough standards of the position and the size of the face are not limited to the images of the straight lines. An image may be displayed that shows the position and the size of a portion of the person other than the face. The image which is the rough standard of either one of the position and the size of the face may be displayed.

The first stage adjustment for the shooting is the coarse adjustment. Therefore, during the first stage adjustment, only the image showing the rough standard of either one of the position and the size of the face may be displayed. Then, during the second stage adjustment which is the fine adjustment, the images showing the rough standards of both of the position and the size of the face may be displayed.

During the display of the live view, the user needs to check the user's clothes watching the live view. Reduction of the amount of information displayed superimposed on the live view facilitates the check by the user on the user's appearance.

Figure 34A:
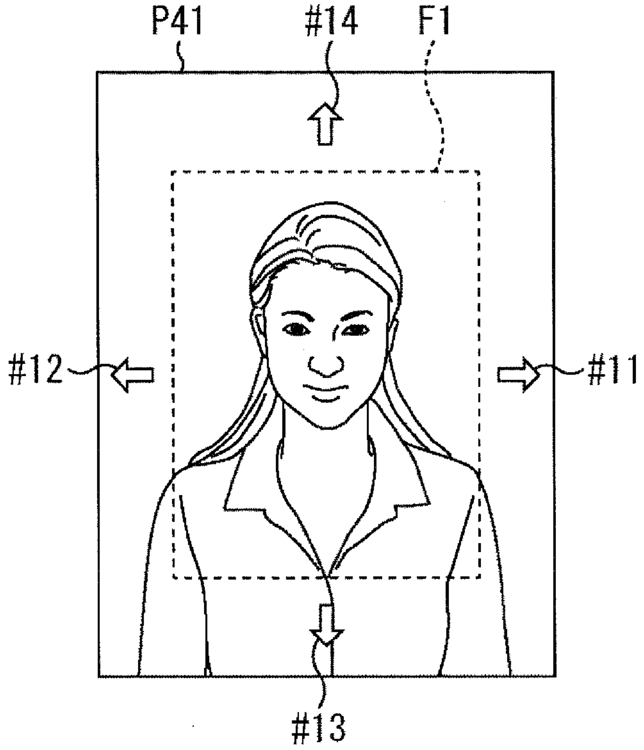
FIGS. 34A and 34B are drawings illustrating examples of image processing.
Figure 34B:
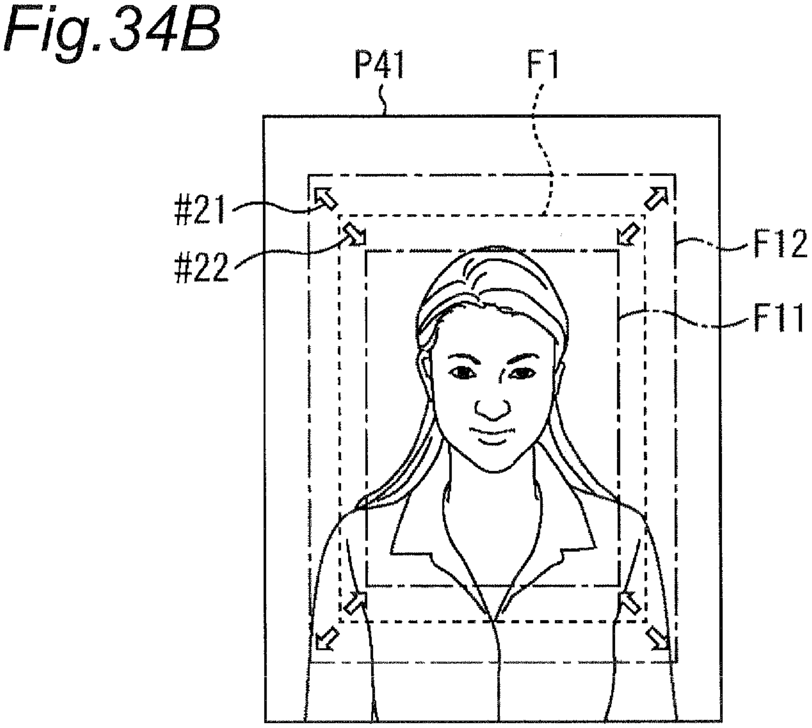

FIGS. 34A and 34B are diagrams of examples of the image processing during the adjustment of the position and the size of the person.

An image P41 shown in FIGS. 34A and 34B are images of the overall identification photograph image, and a region indicated by a frame F1 is the region to be displayed in the adjusted image display area 511. In the shooting, data of a region larger than the region displayed on the tablet built-in monitor 131 is acquired, and the adjustment of the position and size of the person is performed by changing the region of the frame F1 on the acquired image.

For example, the adjusting unit 334 moves the region of the frame F1 rightward by a predetermined distance as indicated by an outline arrow #11 of FIG. 34A every time the left button 512A in the button area 512 is operated and, thereby, moves the position of the person leftward in the frame F1. The adjusting unit 334 moves the region of the frame F1 leftward by a predetermined distance as indicated by an outline arrow #12 every time the right button 512B is operated to move the position of the person rightward in the frame F1.

Similarly, when the up button 512C or the down button 512D in the button area 512 is operated, the adjusting unit 334 moves the region of the frame F1 upward or downward by a predetermined distance as indicated by an outline arrow #13 or #14 to move the position of the person in the frame F1, respectively.

Every time the minus button 513A in the button area 513 is operated, the adjusting unit 334 widens the region to be accommodated in the frame F1 by a predetermined amount as indicated by an outwardly-oriented outline arrow #21 shown in FIG. 34B to reduce the position of the person in the frame F1. Every time the plus button 513B is operated, the adjusting unit 334 narrows the region to be accommodated in the frame F1 by a predetermined amount as indicated by an inwardly-oriented outline arrow #22 to enlarge the position of the person in the frame F1.

When the adjustment is finished, the region within the frame F1 is cut off from the image P41 by the trimming, and is used as the identification photograph image.

In the case where the position of the person is adjusted, when the position of the person is, for example, excessively shifted downward, the position of the upper side of the frame F1 of FIG. 34A may be higher than the position of the upper side of the shot image P41 and the region outside the area of the shot image P41 may be included in the frame F1 (no data on the area above the person may be present as the data on the shot image). In this case, to avoid any blank space area generated above the person displayed in the adjusted image display area 511, a process is performed of adding a background area (a transparent background area) to the region included in the frame F1 on the shot image P41.

Similarly, in the case where the size of the person is adjusted, when the person is excessively shrunk, a frame F11 in FIG. 34B may be larger than the shot image P41 and the region outside the area of the shot image P41 may be included in the frame F11 (no data on the area around the person may be present as the data on the shot image). In this case, to avoid any blank space area generated around the person displayed in the adjusted image display area 511, a process is performed of adding a background area (a transparent background area) to the region outside the area of the shot image P41 included in the frame F1.

Returning to the description of FIG. 32, the button area 514 has background color selection buttons 514A to 514F displayed therein that are used for the selection of the color of the background image. The background color selection buttons 514A to 514F are the buttons indicating colors different from each other. As described with reference to FIG. 11, the identification photograph image is constructed by superimposing the object of the shot image on the background image.

In response to the operation of each of the background color selection buttons 514A to 514F, the adjusting unit 334 changes the background image to be combined with the object of the shot image to adjust the color. For example, the adjusting unit 334 performs the chroma key process, and performs, based on a selection operation of any one of the background color selection buttons 514A to 514F, a process of replacing the color of the pixels in the area corresponding to the background of the shot image with the color corresponding to the selection operation. For example, during the adjustment of the background, an audio message is output from the speaker 231 such as "A background is selected. If the background color is indicated by the regulation of where the image is to be submitted, please select the color according to the regulation."

Figure 35:
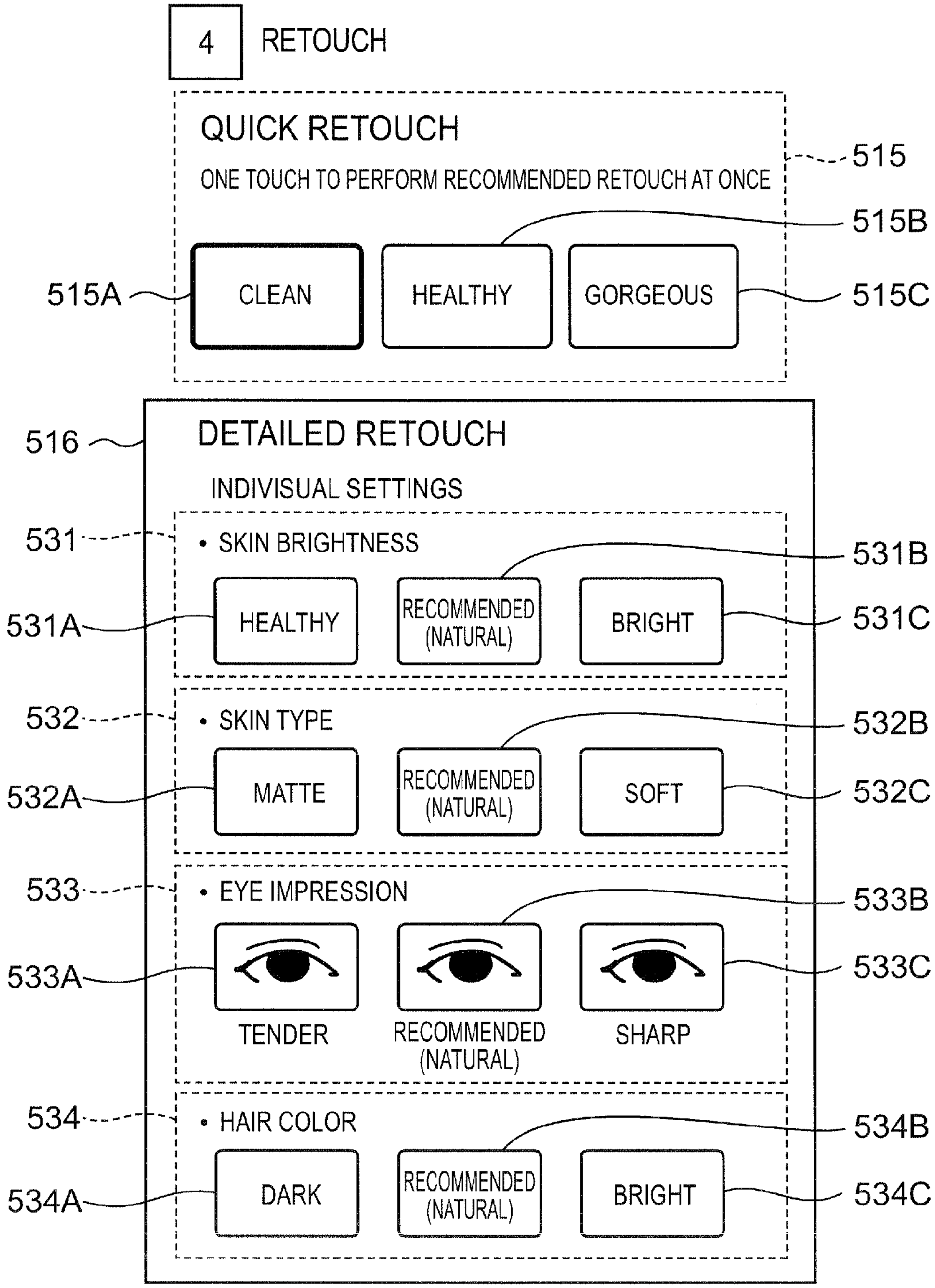
FIG. 35 shows an enlarged view of another portion of the adjustment screen of FIG. 31.

FIG. 35 is an enlarged view of the button area 515 and the button area 516 of FIG. 31.

The button area 515 has mode selection buttons 515A to 515C displayed therein that are operated when the picture conditions are adjusted using the quick retouch function. The quick retouch function is a function for collectively adjusting, by one operation, the picture condition including the brightness of the skin, the skin type, the impression of the eyes, and the color of the hair of the user shown in the identification photograph image.

For example, for the brightness of the skin, three types of brightness are prepared having such names set therefor as "HEALTHY", "RECOMMENDED (NATURAL)", and "BRIGHT". For the skin type, three types of sky types are prepared having such names set therefor as "MATTE", "RECOMMENDED (NATURAL)", and "SOFT". For the impression of the eyes, three types of impression are prepared having such names set therefor as "TENDER", "RECOMMENDED (NATURAL)", and "SHARP". For the color of the hair, three types of color of the hair are prepared having such names set therefor as "DARK", "RECOMMENDED (NATURAL)", and "BRIGHT".

Mode selection buttons 515A to 515C are the buttons to be operated to collectively adjust the picture conditions in each of modes whose names are set to be "CLEAN", "HEALTHY", and "GORGEOUS", respectively.

FIG. 36 is a diagram of an example of combinations each of the picture conditions used when each of the modes for the quick retouch is selected.

The mode of "CLEAN" is a mode according to which the brightness of the skin is set to be "RECOMMENDED (NATURAL)", the skin type is set to be "RECOMMENDED (NATURAL)", the impression of the eyes is set to be "TENDER", and the color of the hair is set to be "DARK". The mode of "HEALTHY" is a mode according to which the brightness of the skin is set to be "HEALTHY", the skin type is set to be "MATTE", the impression of the eyes is set to be "RECOMMENDED (NATURAL)", and the color of the hair is set to be "RECOMMENDED (NATURAL)". The mode of "GORGEOUS" is a mode according to which the brightness of the skin is set to be "BRIGHT", the skin type is set to be "SOFT", the impression of the eyes is set to be "SHARP", and the color of the hair is set to be "BRIGHT". Naturally, the combinations each of the mode and the picture condition are not limited to those depicted in FIG. 36 and another combination may be employed.

The button area 516 has buttons displayed therein to be operated for the detailed retouch that is a function of individually adjusting the brightness of the skin, the skin type, the impression of the eyes, and the color of the hair without using the quick retouch function. The button area 516 includes areas 531 to 534 disposed therein.

The areas 531 has picture condition selection buttons 531A to 531C displayed therein to be operated to select the favorite brightness of the skin from the three types of "HEALTHY", "RECOMMENDED (NATURAL)", and "BRIGHT". The brightness of each of "HEALTHY". "RECOMMENDED (NATURAL)", and "BRIGHT" is correlated with parameters concerning the color of the skin such as the color phase, the chroma, and the luminance.

When any one button of the picture condition selection buttons 531A to 531C is operated, the adjusting unit 334 detects the area of the skin of the object, sets the parameters corresponding to the selected type of brightness, and, thereby, adjusts the brightness of the skin.

The area 532 has picture condition selection buttons 532A to 532C displayed therein to be operated to select the favorite skin type from the three types of "MATTE", "RECOMMENDED (NATURAL)", and "SOFT". The skin type of each of "MATTE", "RECOMMENDED (NATURAL)", and "SOFT" is correlated with parameters concerning the color such as the color phase, the chroma, and the luminance, and parameters such as sharpness.

When any one button of the picture condition selection buttons 532A to 532C is operated, the adjusting unit 334 detects the area of the skin of the object, sets the parameters corresponding to the selected type of skin type, and, thereby, adjusts the skin type.

An area 533 has picture condition selection buttons 533A to 533C displayed therein to be operated to select the favorite impression of the eyes from the three types of "TENDER", "RECOMMENDED (NATURAL)", and "SHARP". The impression of the eyes of each of "TENDER", "RECOMMENDED (NATURAL)", and "SHARP" is correlated with parameters such as sharpness.

When any one button of the picture condition selection buttons 533A to 533C is operated, the adjusting unit 334 detects the eyes of the object, sets the parameters corresponding to the selected type of impression, and, thereby, adjusts the impression of the eyes.

The area 534 has picture condition selection buttons 534A to 534C displayed therein to be operated to select the favorite color of the hair from the three types of "DARK", "RECOMMENDED (NATURAL)", and "BRIGHT". The color of the hair of each of "DARK", "RECOMMENDED (NATURAL)", and "BRIGHT" is correlated with parameters concerning the color of the hair such as the color phase, the chroma, and the luminance.

When any one button of the picture condition selection buttons 534A to 534C is operated, the adjusting unit 334 detects the area of the hair of the object, sets the parameters corresponding to the selected type of color, and, thereby, adjusts the color of the hair.

The adjusted image display area 511 of FIG. 31 has a during-adjustment button 541 and a before-adjustment button 542 displayed therein. The during-adjustment button 541 is the button to be operated to display the identification photograph image during the adjustment in the adjusted image display area 511, and the before-adjustment button 542 is the button to be operated to display the identification photograph image before the adjustment in the adjusted image display area 511. Either one of the during-adjustment button 541 and the before-adjustment button 542 is operable.

The adjusting unit 334 manages pieces of data on two types of the identification photograph image that are the identification photograph image before the adjustment and the identification photograph image during the adjustment. In response to the operation performed for the during-adjustment button 541 or the before-adjustment button 542, the display in the adjusted image display area 511 is switched based on the pieces of data managed by the adjusting unit 334.

By alternately operating the during-adjustment button 541 and the before-adjustment button 542, the user can watch for comparison the identification photograph image after the adjustment adjusted using the above buttons and the identification photograph image before the adjustment, that is, without the adjustment.

Though the four types of adjustment for the position of the person, the size of the person, the color of the background, and the picture condition are performed in the adjustment screen, the image as the identification photograph image before the adjustment displayed when the before-adjustment button 542 is operated may be used as the identification photograph image without any adjustment for which even the adjustment of the position and the size of the person is not performed, or may be used as the identification photograph image in which at least any one of the position of the person, the size of the person, and the color of the background is already adjusted.

For example, enabling the display of the image in which the position of the person, the size of the person, and the color of the background are already adjusted as the identification photograph image before the adjustment, enables the user to compare the identification photograph image during the adjustment with the identification photograph image before the adjustment of the picture condition, and to determine simply whether the user likes the picture condition.

Such buttons are displayed under the adjusted image display area 511 as a description button 543 to be operated to display the description of the adjustment functions, a restart button 544 to be operated to perform again the adjustment from the first, and a finish button 545 to be operated to finish the adjustment of the identification photograph image.

During the display of the adjustment image, such audio messages are output at predetermined timings as an audio message "You can watch the image for comparison with the original image by switching the "during adjustment" and the "before adjustment" buttons." describing the contents of what can be performed by using the during-adjustment button 541 and the before-adjustment button 542, and an audio message "Press the description button when you have a trouble." describing the content of what can be performed by using the description button 543. Such audio messages are also output at predetermined timings as an audio message "Press the restart button when want to restart the adjustment from the first." describing the content of what can be performed by using the restart button 544 and an audio message "Press the adjustment termination button when you want to terminate the adjustment." describing the content of what can be performed by using the finish button 545.

Figure 37:
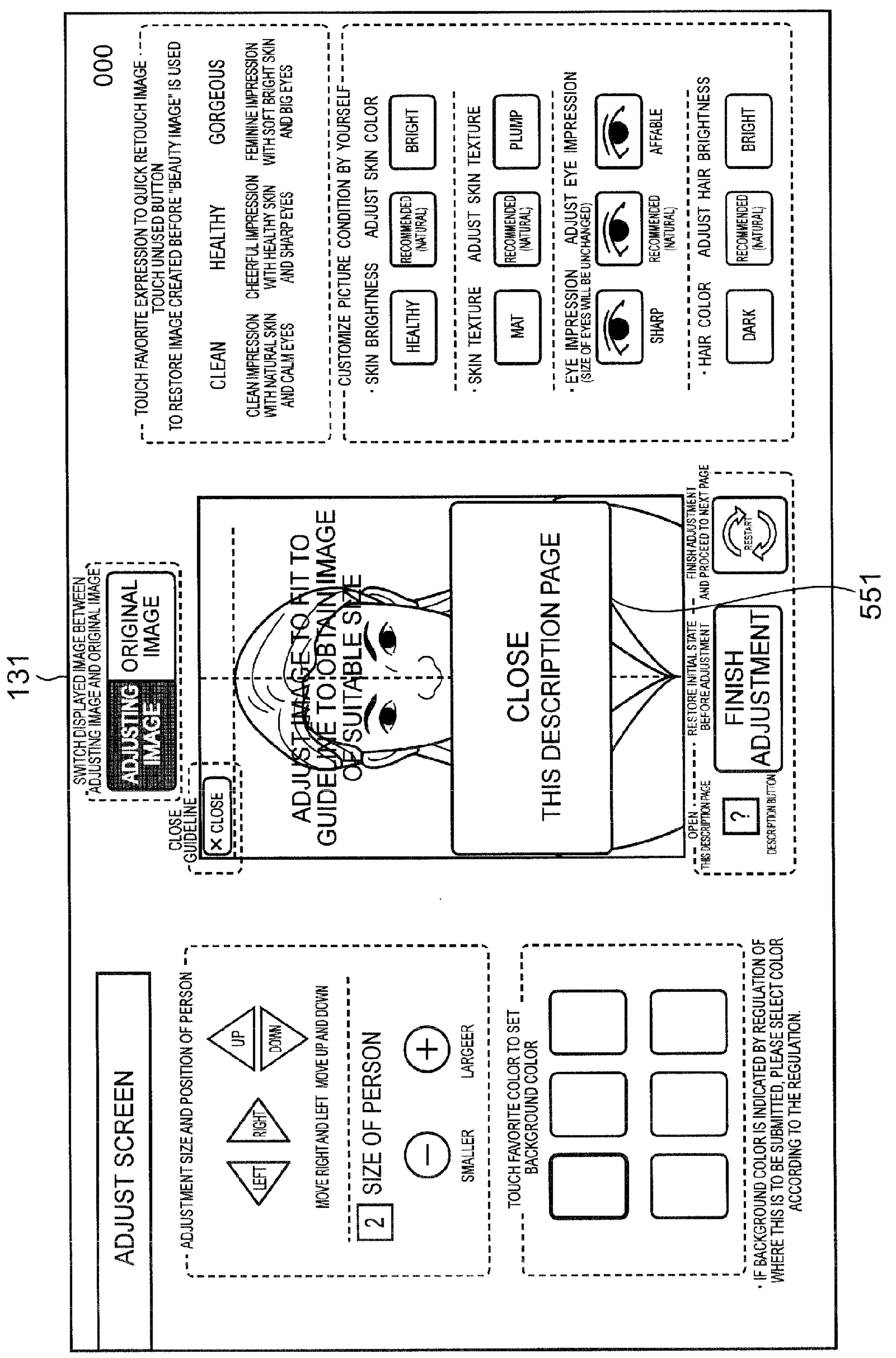
FIG. 37 is a drawing illustrating an example of the adjustment screen.

FIG. 37 is a drawing illustrating an example of the adjustment screen displayed when the description button 543 is operated.

Pieces of description are displayed for the adjustment contents at the positions in the adjustment screen when the description button 543 is operated. For example, in the areas of the mode selection buttons 515A to 515C to be operated to use the quick retouch function, description of the image of the picture condition is displayed that is acquired when one of the modes is selected.

When the termination button 551 displayed and superimposed on the adjusted image display area 511 is operated, the display in the adjustment screen returns to the display shown in FIG. 31.

Figure 38:
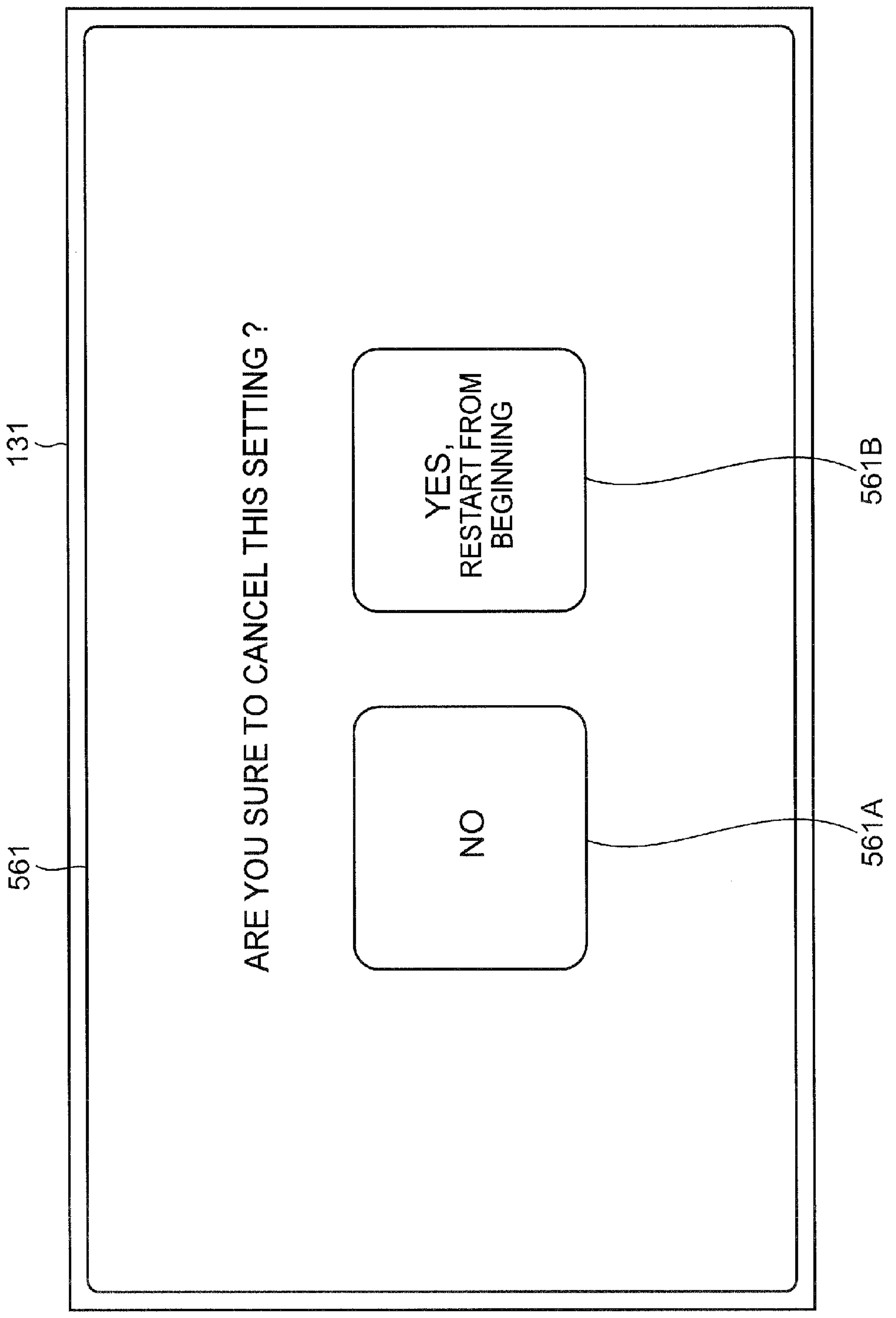
FIG. 38 is a drawing illustrating an example of the adjustment screen.

FIG. 38 is a drawing illustrating an example of the adjustment screen displayed when the restart button 544 is operated.

When the restart button 544 is operated, a window 561 is displayed in the adjustment screen. A message "ARE YOU SURE TO CANCEL THIS SETTING?" is displayed at the substantial center of the window 561 and, such buttons are displayed under the message as a button 561A that is a NO button to be operated to continue the adjustment without cancelling the settings, and a button 561B that is a YES button to be operated to cancel the settings and restart the adjustment.

When the button 561A is operated that is the NO button, the window 561 disappears and the display in the adjustment screen returns to the state where the screen includes the identification photograph image during the adjustment. On the other hand, when the button 561B is operated that is the YES button, the window 561 disappears and the display in the adjustment screen returns to the state where the screen includes the identification photograph image before the adjustment.

Figure 39:
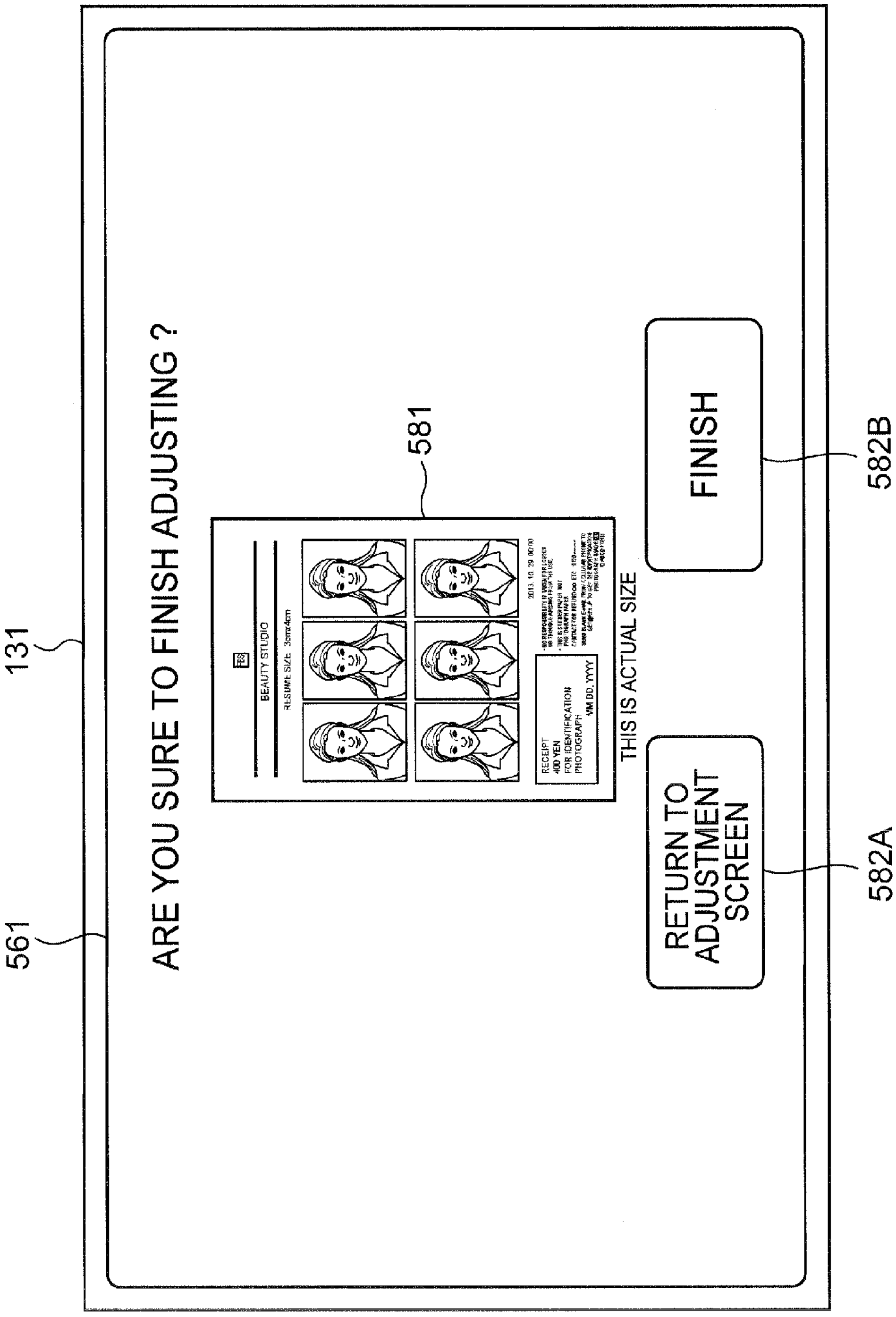
FIG. 39 is a drawing illustrating an example of the adjustment screen.

FIG. 39 is a drawing illustrating an example of the adjustment screen displayed when the finish button 545 is operated.

When the finish button 545 is operated, the window 561 is displayed in the adjustment screen. A message "ARE YOU SURE TO QUIT?" is displayed in the upper portion of the window 561 and, thereunder, a print preview image 581 is displayed that shows the image acquired when the identification photograph image after the adjustment is arranged on a sticker sheet.

Such buttons are displayed under the print preview image 581 as a back button 582A to be operated to move back to the adjustment screen for continuing the adjustment, and a finish button 582B to be operated to finish the adjustment.

When the back button 582A is operated, the window 561 disappears and the display of the adjustment screen returns to the state where the screen includes the identification photograph image during the adjustment.

Figure 26:
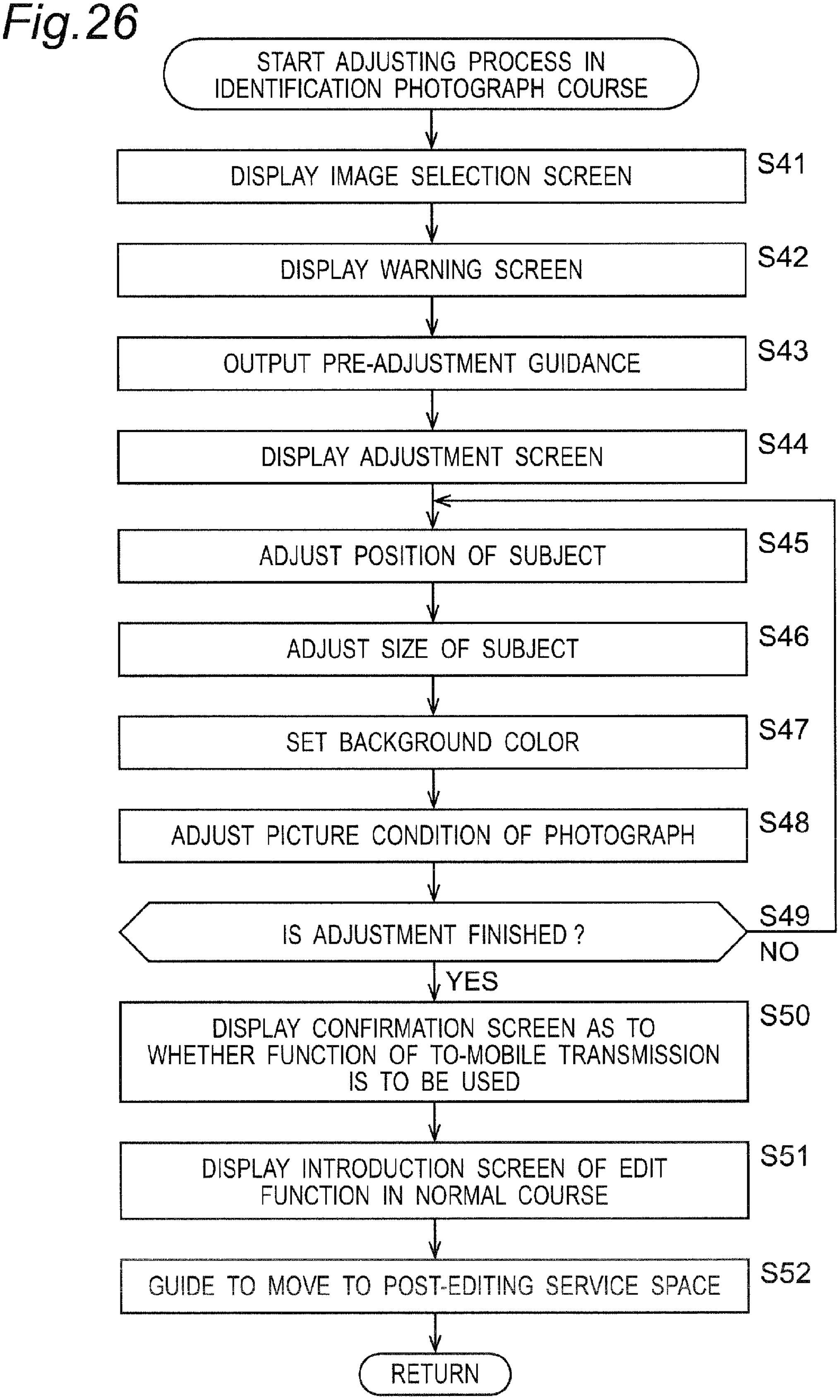
FIG. 26 is a flowchart for describing an adjusting process for the identification photograph image performed at step S4 of FIG. 18.

Returning back to the description with reference to FIG. 26, at step S45, in response to the operation by the user to the buttons displayed in the button area 512 in the adjustment screen, the adjusting unit 334 adjusts the position of the object in the identification photograph image. The adjustment of the position of the object is performed as described with reference to FIG. 341.

At step S46, in response to the operation by the user to the buttons displayed in the button area 513, the adjusting unit 334 adjusts the size of the object in the identification photograph image. The adjustment of the size of the object is performed as described with reference to FIG. 34B.

At step S47, in response to the operation by the user to the buttons displayed in the button area 514, the adjusting unit 334 adjusts the color of the background of the object in the identification photograph image.

At step 948, in response to the operation by the user to the buttons displayed in the button area 515 and the button area 516, the adjusting unit 334 adjusts the picture condition of the object in the identification photograph image.

When the buttons displayed in the button area 515 are operated, the adjusting unit 334 adjusts collectively the parameters concerning the picture condition of each of the brightness of the skin, the skin type, the impression of the eyes, and the color of the hair of the user. When the buttons displayed in the button area 516 are operated, the adjusting unit 334 adjusts each of the parameters concerning the brightness of the skin, the skin type, the impression of the eyes, and the color of the hair of the user.

The adjustment of the identification photograph image is performed every time the button in the button areas 512 to 516 is operated, and the data on the identification photograph image after the adjustment is transmitted from the adjusting unit 334 to the display control unit 332. Based on the data transmitted from the adjusting unit 334, the identification photograph image after the adjustment is displayed in the adjusted image display area 511.

At step S49, the adjusting unit 334 determines whether the adjustment is finished and, when the adjusting unit 334 determines that the adjustment is not finished, the procedure returns to step S45 and the above processes are repeated. Only the necessary processes of the processes at steps S45 to S48 may be performed in arbitrary order.

On the other hand, when the adjusting unit 334 determines that the adjustment is finished because the finish button 545 is operated and the finish button 582B (FIG. 39) displayed in the adjustment screen is subsequently operated, at step S50, the display control unit 332 causes the tablet built-in monitor 131 to display thereon a confirmation screen as to whether the function of the to-mobile transmission is to be used.

When the adjusting unit 334 determines that the adjustment comes to an end, the identification photograph image after the adjustment is transmitted to the image storing unit 335 to store the image therein. When the limited time period set in advance elapses, the adjusting unit 334 also determines that the adjustment comes to an end and the tablet built-in monitor 131 displays thereon the confirmation screen. A limited time period is also set for the adjustment of the identification photograph image. The limited time period may appropriately be extended depending on the empty state of the post-editing service space A3 and the state of the printing.

Figure 40:
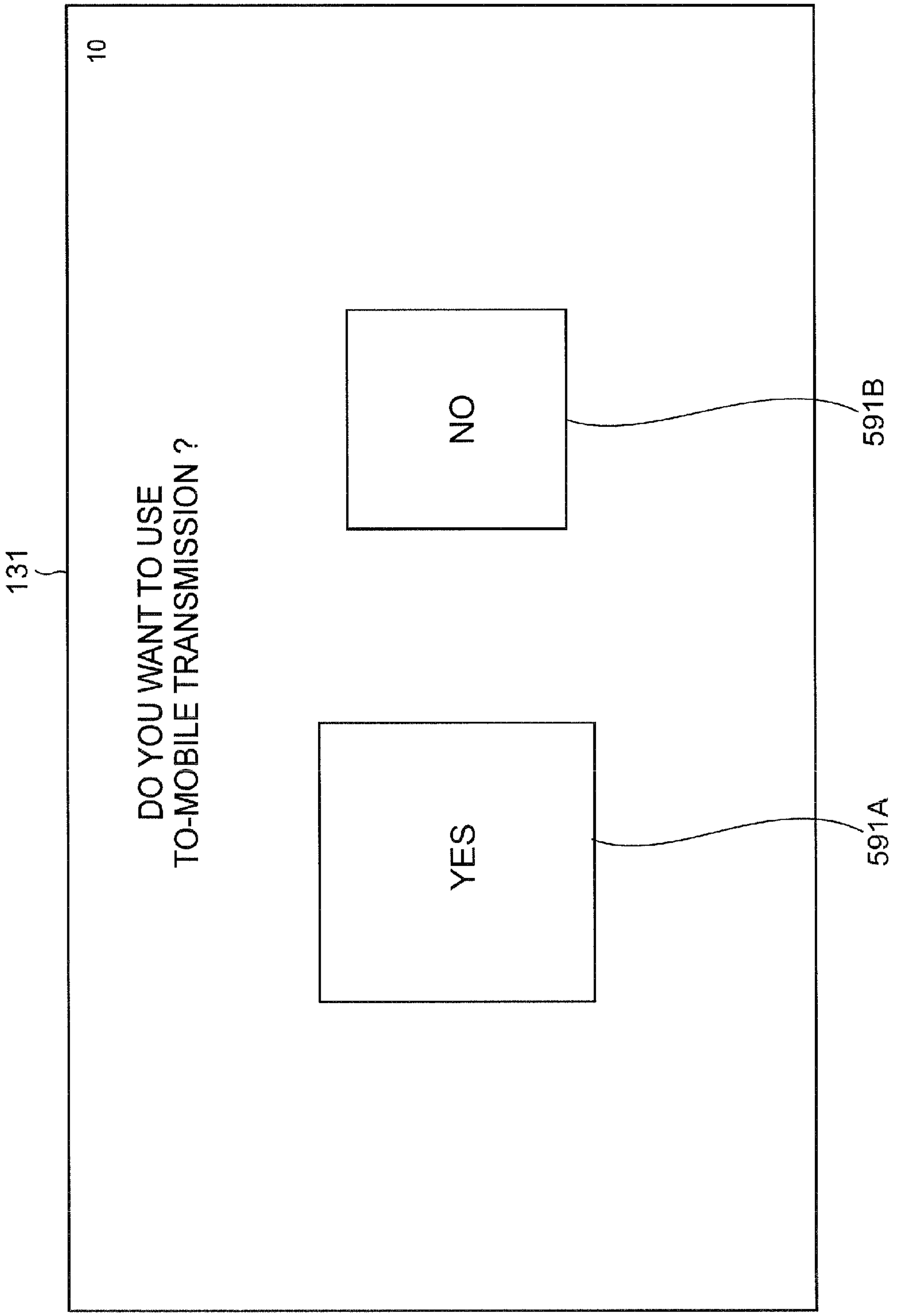
FIG. 40 is a drawing illustrating an example of a confirmation screen.

FIG. 40 is a drawing illustrating an example of the confirmation screen.

A message "DO YOU WANT TO PERFORM TO-MOBILE TRANSMISSION?" is displayed in the upper portion of the confirmation screen. A button 591A and a button 591B are displayed under the message. The button 591A is a YES button to be operated to use the function of to-mobile transmission, and the button 591B is a NO button to be operated not to use the function of to-mobile transmission.

Information representing the content of the selection by the user for the confirmation screen is transmitted to the post-editing service managing unit 304 (FIG. 13) to be stored therein.

At step S51, the display control unit 332 causes the tablet built-in monitor 131 to display thereon the introduction screen of the normal course. The introduction screen of the normal course has, for example, an image displayed therein showing the content of the editing of the shot image. During the introduction screen is displayed, an audio message such as "This is an introduction to graffiti in the normal course. Please shoot this next time!" is output from the speaker 231.

At step S52, the display control unit 332 guides the user, who finished the adjustment of the identification photograph image, to move to the post-editing service space A3. The guiding of the move to the post-editing service space A3 is performed by causing the tablet built-in monitor 131 to display thereon a screen or by causing the speaker 231 to output an audio message. Thereafter, the procedure returns to step S4 of FIG. 18 and the processes at step S4 and thereafter are performed.

[Printing Process in Identification Photograph Course]

Figure 41:
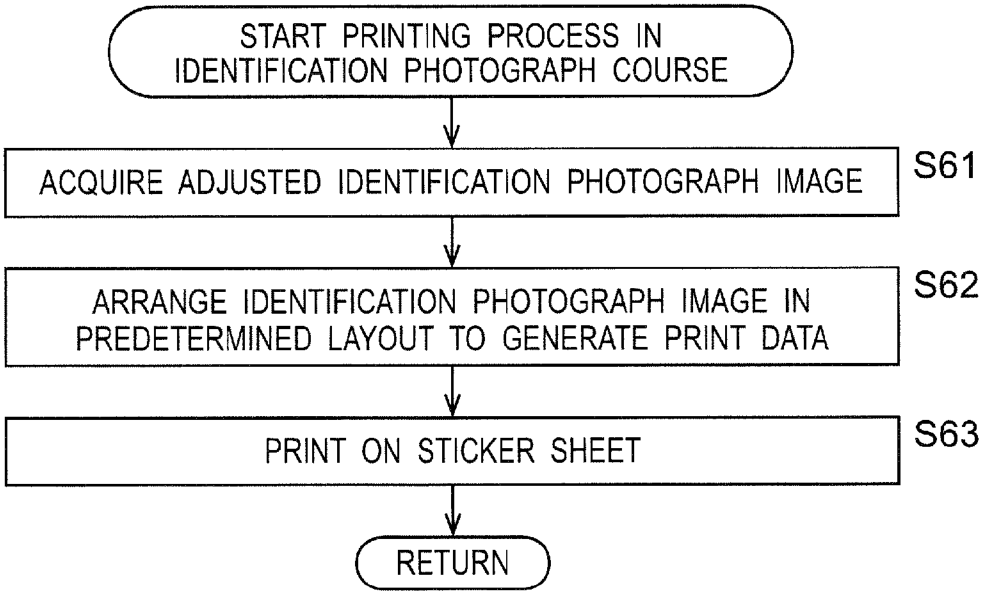
FIG. 41 is a flowchart for describing a printing process of the identification photograph image performed at step S5 of FIG. 18.

The printing process of the identification photograph image performed at step S5 of FIG. 18 will be described with reference to a flowchart of FIG. 41.

At step S61, the print data producing unit 341 (FIG. 16) of the print managing unit 303 reads and acquires the identification photograph image after the adjustment stored in the image storing unit 335.

At step S62, the print data producing unit 341 produces the print data by arranging the identification photograph image after the adjustment in a predetermined layout, and outputs the print data to the printer control unit 342.

The layout of the identification photograph image may be predetermined, or may automatically be selected in response to selection of the use of the identification photograph image such as a resume, an application form, and a passport. The layout may be selected in response to designation of the size by the user, or the user may be able to select the layout from a plurality of layouts prepared in advance.

At step S63, the printer control unit 342 controls the printer 241 to print the identification photograph image on a sticker sheet based on the print data produced by the print data producing unit 341.

Thereby, the sticker sheet described with reference to FIG. 10 is created and is ejected to the sticker sheet ejecting opening 163. Thereafter, the procedure returns to step S5 of FIG. 18 and the processes at step S5 and thereafter are performed.

[Post-Editing Service Process in Identification Photograph Course]

Figure 42:
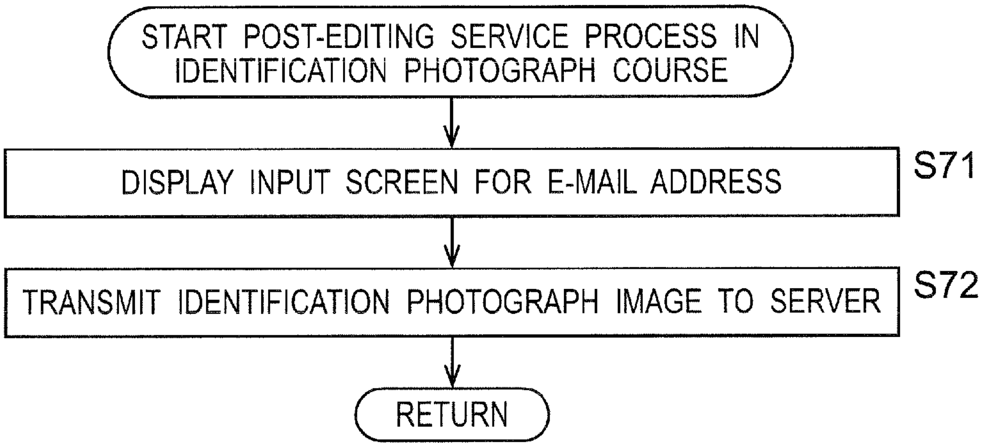
FIG. 42 is a flowchart for describing a post-editing service process performed at step S6 of FIG. 18.

The post-editing service process performed at step S6 of FIG. 18 will be described with reference to a flowchart of FIG. 42. The post-editing service process of FIG. 42 is performed when use of the function of to-mobile transmission is selected in the selection screen of FIG. 10.

At step S71, the display control unit 351 of the post-editing service managing unit 304 causes the tablet built-in monitor 161 to display thereon an input screen for an e-mail address. The e-mail address of a mobile terminal such as a mobile phone possessed by the user is input using this input screen.

The identification photograph image created by the photograph sticker creating apparatus 1 is transmitted from the photograph sticker creating apparatus 1 to the server and is stored therein being assigned with a predetermined storage area. The server is, for example, a server managed by the manufacturer of the photograph sticker creating apparatus 1. The e-mail address input by the user is used to inform the user of the URL indicating the storage area. An e-mail transmitted from the server to the mobile terminal of the user includes the URL indicating the storage area of the identification photograph image, and the user can cause the identification photograph image to be displayed in the screen of the mobile terminal by instructing the mobile terminal to access the URL.

The function of to-mobile transmission is a function to enable the identification photograph image to be viewed in the screen of the mobile terminal based on the above mechanism.

For example, the user can download the data of the identification photograph image to the mobile terminal by registering the user as a paid member from a webpage opened by the manufacturer of the photograph sticker creating apparatus 1. The data of the identification photograph image downloaded to the mobile terminal is usable in producing an electronic resume and reprinting the identification photograph image.

Figure 43:
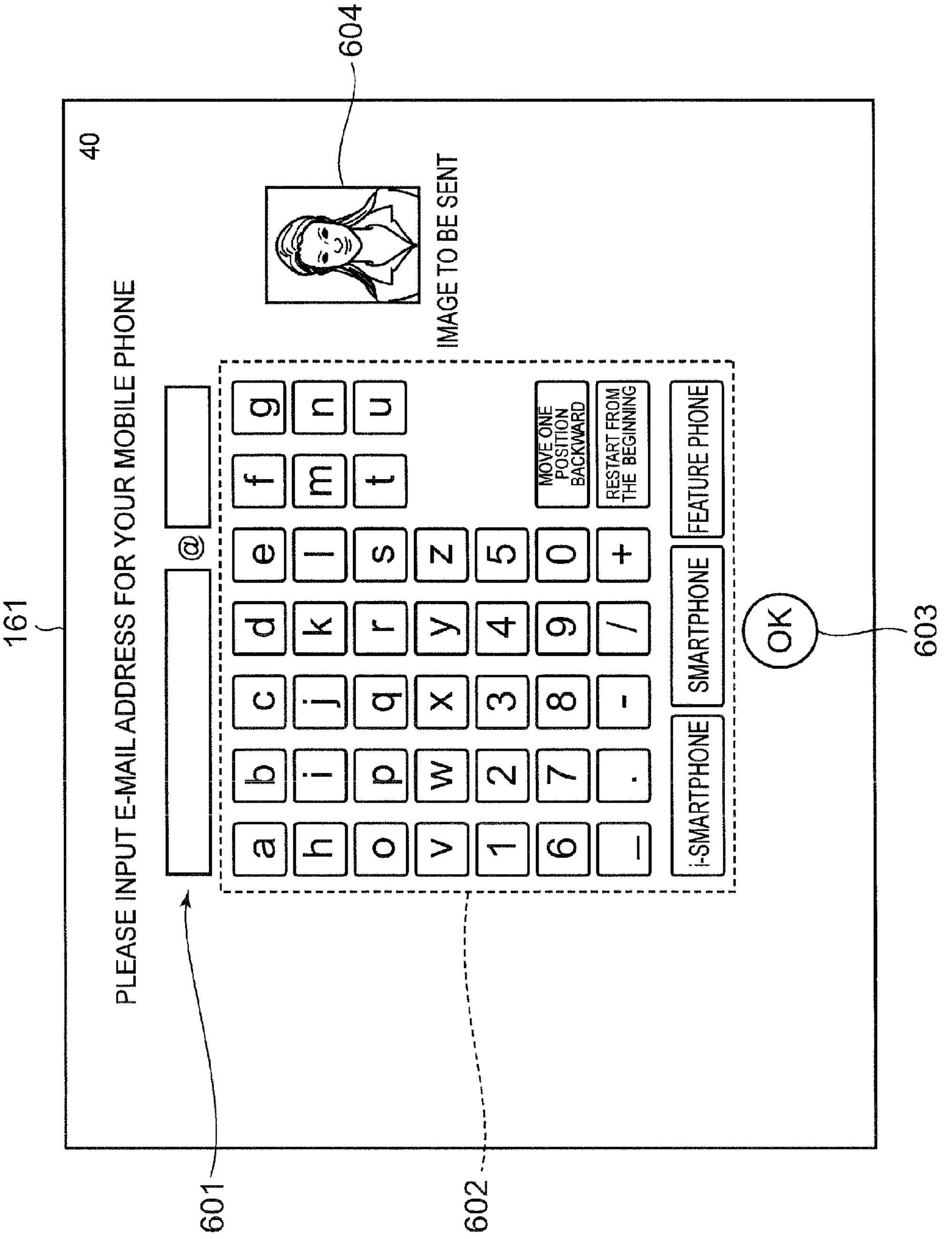
FIG. 43 is a drawing illustrating an example of an input screen for an e-mail address.

FIG. 43 is a drawing illustrating an example of the input screen for the e-mail address.

A message "PLEASE INPUT E-MAIL ADDRESS FOR YOUR MOBILE PHONE." is displayed in the upper portion of the input screen. A display column 601 for displaying the input e-mail address is disposed under the message. An input buttons 602 to be used to input alphabets, numbers, etc., are displayed under the display column 601. The user operates the input buttons 602 to input the e-mail address of the user's mobile terminal.

An OK button 603 is displayed under the input buttons 602 that is operated to terminate the input of the e-mail address. A thumbnail image 604 of the identification photograph image is displayed on the right of the input buttons 602. The thumbnail image 604 is displayed based on the data read from the image storing unit 335.

When the e-mail address is input into this input screen and the OK button 603 is operated, at step S72, the communication control unit 352 transmits to the server the data on the identification photograph image after the adjustment read from the image storing unit 335 and the e-mail address.

Figure 44:
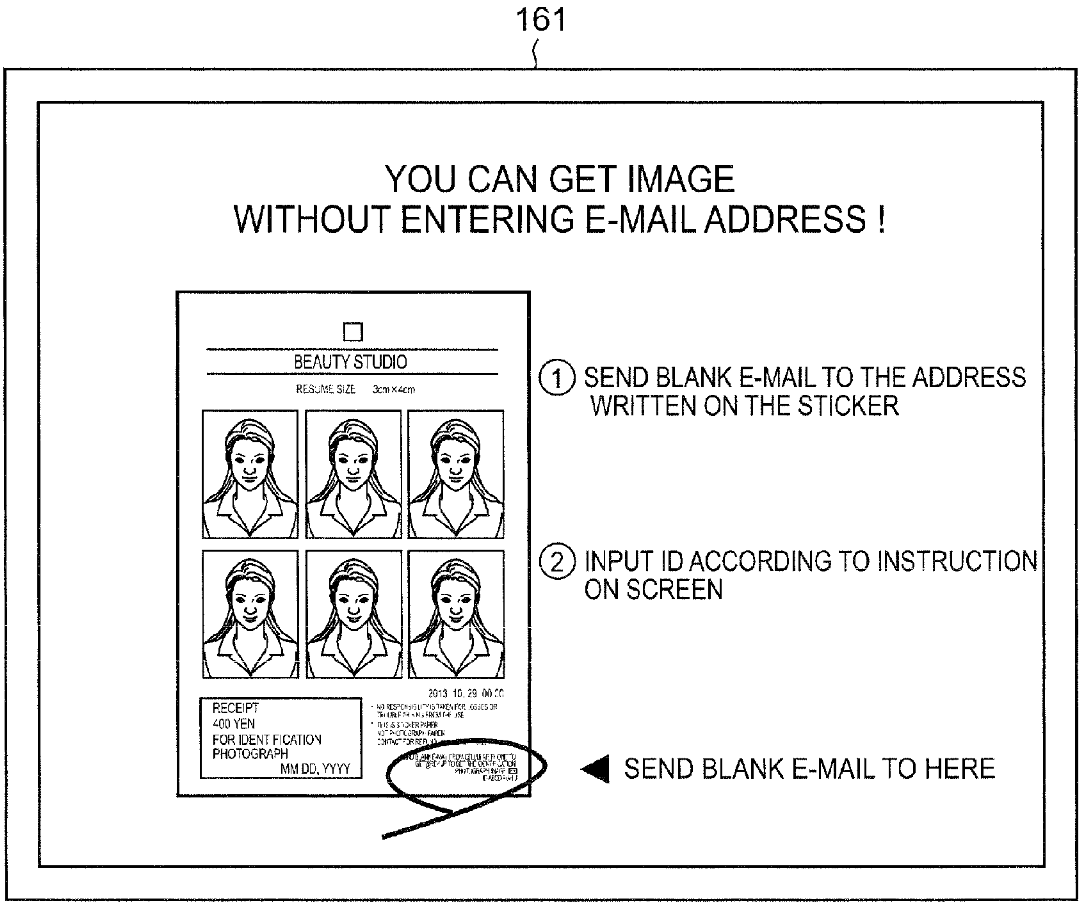
FIG. 44 is a drawing illustrating an example of an introduction screen.

The display control unit 351 causes the tablet built-in monitor 161 to display thereon the introduction screen as shown in FIG. 44 and causes the process to come to an end. Thereafter, the procedure returns to step S6 of FIG. 18 and the series of process steps in the identification photograph course come to an end.

FIG. 44 is a drawing illustrating an example of the introduction screen.

The introduction screen of FIG. 44 is the screen introducing that the identification photograph image can be viewed in the screen of the mobile terminal even when no e-mail address is input. A message "YOU CAN GET IMAGE WITHOUT ENTERING E-MAIL ADDRESS" is displayed in the upper portion of the introduction screen, and description is displayed thereunder describing that the identification photograph image can also be viewed using the mobile terminal by sending a what-is-called blank e-mail (an e-mail whose message window is empty) to the e-mail address printed on the sticker sheet, and inputting the ID printed on the sticker sheet in an input column of the webpage displayed when the mobile terminal accesses a URL included in an e-mail returned in response to the blank e-mail.

As above, the user can acquire the sticker sheet with the identification photograph image printed thereon to be used to be attached to a resume, etc., by selecting the identification photograph course.

[Shooting Process in Normal Course]

Figure 45:
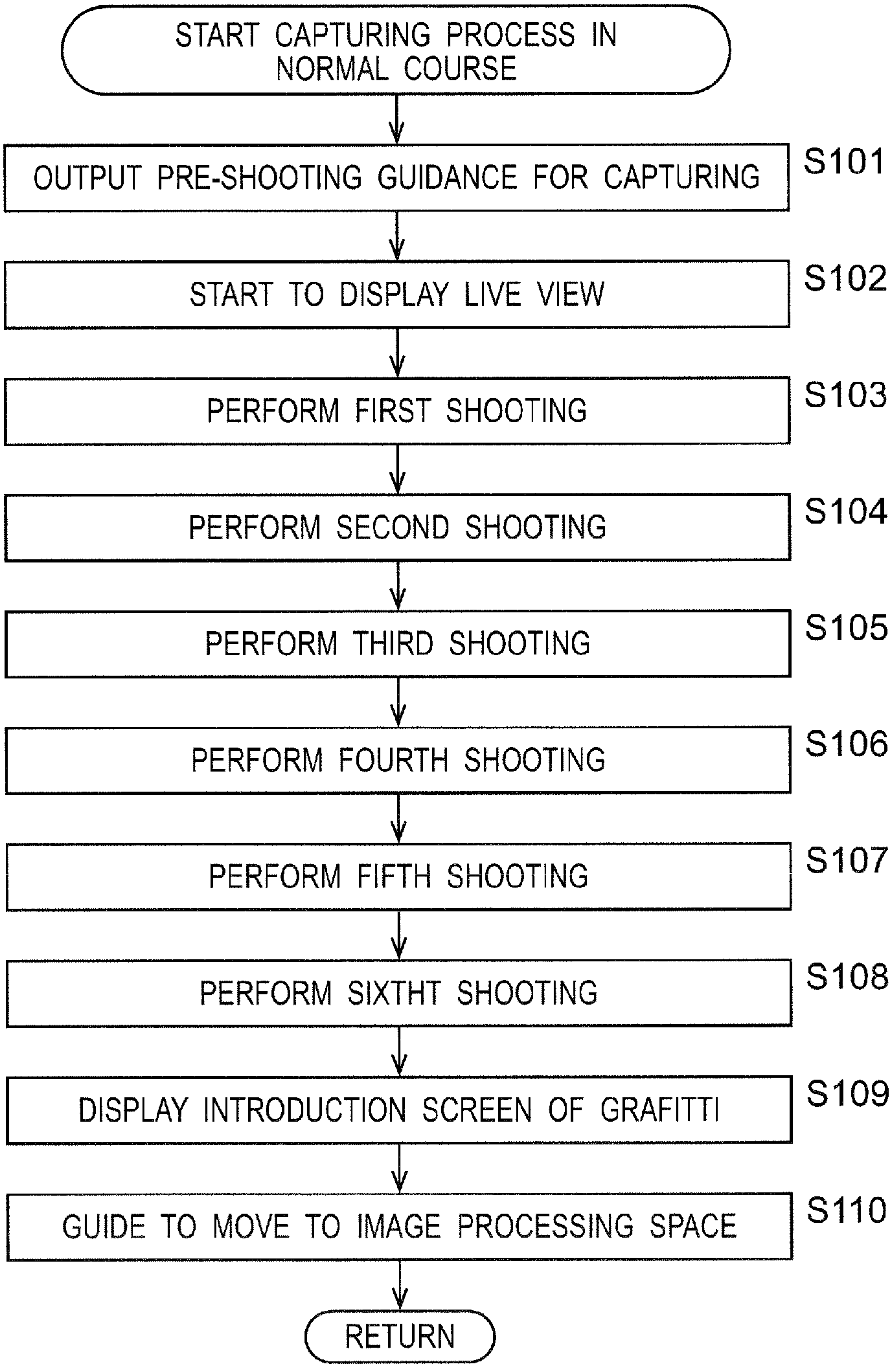
FIG. 45 is a flowchart for describing a shooting process in a normal course performed at step S7 of FIG. 18.

The shooting process in the normal course performed at step S7 of FIG. 18 will be described with reference to a flowchart of FIG. 45.

At step S101, the guidance output control unit 321 of the shooting managing unit 301 controls the display control unit 322 to output the pre-shooting guidance by causing the touch panel monitor 92 to display thereon a screen describing how to shoot, etc. The user watches the screen displayed on the touch panel monitor 92 to check how to shoot, etc.

When the pre-shooting guidance comes to an end, at step S102, the display control unit 322 starts to display the live view. The shooting of the moving image by the camera 91 is started, and the moving image showing the user acquired by the shooting is transmitted from the camera control unit 323 to the display control unit 322.

Figure 46:
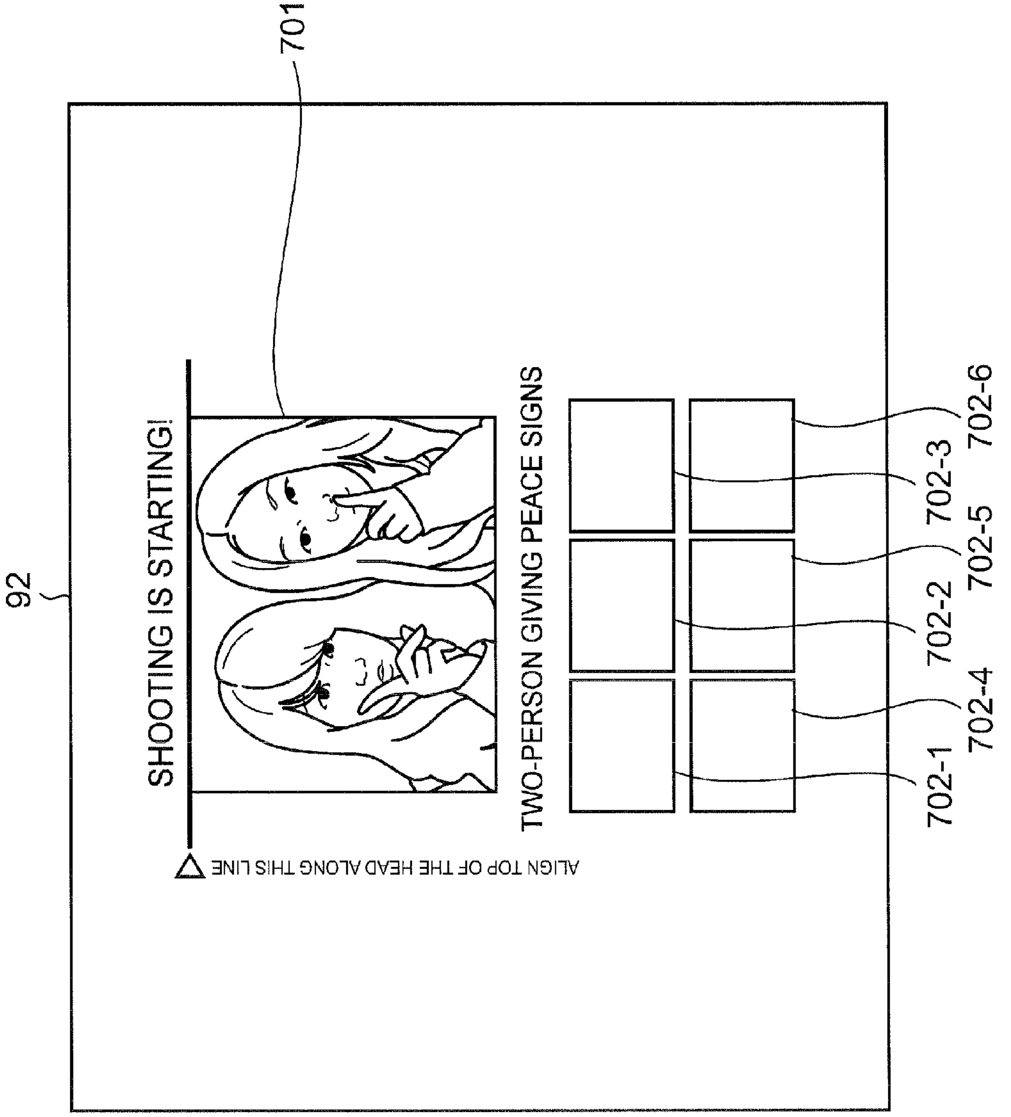
FIG. 46 is a drawing illustrating an example of the live view display screen.

FIG. 46 is a drawing illustrating an example of the live view display screen.

A message "SHOOTING IS STARTED!" is displayed in the upper center of the live view display screen and the moving image acquired by shooting the user in the photographing space A1 is displayed in a live view display area 701 that is a rectangular area disposed under the message. In the example of FIG. 46, it is assumed that two users selecting the two-person normal course in the course selection screen of FIG. 19 perform the shooting.

A message is displayed on the left of the live view display area 701, and guides the users to adjust the positions of their heads to be placed along the upper side of the live view display area 701. Under the live view display area 701, shooting result display areas 702-1 to 702-6 are disposed in two rows and three columns that each are a rectangular area smaller than the live view display area 701.

For example, six shootings are performed each for the still image in the normal course. Every time the shooting is performed, the shot image acquired by the shooting is displayed in order of the shooting in the shooting result display areas 702-1 to 702-6. In the example of FIG. 46, because no shooting is performed yet, no image is displayed in the shooting result display areas 702-1 to 702-6.

Each user can check the shooting results while watching the live view display screen and performing the shootings concurrently adjusting the position of the user's face. The display in the live view display screen is continued until the six shootings come to an end.

When the shooting timing comes with the live view display screen displayed on the touch panel monitor 92, at step S103, the camera control unit 323 performs the first shooting for a still image. The camera control unit 323 outputs to the display control unit 322 the shot image that is the still image acquired by the shooting and also outputs the shot image to the shot image storing unit 324 to store the shot image therein.

The shot image output to the display control unit 322 is shrunk and displayed in the shooting result display area 702-1 in the live view display screen. The user can perform the preparation for the next shooting checking the result of the first shooting.

Thereafter, the second and the succeeding shootings are performed. When the second shooting timing comes, the camera control unit 323 performs, at step S101, the second shooting for a still image. The camera control unit 323 outputs the shot image acquired by the shooting to the display control unit 322 to cause the shot image to be displayed in the shooting result display area 702-2 in the live view display screen, and also output the shot image to the shot image storing unit 324 to store the shot image therein.

At steps S105 to S108, the camera control unit 323 performs the third to the sixth shootings for still images. The camera control unit 323 outputs the shot images acquired by the shootings to the display control unit 322 to cause the shot images to be displayed in the live view display screen, and also output the shot images to the shot image storing unit 324 to store the shot images therein.

At step S109, the display control unit 322 displays the introduction screen of the graffiti on the touch panel monitor 92.

At step S110, the display control unit 322 guides the users whose shootings come to an end, to move to the image processing space A2-1 or the image processing space A2-2. The guiding of the move to the image processing space A2-1 or the image processing space A2-2 is also performed by causing the touch panel monitor 92 to display thereon the screen or by outputting an audio message from the speaker 224.

The users exit the photographing space A1, move to the guided one of the image processing spaces, and edit the shot images. Thereafter, the procedure returns to step S7 of FIG. 18 and the processes at step S7 and thereafter are performed.

[Editing Process in Normal Course]

The editing process of the shot images performed at step S8 of FIG. 18 will be described with reference to a flowchart of FIG. 47.

At step S121, the display control unit 332 of the image processing managing unit 302 causes the tablet built-in monitor 131 to display thereon a name input screen. The content of editing tools prepared in the editing screen is changed corresponding to the name of each of the users input into the name input screen. For example, a stamp image showing the name of the user, etc., is prepared as the editing tool.

At step S122, the display control unit 332 reads and acquires, for example, the six shot images acquired by the shooting process from the shot image storing unit 324, and causes the tablet built-in monitor 131 to display thereon an eye and face size adjustment screen. The eye and face size adjustment screen is a screen used for adjusting the sizes of the eyes and the face of the user shown in the shot images.

Figure 48:
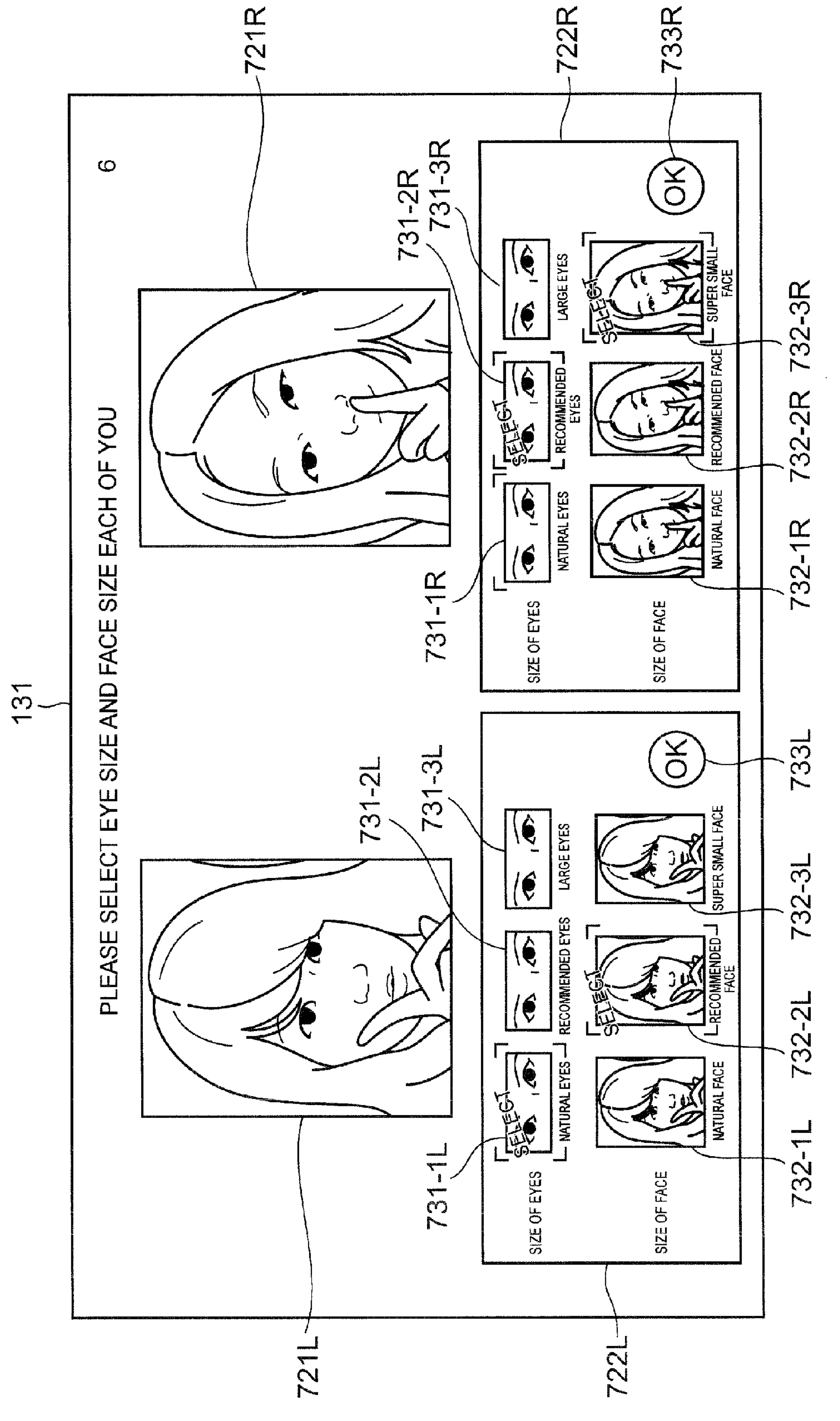
FIG. 48 is a drawing illustrating an example of an eye and face size adjustment screen.

FIG. 48 is a drawing illustrating an example of the eye and face size adjustment screen.

A message "PLEASE SELECT EYE SIZE AND FACE SICE EACH OF YOU" is displayed in the upper center of the eye and face size adjustment screen, and a face image display area 721L and a face image display area 721R are disposed away from each other under the message. The face image display area 721L is an area including an enlarged face displayed therein of the person shown on the left that is cut off by trimming from the shot image showing the two users, and the face image display area 721R is an area including an enlarged face displayed therein of the person shown on the right cut off by trimming therefrom. For example, areas of the faces of the persons cut off from the first shot image are displayed in the face image display area 721L and the face image display area 721R.

A button area 722L is disposed under the face image display area 721L and a button area 722R is disposed under the face image display area 721R. The user standing on the left facing the tablet built-in monitor 131 operates the buttons displayed in the button area 722L using the stylus pen 132A prepared on the left of the tablet built-in monitor 131 to adjust the sizes of the eyes and the face in the image of the user displayed in the button area 722L. On the other hand, the user standing on the right facing the tablet built-in monitor 131 operates the buttons displayed in the button area 722R using the stylus pen 132B prepared on the right of the tablet built-in monitor 131 to adjust the sizes of the eyes and the face in the image of the user displayed in the button area 722R.

Eye size selection buttons 731-1L to 731-3L to be the buttons used to adjust the size of the eyes are displayed in the upper row of the button area 722L. Images of the eyes each having a size different from each other cut off by trimming from the shot images are displayed for the eye size selection buttons 731-1L to 731-3L.

The eye size selection button 731-1L is the button to be operated to select the size of the eyes shown in the shot image as they are. The eye size selection button 731-2L is the button to be operated to select a slightly large size thereof. The eye size selection button 731-3L is the button to be operated to select a large size thereof.

Face size selection buttons 732-1L to 732-3L to be the buttons used to adjust the size of the face are displayed in the lower row of the button area 722L. Images of the face each having a size different from each other cut off by trimming from the shot images are displayed for the face size selection buttons 732-1L to 732-3L.

The face size selection button 732-1L is the button to be operated to select the size of the face shown in the shot image as it is. The face size selection button 732-2L is the button to be operated to select a slightly small size thereof. The face size selection button 732-3L is the button to be operated to select a small size thereof.

An OK button 733L is displayed in the lower right of the button area 722L, and is operated to terminate the adjustment of the sizes of the eyes and the face.

Buttons are also displayed in a button area 722R that are same as the buttons displayed in the button area 722L. Eye size selection buttons 731-1R to 731-3R to be the buttons used to adjust the size of the eyes are displayed in the upper row of the button area 722R. Face size selection buttons 732-1R to 732-3R to be the buttons used to adjust the size of the face are displayed in the lower row thereof. An OK button 733R is displayed in the lower right of the button area 722R, and is operated to terminate the adjustment of the sizes of the eyes and the face.

When any one button of the eye size selection buttons 731-1L to 731-3L is operated, at step S123, the adjusting unit 334 detects an area of the eyes of the person same as the person displayed in the face image display area 721L from each of the shot images and adjusts the size of the eyes included in the detected area corresponding to the selected size.

When any one button of the face size selection buttons 732-1L to 732-3L is operated, the adjusting unit 334 detects an area of the face of the person same as the person displayed in the face image display area 721L from each of the shot images and adjusts the size of the face included in the detected area corresponding to the selected size.

When the eye size selection buttons 731-1R to 731-3R are operated or when the face size selection buttons 732-1R to 732-3R are operated, similarly, the adjusting unit 334 adjusts the sizes of the eyes and the face of the person same as the person displayed in the face image display area 721R shown in each of the shot images. When the OK button 733L and the OK button 733R are operated, the adjustment of the sizes of the eyes and the face is terminated.

As above, the adjustment of the size of the face not performed in the adjustment for the identification photograph image is enabled in the editing of the shot images. Assuming that the size of the face of the user shown in the identification photograph image can be adjusted by the user according to the user's taste, this is unfavorable because the believability of the identification photograph image is degraded. Any degradation of the believability of the identification photograph image can be prevented by setting the content that is adjustable in the editing of the shot images while that is not adjustable in the adjustment of the identification photograph image.

A difference can be set in each of the contents of other types of processing between the editing of the shot image and the adjustment of the identification photograph image, such as the case where makeup-like image processing is applicable to the shot image and the width of the face can be reduced in the editing of the shot image while these types of adjustment cannot be performed in the adjustment of the identification photograph image.

At step S124, the display control unit 322 causes the tablet built-in monitor 131 to display thereon a brightness adjustment screen that is a screen to be used to adjust the brightness of the skin of the user shown in the shot image.

Figure 49:
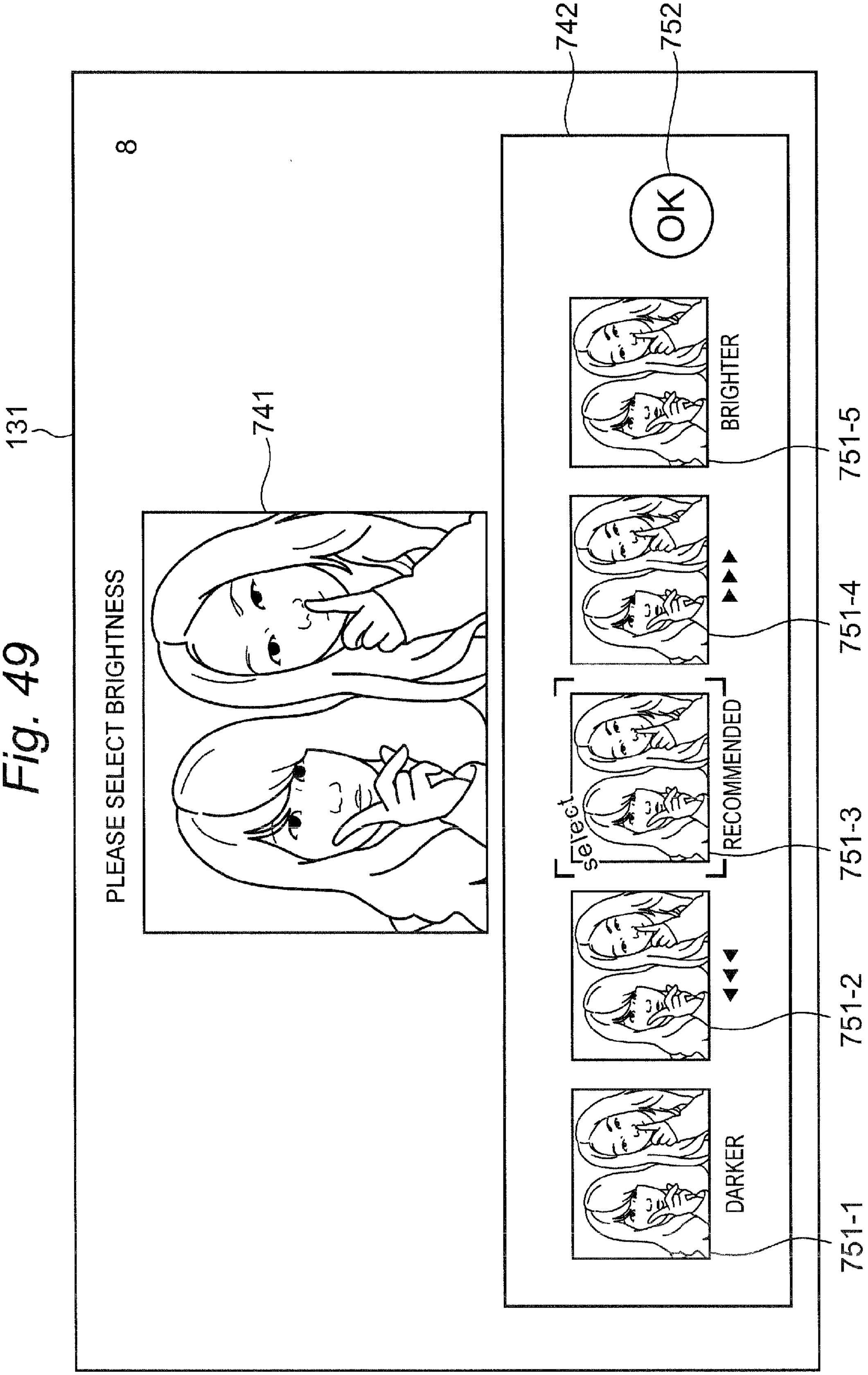
FIG. 49 is a drawing illustrating an example of a brightness adjustment screen.

FIG. 49 is a drawing illustrating an example of the brightness adjustment screen.

A message "PLEASE SELECT BRIGHTNESS" is displayed in the upper center of the brightness adjustment screen, and a display area 741 is disposed thereunder. The display area 741 has, for example, the first shot image displayed therein that is selected from the six shot images.

A button area 742 under the display area 741 has brightness selection buttons 751-1 to 751-5 displayed therein that are the buttons used to adjust the brightness of the skin. The button displayed more leftward is the button operated when the skin of a darker color is selected, and the button displayed more rightward is the button operated when the skin of a brighter color is selected. Images are used as the brightness selection buttons 751-1 to 751-5, that each show the person shown in the shot images displayed in the display area 741 having the color of the skin varied from that of each other.

An OK button 752 is displayed on the right of the brightness selection button 751-5, and is operated to terminate the adjustment of the brightness.

When any one button of the brightness selection buttons 751-1 to 751-5 is operated, at step S125, the adjusting unit 334 detects the area of the skin of the person from each shot image, and performs the adjustment for the detected area corresponding to the selected brightness. When the OK button 752 is operated, the adjustment of the brightness is terminated.

At step S126, the display control unit 322 causes the tablet built-in monitor 131 to display thereon a background selection screen that is the screen used for selecting the background of the user shown in the shot images.

Figure 50:
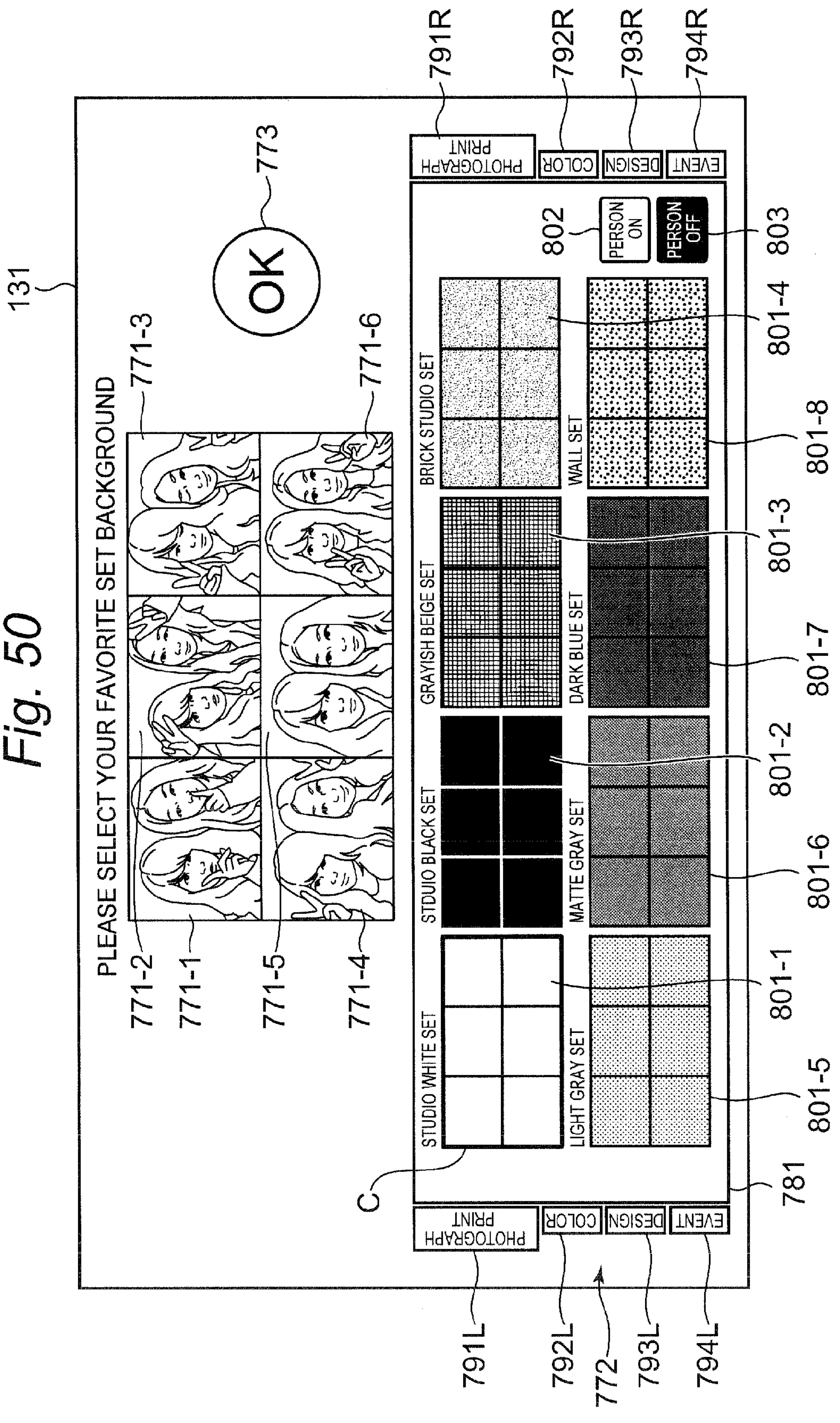
FIG. 50 is a drawing illustrating an example of a background selection screen.

FIG. 50 is a drawing illustrating an example of the background selection screen.

A message "PLEASE SELECT YOUR FAVORITE SET BACKGROUND" is displayed in the upper center of the background selection screen, and the six shot images are displayed thereunder disposed in two rows and three columns. The set background is the set of the background images set in advance and includes a plurality of background images selected according to a predetermined theme. When six shot images are present, one set of backgrounds includes a combination of six background images. The user can select a set of backgrounds to be combined with the shot images 771-1 to 771-6 from the background selection screen of FIG. 50.

The shot images 771-1 to 771-3 are disposed from the left in the upper row of the six shot images and the shot images 771-4 to 771-6 are disposed from the left in the lower row thereof. The shot images 771-1 to 771-6 are disposed in, for example, order of their shooting.

The shot images 771-1 to 771-6 are the images whose sizes of the eyes and the sizes of the faces, etc., are adjusted, and a white plain wall face inside the photographing space A1 (the inside of the back panel 51) is shown in the background of the two users shown as the objects to be shot. The background of the users shown in the shot images 771-1 to 771-6 is changed in real time in response to the selection of the background image.

A background image palette 772 is displayed under the shot images 771-1 to 771-6 that is a horizontally elongated area including sample images displayed therein of the set backgrounds and background images as choices. The background image palette 772 has tabs 791L to 794L displayed therein vertically arranged on the left of a display area 781 and tabs 791R to 794R displayed therein vertically arranged on the right thereof.

A name is set for each of the tabs, and a sample image is displayed in the display area 781 of the set backgrounds belonging to the group of the selected tab. In the example of FIG. 50, the tab 791L and the tab 791R are currently selected and are displayed enlarged compared to the other tabs.

The display area 781 has the set backgrounds 801-1 to 801-8 displayed therein that are the eight types of set backgrounds (the sample images of the set backgrounds) arranged in the upper and the lower rows each including the four thereof. The set backgrounds 801-1 to 801-8 each are set backgrounds including background images of predetermined colors. The six background images having the respective set backgrounds are used for combining with the respective shot images which are arranged at the corresponding positions, respectively.

A button 802 and a button 803 displayed on the right of the set background 801-8 are buttons to be operated to select whether the persons (the users shown in the shot image) are caused to be displayed on the set backgrounds 801-1 to 801-8 or not.

In the example of FIG. 50, for example, the user on the left selects the set background 801-1 using the stylus pen 132A and the cursor C is displayed to surround the set background 801-1. Selecting the set background 801-1 causes the shot images 771-1 to 771-6 to be displayed combined with the background image having the set background 801-1.

An OK button 773 is displayed on the right of the shot images 771-1 to 771-6 that is operated to terminate the selection of the background. For example, when the OK button 773 is pressed with the set background 801-2 selected, the selection of the background is finished and the background images having the set background 801-2 are combined with the shot images.

When the OK button 773 in the background selection screen is pressed, at step S127, the adjusting unit 334 adjusts the backgrounds of the shot images by combining the background images selected by the user (the background images having the background set), to produce the shot images to be edited. The shot images to be edited are the images acquired by adjusting the sizes of the eyes and the head, and the brightness of the skin of the user and the background shown in the shot images.

When the selection of the background image is finished, at step S128, the display control unit 332 causes the tablet built-in monitor 131 to display thereon an editing screen.

Figure 51:
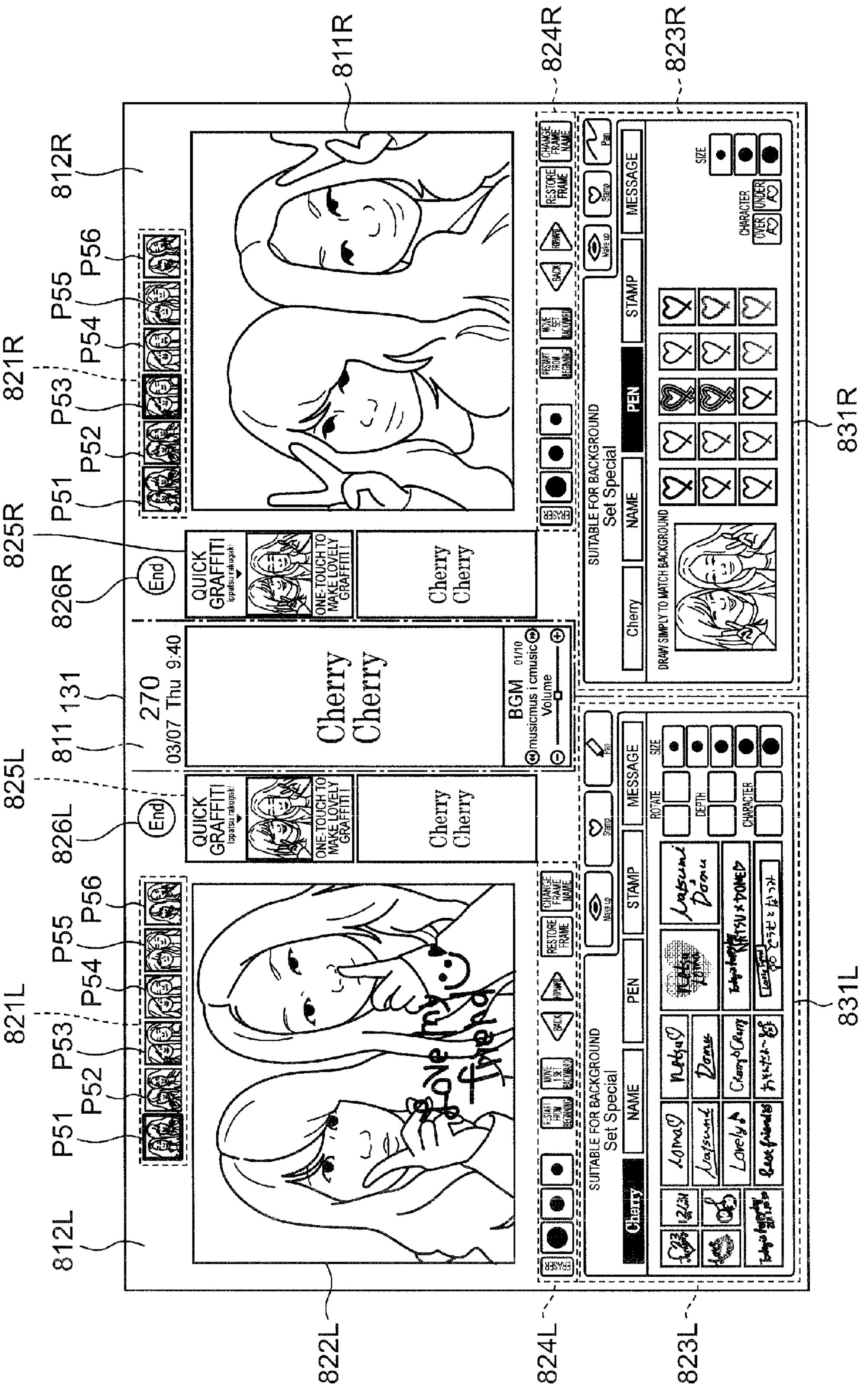
FIG. 51 is a drawing illustrating an example of an editing screen.

FIG. 51 is a drawing illustrating an example of the editing screen.

The editing screen includes its main configurations disposed symmetrically on the right and the left portions thereof. An area 812L to be the left half area thereof is the area used by the user present on the left facing the tablet built-in monitor 131, and an area 812R to be the right half area thereof is the area used by the user present on the right facing the tablet built-in monitor 131. An area 811 in the upper center thereof has the remaining time period for the editing process, etc., displayed therein. Dashed and dotted lines and dashed lines surrounding the areas of FIG. 51 are not actually displayed in the screen.

A thumbnail image display area 821L in the upper center of the area 812L is a display area of thumbnail images showing the shot images. The user selects the shot image to be edited by selecting the thumbnail image displayed in the thumbnail image display area 821L.

In the example of FIG. 51, the thumbnail images P51 to P56 showing the six shot images are displayed arranged in order of the shooting, and selecting the leftmost thumbnail image P51 causes the first shot image to be the shot image to be edited.

A relatively large editing area 822L disposed at the substantial center of the area 812L is the display area for the shot image selected as the shot image to be edited. The user selects using the stylus pen 132A a favorite editing tool from those whose samples are displayed in an edit palette 831L and subsequently designates the position in the shot image displayed in the editing area 822L. Thereby, the user can perform the editing by combining the composite-use image such as the hand-written characters, the stamp images, etc., with the shot image at the designated positions.

An edit palette display area 823L under the editing area 822L is a display area of the edit palette 831L to be used to select the various types of editing tool such as the stamp images. The editing tools displayed in the editing pallet are classified in categories and selecting the tab enables switching of the editing tool displayed on the edit palette 831L.

A correction tool selection area 824L above the edit palette display area 823L is the area including such buttons displayed therein arranged side by side as a button to be used to select an eraser tool to be a tool used to erase the input editing and buttons operated when the work step is returned to the immediately previous step or the immediately succeeding step.

A quick graffiti button 825L on the right of the editing area 822L is a button to be operated to perform the editing using a quick graffiti function. The quick graffiti function is a function for collectively combining an editing of a content, which is preset by combining various types of editing tools, with the shot image to be edited.

A finish button 826L to be operated to finish the editing process is displayed above the quick graffiti button 825L.

The area 812R has the same configurations disposed therein as the configurations of the area 812L at the symmetrical positions to those. In the example of FIG. 51, selecting the thumbnail image P53 from the thumbnail image display area 821R causes the third shot image to be edited.

Figure 47:
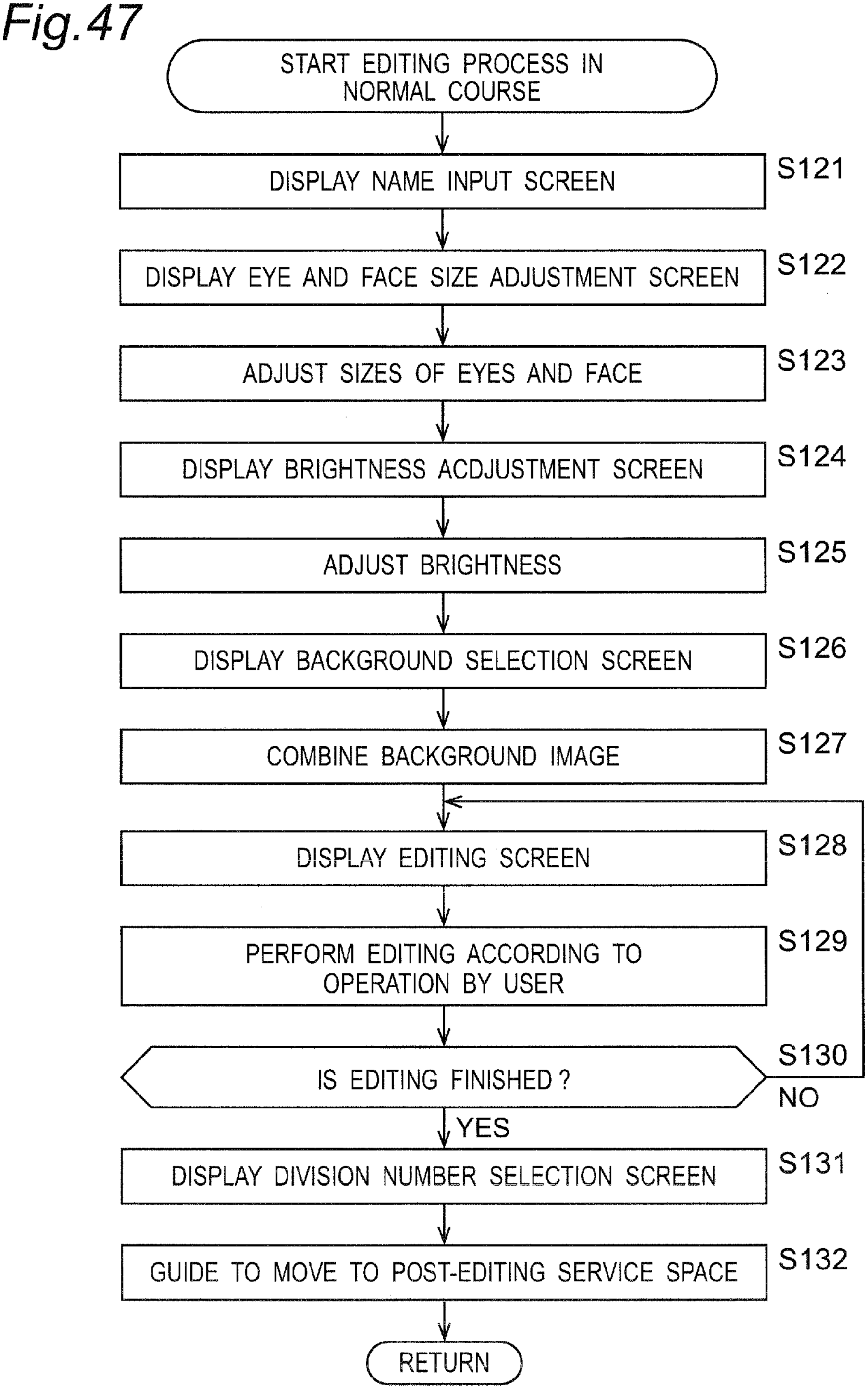
FIG. 47 is a flowchart for describing an editing process of the shot image performed at step S8 of FIG. 18.

Returning back to the description with reference to FIG. 47, at step S129, the editing unit 333 performs the editing of the shot image according to the operation to the edited image by the user. The edited image produced by the performing of the editing is transmitted from the editing unit 333 to the image storing unit 335 to be stored therein. The editing of the shot image is continued, for example, until a predetermined time period set in advance elapses or until the finish button 826L or 826R prepared in the editing screen is operated.

At step S130, the editing unit 333 determines whether the editing is finished and, when the editing unit 333 determines that the editing is not finished, repeats the processes at step S128 and thereafter.

When the editing unit 333 determines at step S130 that the editing is finished based on the fact that the limited time period elapses or that the finish button 826L or 826R in the editing screen is operated, at step S131, the display control unit 332 causes the tablet built-in monitor 131 to display thereon a division number selection screen. The division number selection screen is the screen to be used to select a layout used to print the edited image produced by the editing work on a sticker sheet.

Figure 52:
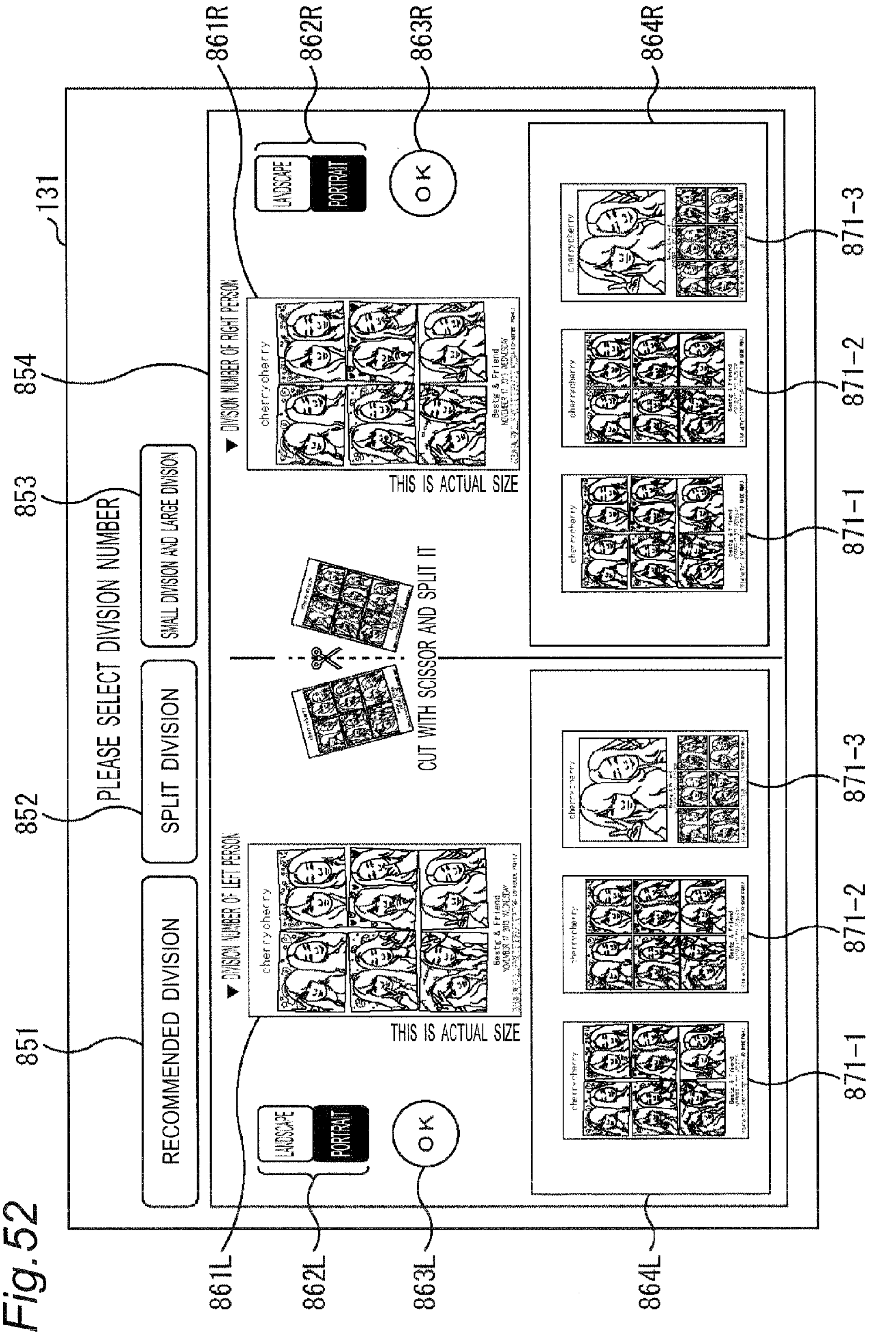
FIG. 52 is a drawing illustrating an example of a division number selection screen.

FIG. 52 is a drawing illustrating an example of the division number selection screen.

A message "PLEASE SELECT DIVISION NUMBER" is displayed in the upper center of the division number selection screen, and such buttons are displayed thereunder as a selection button 851 to be operated to select "RECOMMENDED DIVISION", a selection button 852 to be operated to select "SPLIT DIVISION", and a selection button 853 to be operated to select "SMALL DIVISION AND LARGE DIVISION". The display of the choices of the division number displayed in an area 854 thereunder is switched in response to an operation of any one of the selection buttons 851 to 853.

The area 854 includes its main configurations disposed in its left and its right portions. The two users can each select the user's favorite division number.

A print preview image 861L showing the currently selected division number is displayed on the left of the area 854. The print preview image 861L is an image having the edited image produced by the editing process arranged therein in the currently selected layout. A portrait/landscape selection button 862L and an OK button 863L are displayed on the left of the print preview image 861L. The OK button 863L is the button to be operated to terminate the selection of the division number.

A layout display area 864L has images 871-1 to 871-3 displayed therein that are sample images of the division number.

A print preview image 861R showing the currently selected division number is also displayed on the right of the area 854, and a portrait/landscape selection button 862R and an OK button 863R are also displayed on the right thereof. A layout display area has the images 871-1 to 871-3 displayed therein that are the sample images of the division number.

When a predetermined layout is selected from the division number selection screen, at step S132, the display control unit 332 guides the user who finished the editing to move to the post-editing service space A3. The guiding of the move to the post-editing service space A3 is performed by causing the tablet built-in monitor 131 to display thereon the screen or by outputting an audio message from the speaker 231. Thereafter, the procedure returns to step 38 and the processes at step S8 and thereafter are performed.

[Printing Process in Normal Course]

Figure 53:
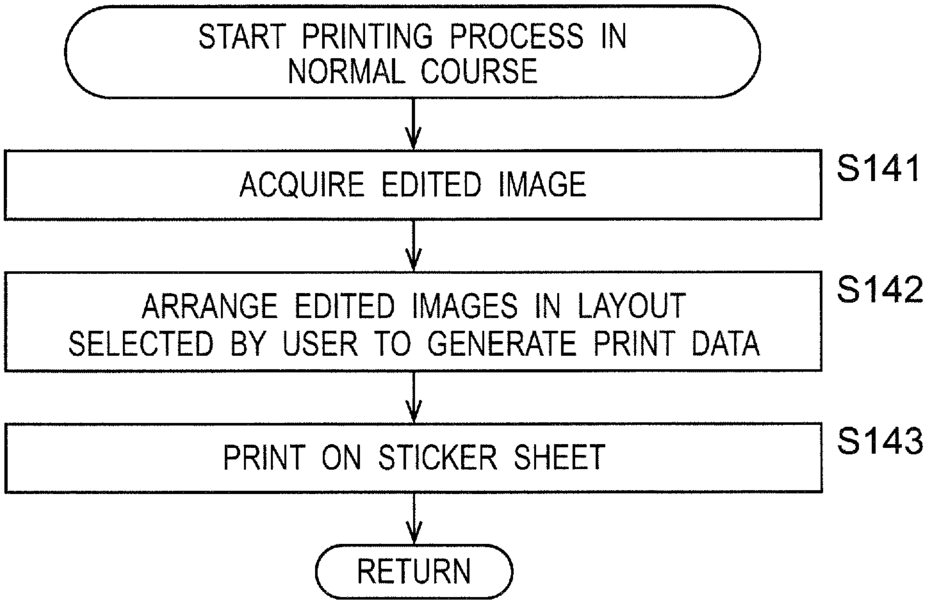
FIG. 53 is a flowchart for describing the printing process of an edited image performed at step S9 of FIG. 18.

A printing process of the edited images performed at step S9 of FIG. 18 will be described with reference to a flowchart of FIG. 53.

At step S141, the print data producing unit 341 of the print managing unit 303 reads and acquires the edited images stored in the image storing unit 335.

At step S142, the print data producing unit 341 arranges the edited images in the layout selected by the user using the division number selection screen to produce the print data. The print data producing unit 341 outputs the produced print data to the printer control unit 342.

At step S143, the printer control unit 342 controls the printer 241 to print the edited images on a sticker sheet based on the print data produced by the print data producing unit 341. Thereby, a sticker sheet as described with reference to FIG. 8A or 8B is produced and is ejected to the sticker sheet ejecting opening 163. Thereafter, the procedure returns to step S9 of FIG. 18 and the processes at step S9 and thereafter are performed.

[Post-Editing Service Process in Normal Course]

Figure 54:
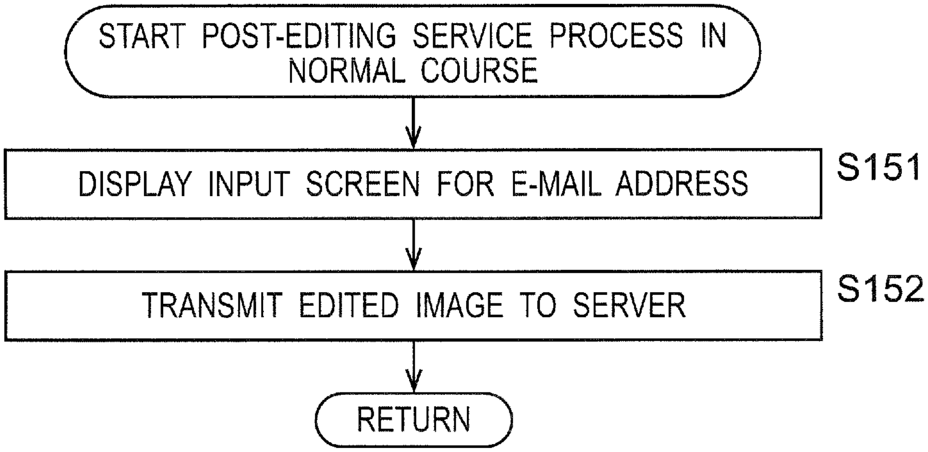
FIG. 54 is a flowchart for describing the post-editing service process performed at step S10 of FIG. 18.

A post-editing service process performed at step S10 of FIG. 18 will be described with reference to a flowchart of FIG. 54.

At step S151, the display control unit 351 of the post-editing service managing unit 304 causes the tablet built-in monitor 161 to display thereon an input screen for an e-mail address. The input screen for an e-mail address is the same screen as the screen described with reference to FIG. 43.

When an e-mail address is input into this input screen, at step S152, the communication control unit 352 transmits to the server the data on the edited images read from the image storing unit 335 and the e-mail address. The display control unit 351 causes the tablet built-in monitor 161 to display thereon an introduction screen of the photograph sticker creating apparatus 1 and causes the process to come to an end. Thereafter, the procedure returns to step S10 of FIG. 18 and the series of processes in the normal course come to an end.

As above, by selecting the normal course, the user can acquire the sticker sheet with the edited images printed thereon after the shooting together with the user's friends and playing with the editing.

<Example of Sequence Management>

As described above, the photograph sticker creating apparatus 1 enables a plurality of groups of users to pursue their games in parallel. Each of the groups may include one user or may include a plurality of users.

Figure 55:
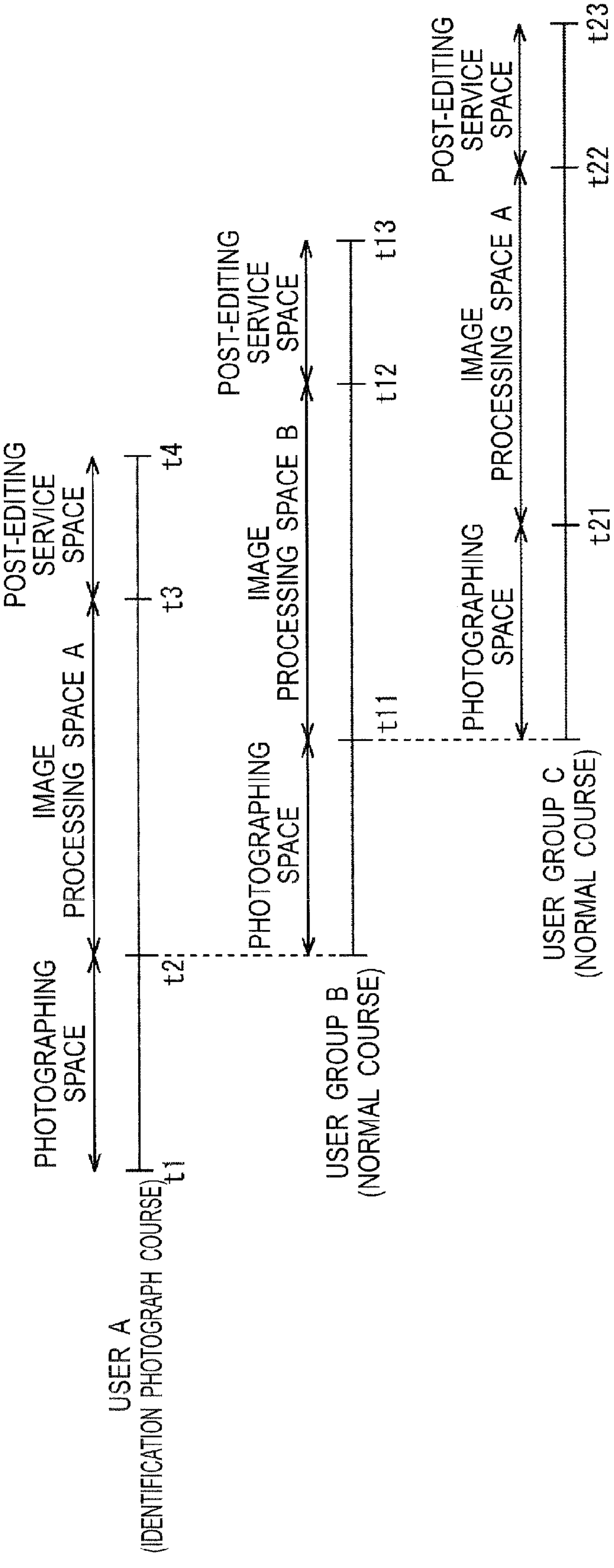
FIG. 55 is a diagram illustrating a first example of a timing chart of processes by the photograph sticker creating apparatus.

FIG. 55 is a diagram illustrating an example of a timing chart of the processes by the photograph sticker creating apparatus 1 providing each of a plurality of groups with the game function.

In the example of FIG. 55, the user first starting to use the photograph sticker creating apparatus 1 is a user "A" that is one user, and the user starting to use the photograph sticker creating apparatus 1 following the user A is a user group B that is a group of a plurality of users. The user starting to use the photograph sticker creating apparatus 1 following the user group B is a user group C that is a group of a plurality of users. It is assumed that the user A selects the identification photograph course and the user groups B and C each select the normal course.

At a time t1, the user A enters the photographing space (the photographing space A1), selects the identification photograph course, and, thereafter, starts the shooting. After the shooting, at a time t2, the user A moves from the photographing space to the image processing space A (the image processing space A2-1) and starts adjusting the identification photograph image.

On the other hand, at the time t2, the user group B enters the photographing space from where the user "A" had already left, selects the normal course, and, thereafter, starts the shooting. After the shooting, at a time t11, the user A moves from the photographing space to the image processing space B that is the empty one of the image processing spaces (the image processing space A2-2) and starts editing the shot images.

At the time t11, the user group Centers the photographing space from where the user group B had already left, selects the normal course, and, thereafter, starts the shooting.

At a time t3, the user A performing the adjustment of the identification photograph image in the image processing space A moves from the image processing space A to the post-editing service space (the post-editing service space A3) and transmits the identification photograph image using the function of to-mobile transmission.

At a time t21, the user group C performing the shooting in the photographing space moves from the photographing space to the image processing space "A" that is the image processing spaces from where the user A had already left, and starts editing the shot images.

At a time t4 at which the printing is completed, the user A receives the sticker sheet with the identification photograph image printed thereon and the game in the identification photograph course ends.

At a time t12, the user group B performing the editing of the shot images in the image processing space B moves from the image processing space B to the post-editing service space from where the user A had already left, and transmits the edited images using the function of to-mobile transmission. At a time t13 at which the printing is completed, the user group B receives the sticker sheet with the edited images printed thereon, and the game in the normal course ends.

At a time t22, the user group C performing the editing of the shot images in the image processing space A moves from the image processing space A to the post-editing service space from where the user group B had already left, and transmits the edited images using the function of to-mobile transmission. At a time t23 at which the printing is completed, the user group C receives the sticker sheet with the edited images printed thereon, and the game in the normal course ends.

As described above, the photograph sticker creating apparatus 1 can perform the processes in the identification photograph course and the processes in the normal course in parallel, even when a user group selecting the normal course appears during the performing of the processes in the identification photograph course.

Figure 56:
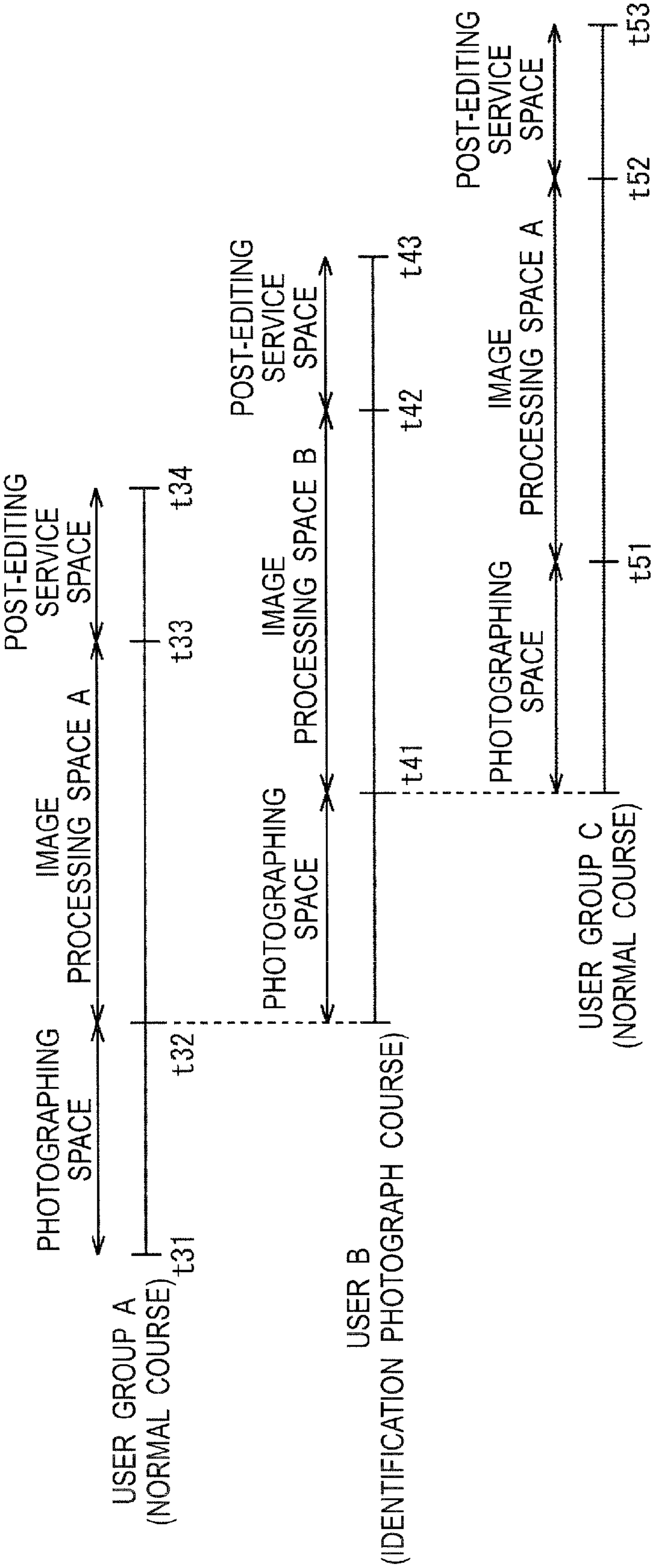
FIG. 56 is a diagram illustrating a second example of the timing chart of the processes by the photograph sticker creating apparatus.

FIG. 56 is a diagram illustrating another example of the timing chart of the processes by the photograph sticker creating apparatus 1 providing each of a plurality of groups with the game function.

In the example of FIG. 56, the user first starting to use the photograph sticker creating apparatus 1 is a user group "A" that is a group of a plurality of users, and the user starting to use the photograph sticker creating apparatus 1 following the user group A is a user B that is one user. The user starting to use the photograph sticker creating apparatus 1 following the user B is a user group C that is a group of a plurality of users. It is assumed that the user groups A and C each select the normal course and the user B selects the identification photograph course.

At a time t31, the user group A enters the photographing space, selects the normal course, and, thereafter, starts the shooting. After the shooting, at a time t32, the user group A moves from the photographing space to the image processing space A and starts editing the shot images.

On the other hand, at the time t32, the user B enters the photographing space from where the user group A had already left, selects the identification photograph course, and, thereafter, starts the shooting. After the shooting, at a time t41, the user B moves from the photographing space to the image processing space B that is the empty one of the image processing spaces and starts adjusting the identification photograph image.

At the time t41, the user group C enters the photographing space from where the user B had already left, selects the normal course, and, thereafter, starts the shooting.

At a time t33, the user group A performing the editing of the shot images in the image processing space A moves from the image processing space A to the post-editing service space and transmits the edited images using the function of to-mobile transmission.

At a time t51, the user group C performing the shooting in the photographing space moves from the photographing space to the image processing space A that is the image processing space from where the user group A had already left and starts editing the shot images.

At a time t34 at which the printing is completed, the user group A receives the sticker sheet with the edited images printed thereon, and the game in the normal course ends.

At a time t42, the user B performing the adjustment of the identification photograph image in the image processing space B moves from the image processing space B to the post-editing service space from where the user group A had already left and transmits the identification photograph image using the function of to-mobile transmission. At a time t43 at which the printing is completed, the user B receives the sticker sheet with the identification photograph image printed thereon, and the game in the identification photograph course ends.

At a time t52, the user group C performing the editing of the shot images in the image processing space A moves from the image processing space A to the post-editing service space from where the user B had already left, and transmits the edited images using the function of to-mobile transmission. At a time t53 at which the printing is completed, the user group C receives the sticker sheet with the edited images printed thereon, and the game in the normal course ends.

As above, the photograph sticker creating apparatus 1 can perform the processes in the normal course and the processes in the identification photograph course in parallel, even when a user selecting the identification photograph course appears during the performing of the processes in the normal course.

Figure 57:
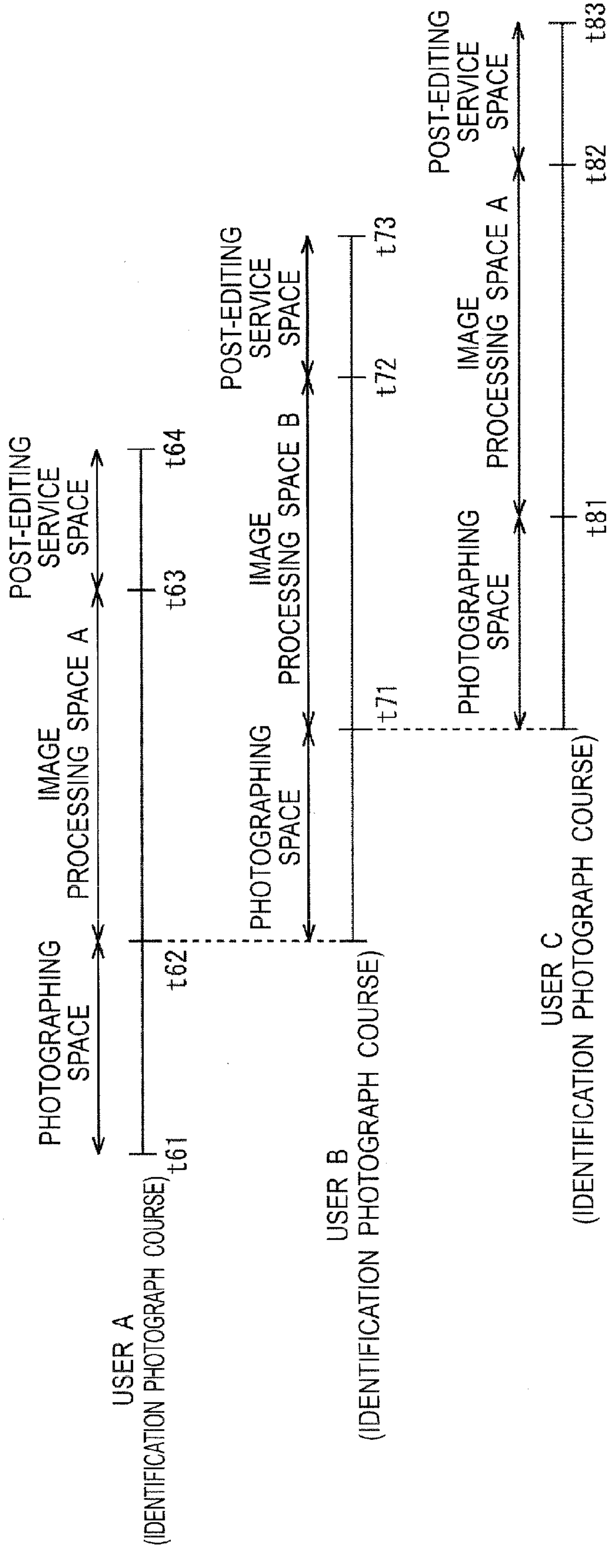
FIG. 57 is a diagram illustrating a third example of the timing chart of the processes by the photograph sticker creating apparatus.

FIG. 57 is a diagram illustrating yet another example of the timing chart by the processes of the photograph sticker creating apparatus 1 providing each of a plurality of groups with the game function.

In the example of FIG. 57, the user first starting to use the photograph sticker creating apparatus 1 is a user A that is one user, and the user starting to use the photograph sticker creating apparatus 1 following the user A is a user B that is also one user. The user starting to use the photograph sticker creating apparatus 1 following the user B is a user C that is also one user. It is assumed that the users A to C each select the identification photograph course.

At a time t61, the user A enters the photographing space, selects the identification photograph course, and, thereafter, starts the shooting. After the shooting, at a time t62, the user A moves from the photographing space to the image processing space A and starts adjusting the identification photograph image.

On the other hand, at the time t32, the user B enters the photographing space from where the user A had already left, selects the identification photograph course, and, thereafter, starts the shooting. After the shooting, at a time t71, the user B moves from the photographing space to the image processing space B that is the empty one of the image processing spaces and starts adjusting the identification photograph image.

At the time t71, the user C enters the photographing space from where the user B had already left, selects the identification photograph course, and, thereafter, starts the shooting.

At a time t63, the user A performing the adjustment of the identification photograph image in the image processing space A moves from the image processing space A to the post-editing service space and transmits the identification photograph image using the function of to-mobile transmission.

At a time t81, the user C performing the shooting in the photographing space moves from the photographing space to the image processing space A that is the image processing space from where the user A had already left, and starts adjusting the identification photograph image.

At a time t64 at which the printing is completed, the user A receives the sticker sheet having the identification photograph image printed thereon, and the game in the identification photograph course ends.

At a time t72, the user B performing the adjustment of the identification photograph image in the image processing space B moves from the image processing space B to the post-editing service space from where the user A had already left, and transmits the identification photograph image using the function of to-mobile transmission. At a time t73 at which the printing is completed, the user B receives the sticker sheet having the identification photograph image printed thereon, and the game in the identification photograph course ends.

At a time t82, the user C performing the adjustment of the identification photograph image in the image processing space A moves from the image processing space A to the post-editing service space from where the user B had already left, and transmits the identification photograph image using the function of to-mobile transmission. At a time t83 at which the printing is completed, the user C receives the sticker sheet having the identification photograph image printed thereon, and the game in the identification photograph course ends.

As above, the photograph sticker creating apparatus 1 can perform the processes in the plurality of identification photograph courses in parallel, even when another user selecting the identification photograph course appears during the performing of the processes in the identification photograph course.

The sequence managing unit 305 manages the above timings of the processes.

<Variations>

[Example of Selection of Shot Image to be Edited]

Though all the shot images acquired by the shooting process are used to be edited in the normal course in the above, only the shot images selected from the shot images acquired by the shooting process may be used to be edited. For example, when six shootings are performed in the shooting process, four shot images selected from the six shot images are used to be edited.

When selection of the shot images to be edited is performed, the selection is performed in the photographing space A1. In the identification photograph course, the selection of the one shot image to be the identification photograph image is performed in the image processing space A2-1 or A2-2 before the adjustment of the identification photograph image while, in the normal course, the selection of the shot image to be edited is performed in the photographing space A1 before the move to the image processing space A2-1 or A2-2.

Figure 58:
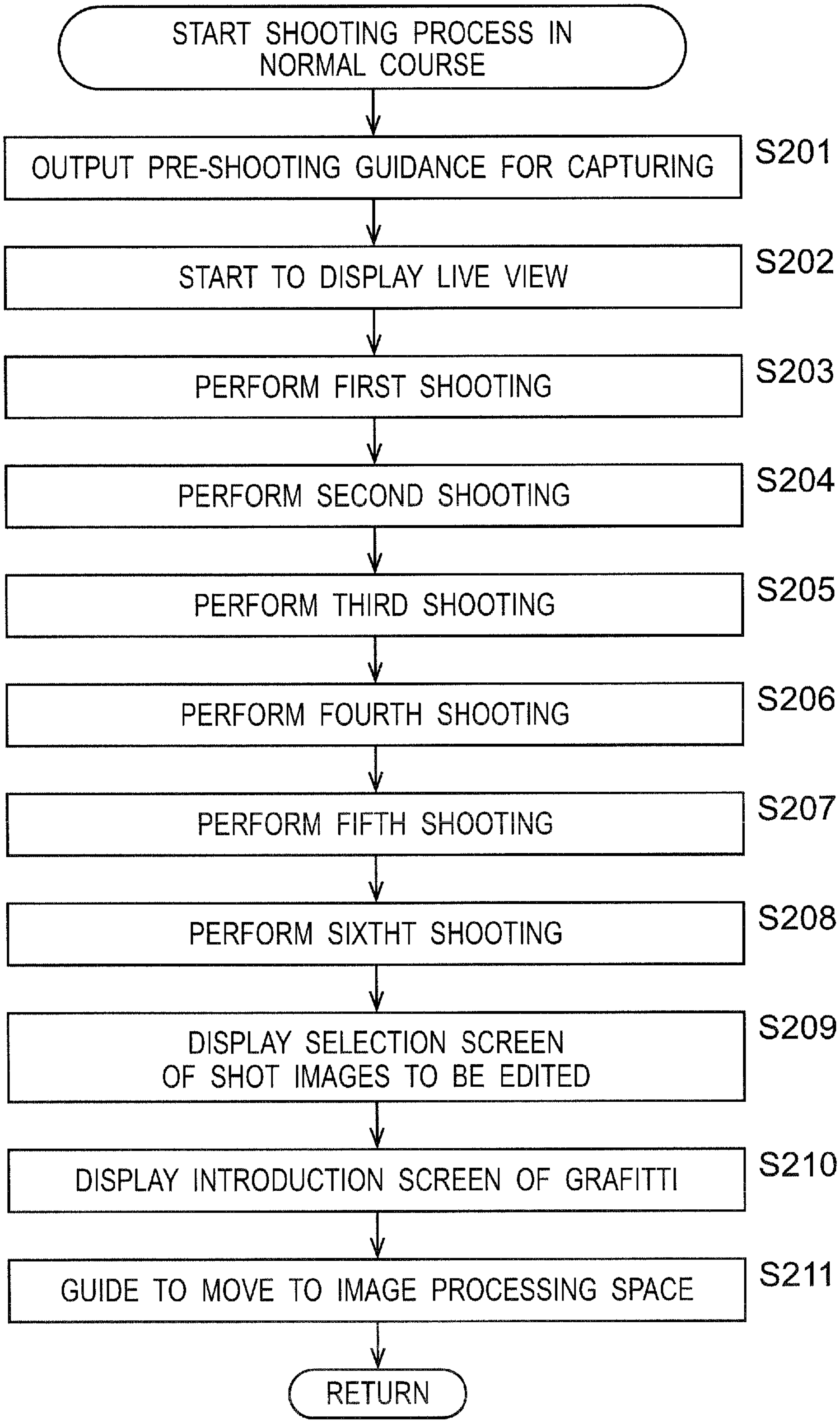
FIG. 58 is a flowchart for describing another shooting process in the normal course performed at step S7 of FIG. 18.

The shooting process in the normal course in the case where the selection of the shot images to be edited is present will be described with reference to a flowchart of FIG. 58. The process of FIG. 58 is the process performed at step S7 of FIG. 18.

Processes at steps S201 to S203 are the processes same as the processes at steps S101 to S108 described with reference to FIG. 45. At step S201, the guidance output control unit 321 of the shooting managing unit 301 outputs the pre-shooting guidance and, at step S202, the display control unit 322 starts to display the live view.

At steps S203 to S208, the camera control unit 323 performs the first to the sixth shootings. The camera control unit 323 outputs the six shot images to the display control unit 322, and also to the shot image storing unit 324 to store the shot images therein.

At step S209, the display control unit 322 causes the touch panel monitor 92 to display thereon the selection screen of the shot images to be edited. For example, the selection screen has the six shot images displayed and arranged therein. The user selects a predetermined number of shot images, such as four shot images, to be edited from among the six shot images.

When the selection of the shot images to be edited comes to an end, at step S210, the display control unit 322 causes the touch panel monitor 92 to display thereon the introduction screen of the graffiti and, at step S211, guides the user to move to the image processing space A2-1 or the image processing space A202.

The user exits the photographing space A1, moves to the guided one of the image processing spaces, and edits the shot images selected to be edited. Thereafter, the procedure returns to step S7 of FIG. 18 and the processes at step S7 and thereafter are performed.

As above, the performing of the selection of the shot images to be edited in the photographing space A1 enables a long time period assigned to the editing to be secured. Preferably, the time period for the editing is long as much as possible because complicated operations accompany such as inputting of the hand-written characters, the editing is necessary for the plurality of shot images, etc.

On the other hand, as described with reference to FIG. 31, the adjustment of the identification photograph image performed in the image processing space A2-1 or A2-2 in the identification photograph course includes only the selection from the choices by pressing the buttons and takes a short time compared with the editing in the normal course. In addition, the image to be adjusted is one.

In the identification photograph course, the selection of the shot image to be the identification photograph image is performed in the image processing space A2-1 or A2-2 and, thereby, the balance can be achieved between the time period for the work performed in the image processing space A2-1 or A2-2 in the identification photograph course and the time period for the work performed in the image processing space A2-1 or A2-2 in the normal course, and the game can efficiently proceed. Though the game may be unable to efficiently proceed as described with reference to FIGS. 55 to 57 when the difference is significant in the time period for the work performed in the image processing space A2-1 or A2-2 between the courses, such a case can be prevented.

[Examples of Adjustment of Image for Identification Photograph]

Variation 1

In the example of FIG. 31, one type of mode can be selected from the three types of mode whose names are set to be "CLEAN", "HEALTHY", and "GORGEOUS" as the adjustment using the quick retouch function. Multiple types of modes however may be able to be selected.

Figure 59:
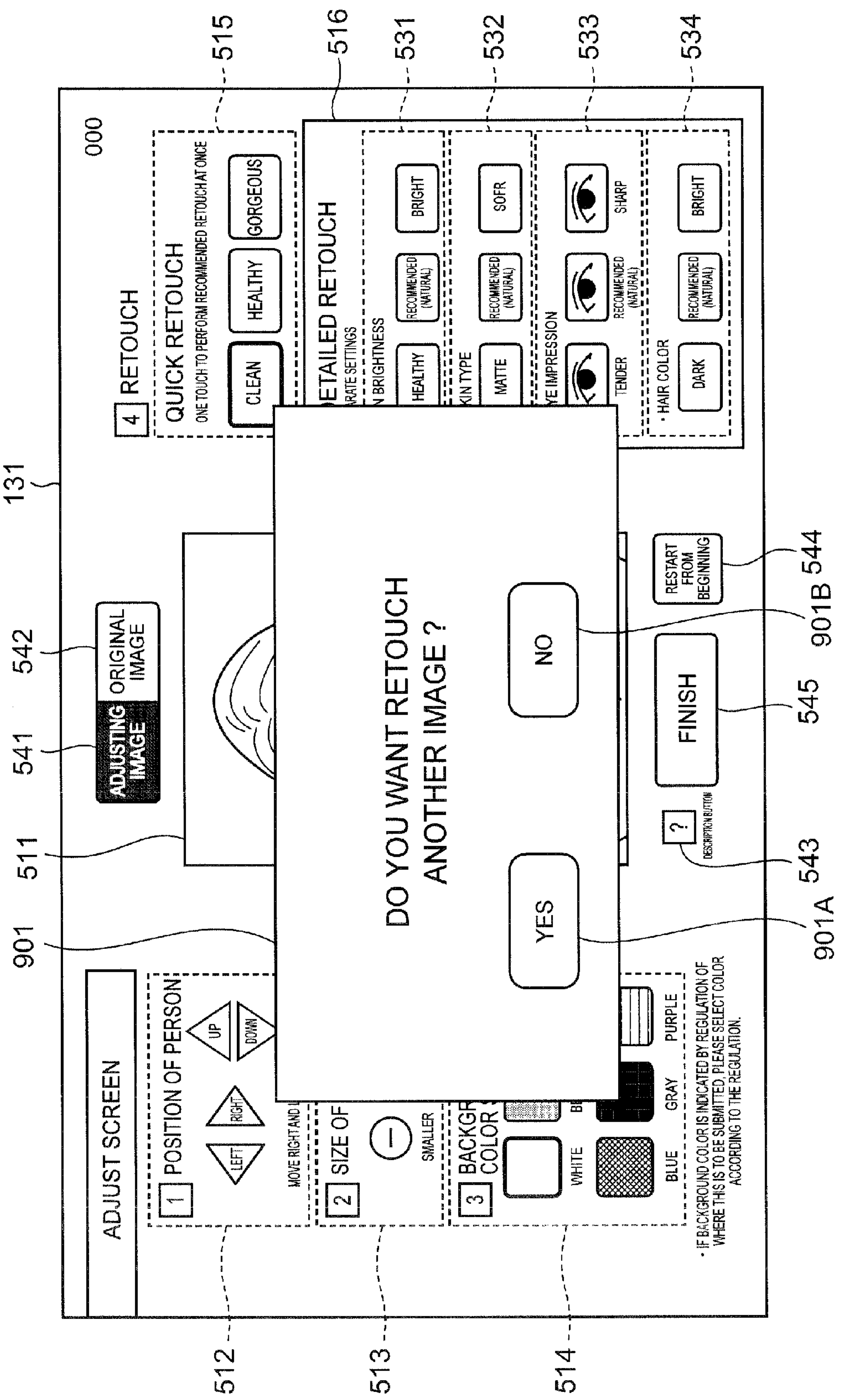
FIG. 59 is a drawing illustrating an example of an adjustment screen.

FIG. 59 is a drawing illustrating an example of an adjustment screen displayed after the first type of mode of the quick retouch function is selected.

For example, the mode "HEALTHY" is selected and the identification photograph image whose picture condition is adjusted by the adjusting unit 334 is displayed in the adjusted image display area 511 and, thereafter, as shown in FIG. 59, a window 901 is displayed superimposed on the adjusted image display area 511.

A message "DO YOU WANT TO RETOUCH ANOTHER IMAGE" is displayed in the center of the window 901 and such buttons are displayed thereunder as a button 901A that is a YES button operated to use the one more type of mode and a button 901B that is a NO button operated not to use any more type of mode. When the button 901A which is a YES button is operated, the window 901 is closed and the display in the adjustment screen becomes in the state that the modes for the quick retouch is selectable. On the other hand, when the button 901B to be the NO button is operated, the window 901 is closed and the display in the adjustment screen returns to the state of FIG. 31.

When the mode "CLEAN" is selected that is the mode other than the already selected mode "HEALTHY" by operating the button 901A which is a YES button and subsequently operating, for example, the mode selection button 515A, the adjusting unit 334 adjusts the picture condition of the identification photograph image corresponding to the mode "CLEAN". The adjusting unit 334 manages the pieces of data on the three types of identification photograph image that are the identification photograph image before the adjustment (without the adjustment), the identification photograph image adjusted according to the first type of mode, and the identification photograph image adjusted according to the second type of mode. The image for the DI photograph after the adjustment of the picture condition is transmitted to the display control unit 332 and is displayed in the adjusted image display area 511.

Figure 60:
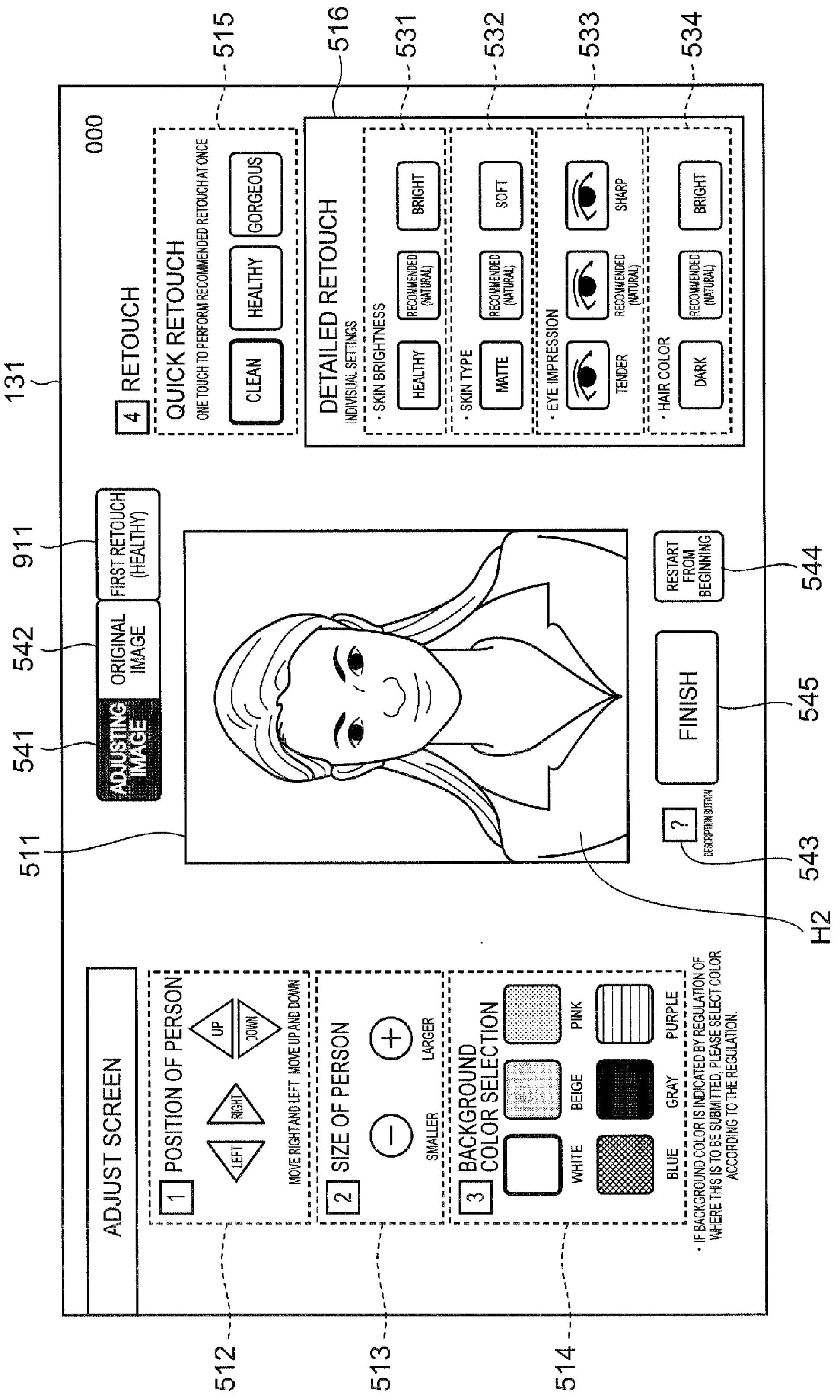
FIG. 60 is a drawing illustrating an example of the adjustment screen.

FIG. 60 is a drawing illustrating an example of the adjustment screen displayed after the second type of mode is selected.

In the adjustment screen of FIG. 60, the identification photograph image displayed in the adjustment screen display area 511 is the identification photograph image after the adjustment whose picture condition is adjusted according to the second type of mode.

A switching button 911 is displayed above the adjusted image display area 511 in addition to the during-adjustment button 541 and the before-adjustment button 542. The during-adjustment button 541 is the button operated to cause the identification photograph image during the adjustment, that is, in this example, the identification photograph image whose picture condition is adjusted according to the mode "CLEAN" to be the second type of mode to be displayed in the adjusted image display area 511, and the "before adjustment" button 512 is the button operated to cause the identification photograph image before the adjustment to be displayed in the adjusted image display area 511.

The switching button 911 is the button operated to cause the identification photograph image whose picture condition is adjusted according to the first retouch, that is, the first type of mode "HEALTHY" to be displayed in the adjusted image display area 511.

The user can watch for comparison the identification photograph images whose picture conditions are adjusted using the two types of mode of the quick retouch by alternately operating the during-adjustment button 541 and the switching button 911. The user can watch for comparison the identification photograph images whose picture conditions are adjusted using the two types of mode and the identification photograph image before the adjustment by operating the before-adjustment button 542.

Either identification photograph image may be able to be selected from the identification photograph images whose picture conditions are adjusted using the two types of mode, and printed on a sticker sheet, or the predetermined number of each of the identification photograph images having the two types of picture conditions may be able to be printed on a sticker sheet.

Variation 2

Though the one identification photograph image selected from the shot images can be adjusted in the above, a plurality of identification photograph images may be able to be adjusted. For example, the case will be described where two identification photograph images can each be adjusted. In this case, the selection of the identification photograph image described with reference to FIG. 27 is not performed.

Figure 61:
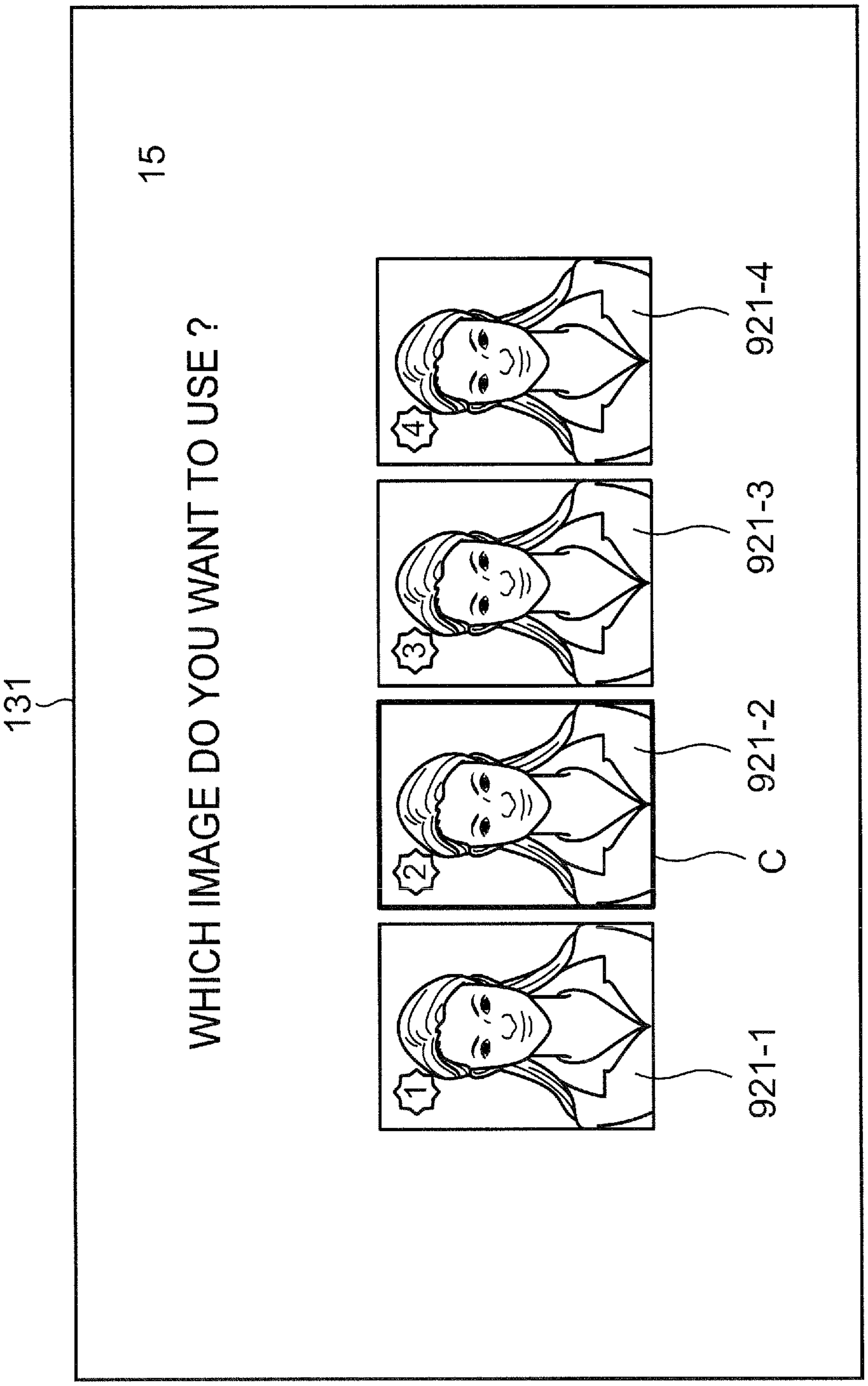
FIG. 61 is a drawing illustrating an example of a selection screen of the identification photograph image.

FIG. 61 is a drawing illustrating an example of the selection screen of the identification photograph images to be adjusted. The selection screen depicted in FIG. 61 is displayed on, for example, the tablet built-in monitor 131 before the display of the adjustment screen.

A message "WHICH IMAGE DO YOU WANT TO USE?" is displayed above the selection screen of FIG. 61 and four shot images 921-1 to 921-4 acquired by the shooting process are displayed under the message. A number indicating the order of the shooting is attached to each of the shot images in the upper left thereof. The remaining time period for the selection is displayed in the upper right of the selection screen.

Figure 62:
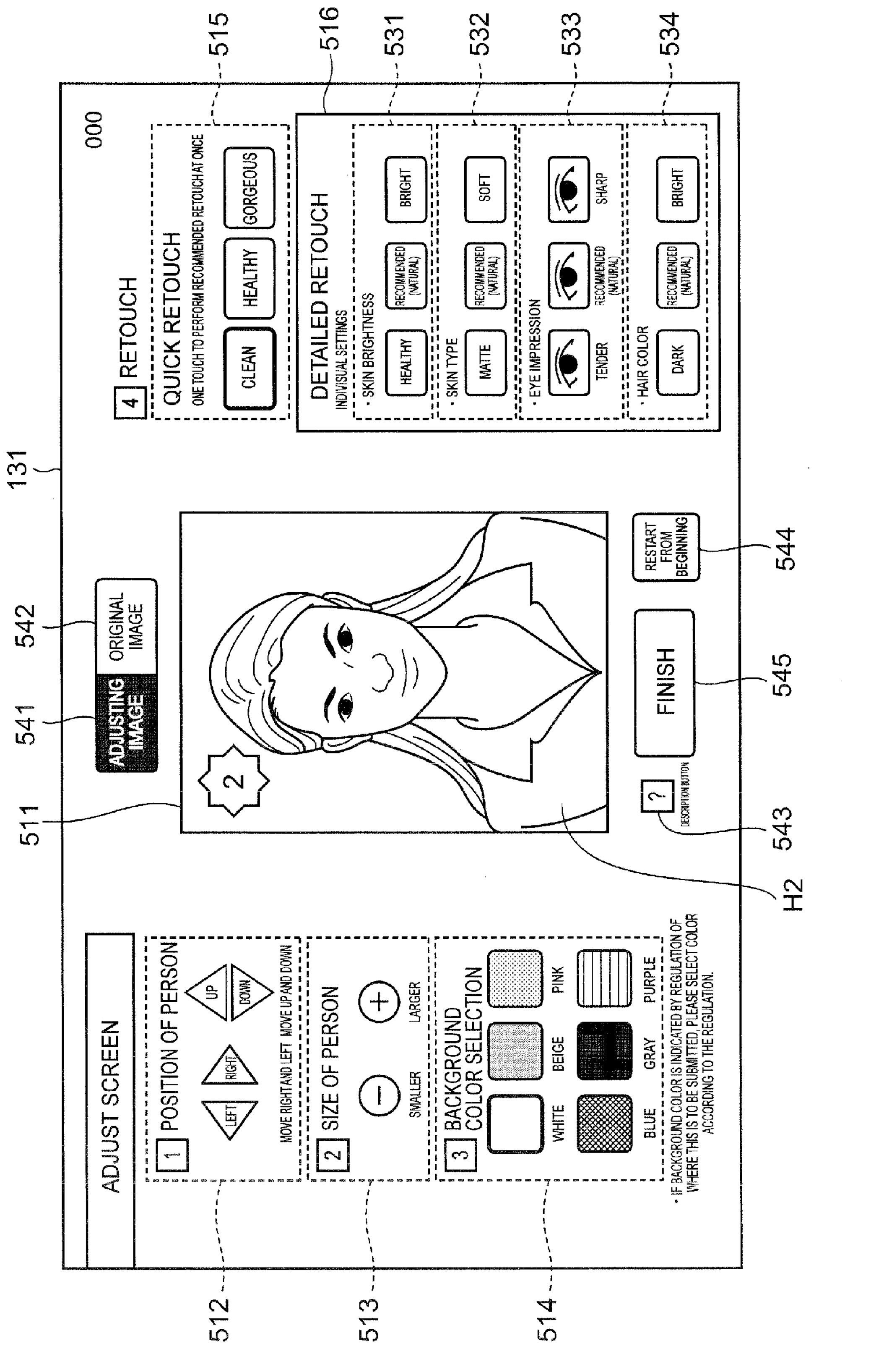
FIG. 62 is a drawing illustrating an example of the adjustment screen.

When the shot image 921-2 is selected that is the shot image acquired by the second shooting as indicated by surrounding the shot image by the cursor C, as shown in FIG. 62, the adjusted image display area 511 of the adjustment screen has the selected shot image displayed therein as the first identification photograph image to be adjusted.

The user adjusts the first identification photograph image to be adjusted for the position and the size of the person, the background, and the picture condition.

Figure 63:
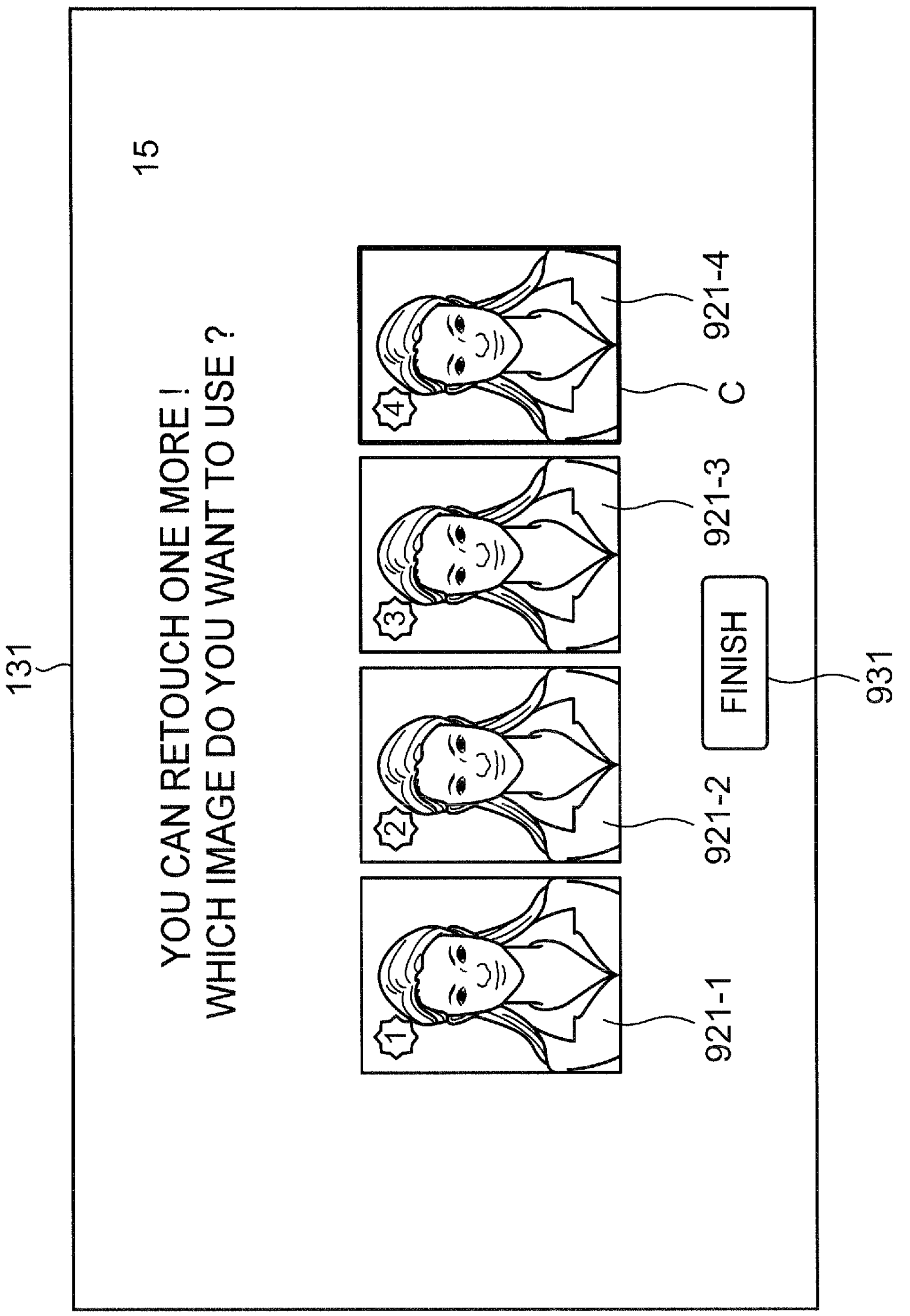
FIG. 63 is a drawing illustrating an example of the selection screen of the identification photograph image.

When the adjustment comes to an end for the first identification photograph image to be adjusted, as shown in FIG. 63, a selection screen is displayed for the second identification photograph image to be adjusted.

A message "YOU CAN RETOUCH ONE MORE! WHICH IMAGE DO YOU WANT TO USE?" is displayed in the upper portion of the selection screen of FIG. 63 and the four shot images 921-1 to 921-4 are displayed thereunder similarly to the selection screen of FIG. 61.

Figure 64:
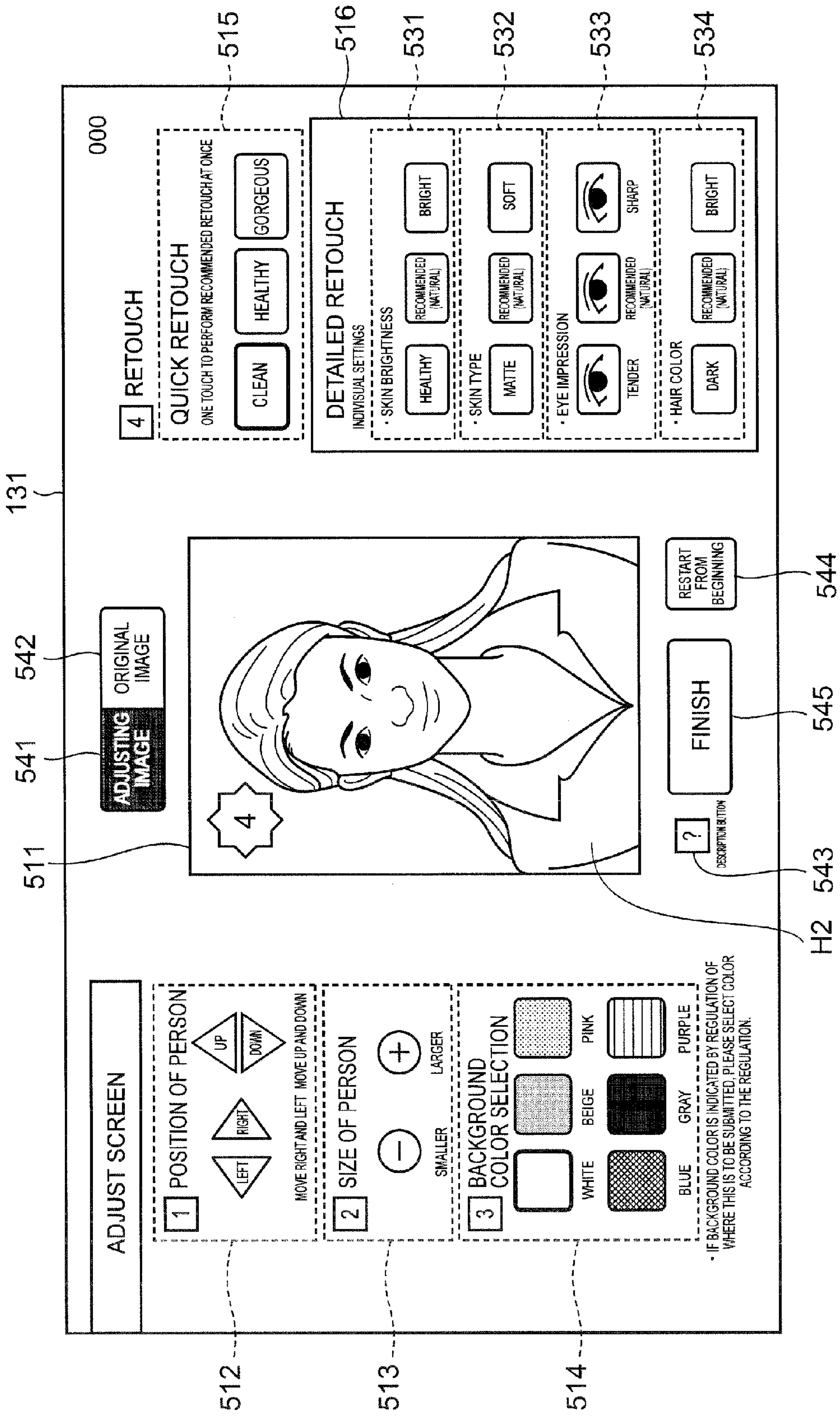
FIG. 64 is a drawing illustrating an example of the adjustment screen.

When the shot image 921-4 is selected that is the shot image acquired by the fourth shooting as indicated by surrounding the shot image by the cursor C, as shown in FIG. 64, the adjusted image display area 511 of the adjustment screen has the selected shot image displayed therein as the second identification photograph image to be adjusted.

The user adjusts the second identification photograph image to be adjusted for the position and the size of the person, the background, and the picture condition.

As above, adjustment of the plurality of identification photograph images can be enabled.

The predetermined number of each of the plurality of adjusted identification photograph images may be printed on a sticker sheet. Alternatively, a plurality of images each being identical to one type of the identification image selected from among the plurality of adjusted identification photograph images may be printed on a sticker sheet.

Variation 3

When the plurality of identification photograph images are adjusted, the plurality of identification photograph images to be adjusted may be able to be selected from one selection screen. In the example described with reference to FIGS. 61 to 64, the first identification photograph image to be adjusted and the second identification photograph image to be adjusted are selected from the different selection screens.

Figure 65:
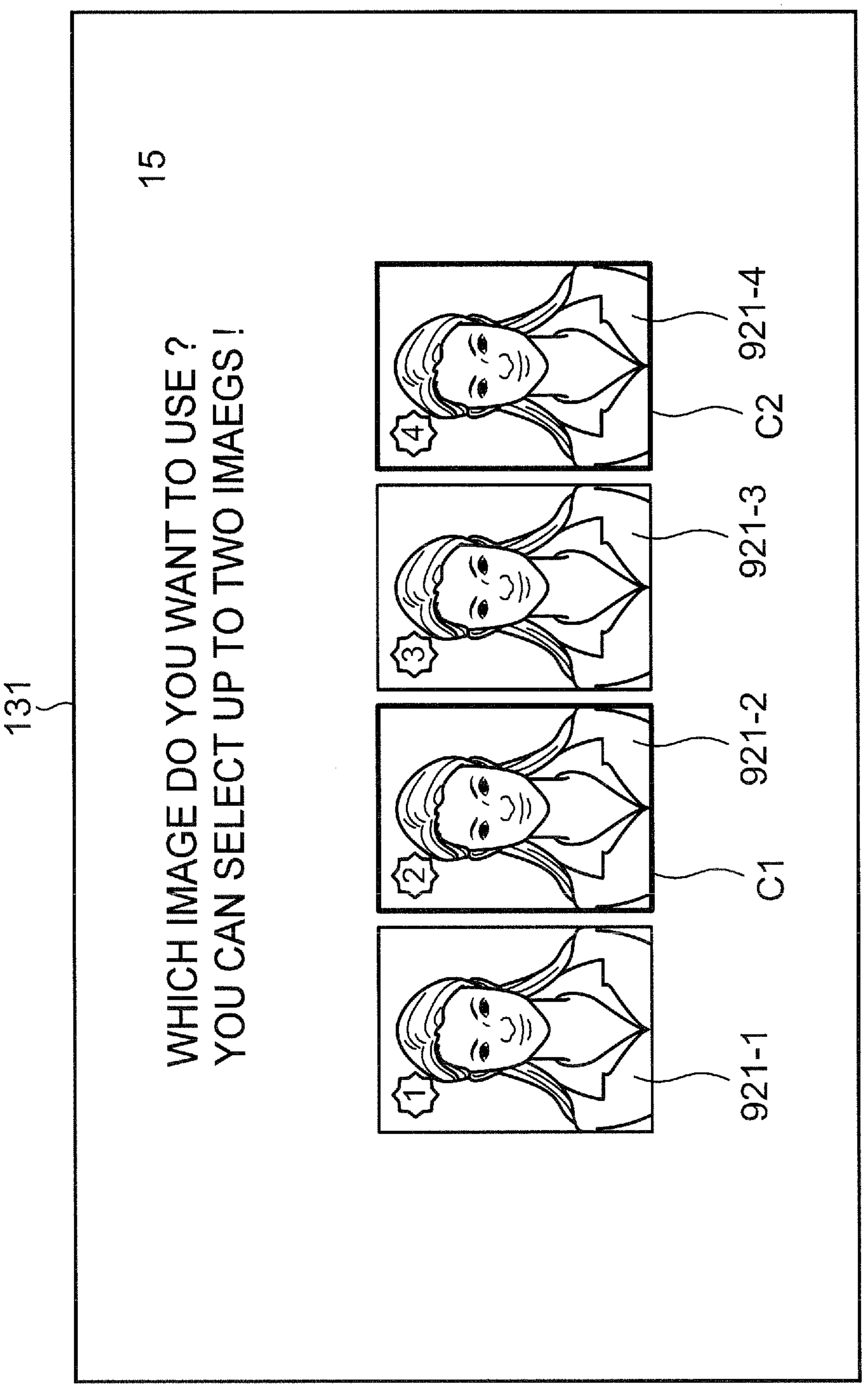
FIG. 65 is a drawing illustrating an example of the selection screen of the identification photograph image.

FIG. 65 is a drawing illustrating an example of the selection screen of the identification photograph images to be adjusted. No same description of the above description will appropriately be repeated.

A message "WHICH IMAGE DO YOU WANT TO USE? YOU CAN SELECT UP TO TWO IMAEGES!" is displayed in the upper portion of the selection screen of FIG. 65 and the four shot images 921-1 to 921-4 are displayed thereunder. In the example of FIG. 65, the shot image 921-2 acquired by the second shooting displayed surrounded by a cursor C1 is selected as the first identification photograph image to be adjusted and the shot image 921-4 acquired by the fourth shooting displayed surrounded by a cursor C2 is selected as the second identification photograph image to be adjusted.

Figure 66:
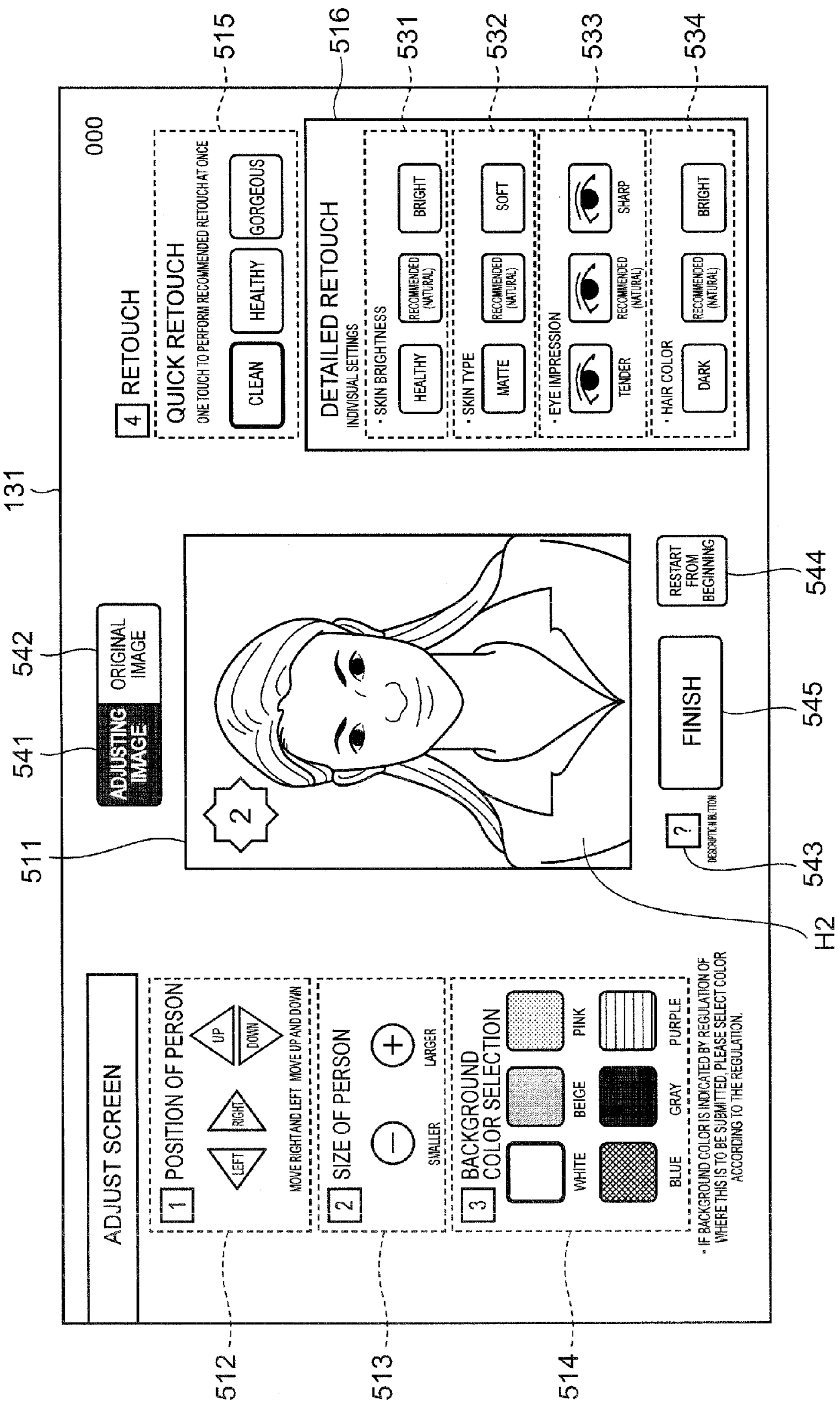
FIG. 66 is a drawing illustrating an example of the adjustment screen.

When the two shot images are selected as the identification photograph images to be adjusted, as shown in FIG. 66, the adjusted image display area 511 of the adjustment screen has the first image displayed therein for the identification photograph to be adjusted. The adjustment screen of FIG. 66 is the same screen as the adjustment screen described with reference to FIG. 62. The user adjusts the first identification photograph image to be adjusted for the position and the size of the person, the background, and the picture condition.

Figure 67:
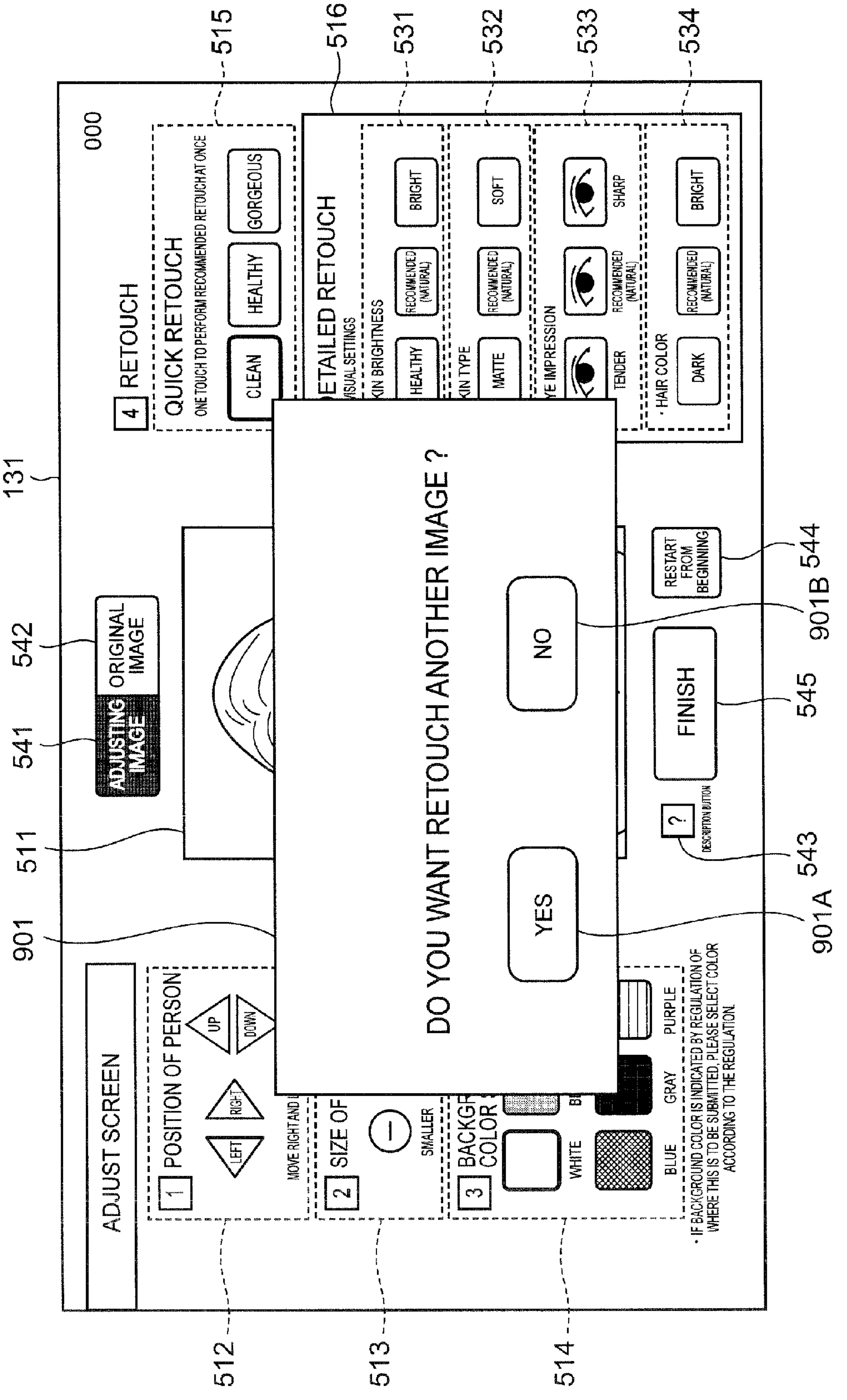
FIG. 67 is a drawing illustrating an example of the adjustment screen.

When the adjustment of the first identification photograph image to be adjusted comes to an end, as shown in FIG. 67, the window 901 is displayed superimposed on the adjusted image display area 511.

A message "DO YOU WANT TO RETOUCH ANOTHER IMAGE?" is displayed in the center of the window 901, and such buttons area displayed thereunder as the button 901A that is the YES button operated to adjust the second identification photograph image to be adjusted and the button 901B that is the NO button operated for not performing the adjustment.

Figure 68:
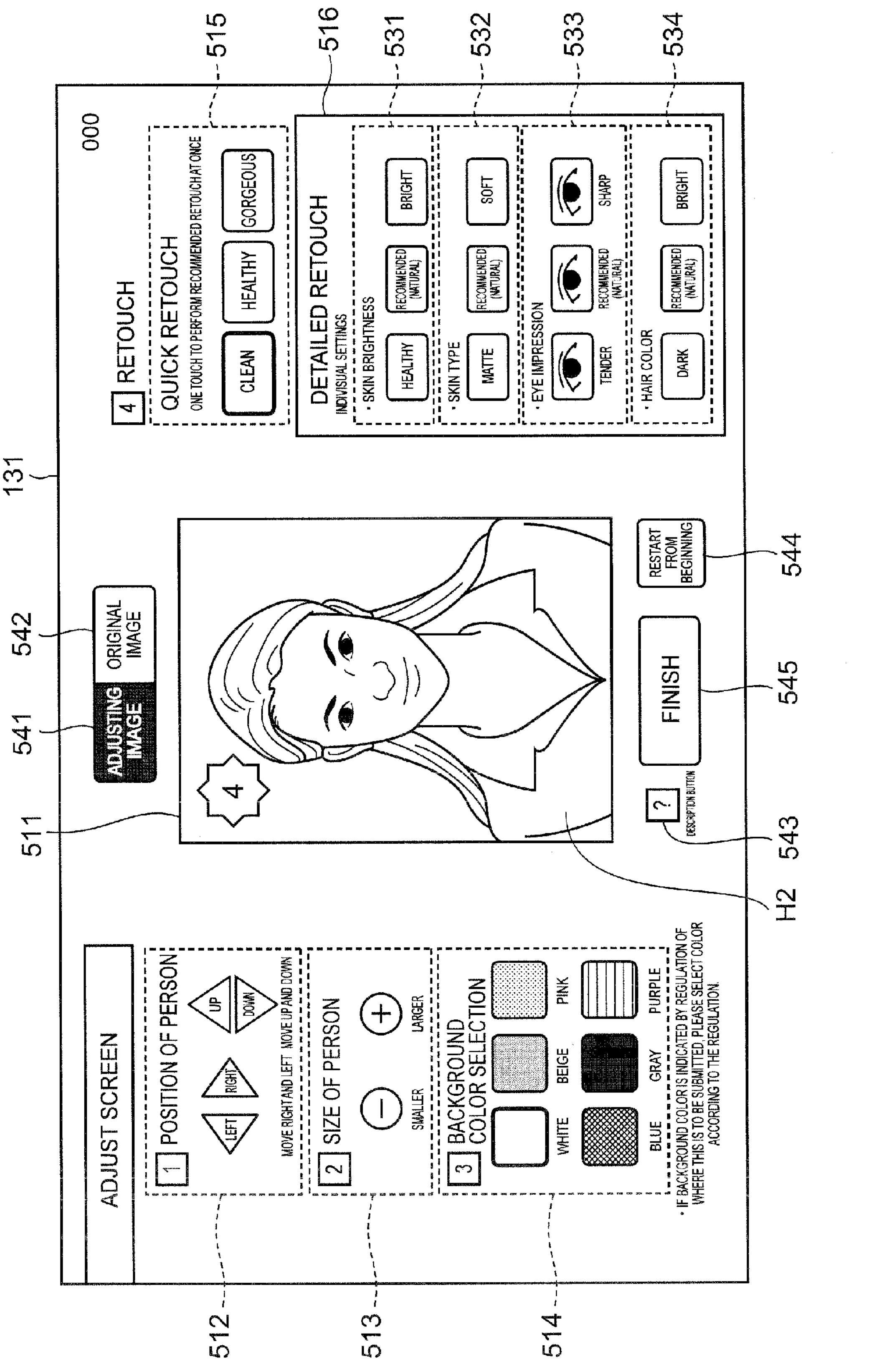
FIG. 68 is a drawing illustrating an example of the adjustment screen.

When the button 901A which is a YES button is operated, the window 901 is closed and, as shown in FIG. 68, the display in the adjustment screen is in the state where the second identification photograph image to be adjusted is displayed in the adjusted image display area 511. The adjustment screen of FIG. 68 is the same screen as the adjustment screen described with reference to FIG. 64. The user adjusts the second identification photograph image to be adjusted for the position and the size of the person, the background, and the picture condition.

On the other hand, when the button 901B to be the NO button is operated, the window 901 is closed and the display in the adjustment screen returns to the state of FIG. 66.

As above, plurality of identification photograph images may be able to be adjusted.

A predetermined number of images each being identical to each of the plurality of the identification photograph images may be printed on a sticker sheet. Alternatively, a plurality of images each being identical to one type of an identification photograph image selected from among the plurality of identification photograph images may be printed on a sticker sheet. In this case, two types of identification photograph images may be printed as three images of the one type in the upper row and three images of the other type in the lower row, respectively, as shown in FIG. 10. In addition, the identification photograph image selected from the plurality of identification photograph images may be printed.

Figure 69:
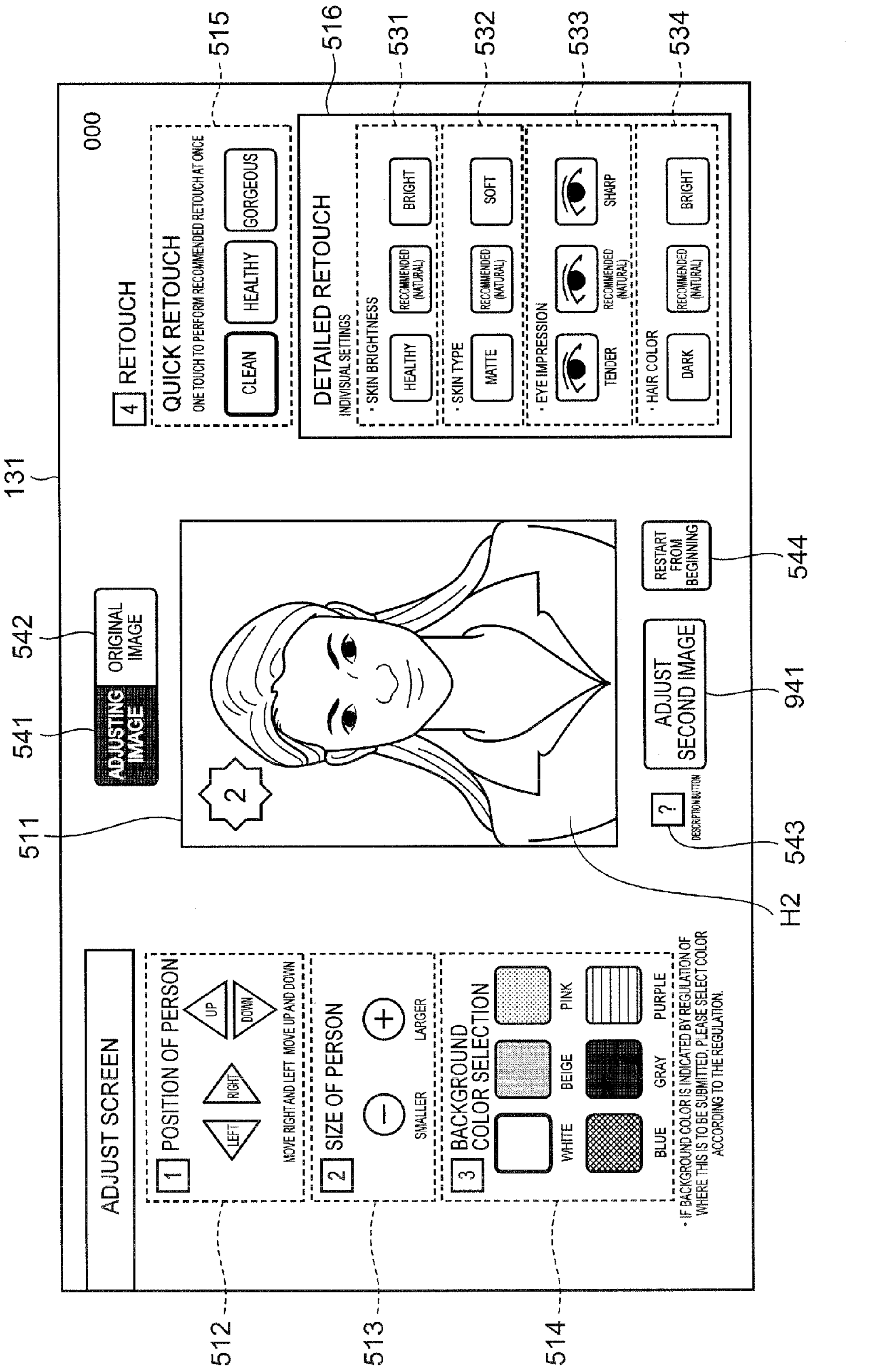
FIG. 69 is a drawing illustrating an example of the adjustment screen.

FIG. 69 is a drawing illustrating another example of the switching of the identification photograph images to be adjusted when two shot images are already selected as the identification photograph images to be adjusted using the screen as shown in FIG. 65.

The adjusted image display area 511 in the adjustment screen of FIG. 69 has first identification photograph image to be adjusted displayed therein. The user adjusts the second identification photograph image to be adjusted for the position and the size of the person, the background, and the picture condition.

A switching button 941 is displayed under the adjusted image display area 511 instead of the finish button 545. The switching button 941 is the button operated to switch the image to be adjusted to the second identification photograph image to be adjusted.

Figure 70:
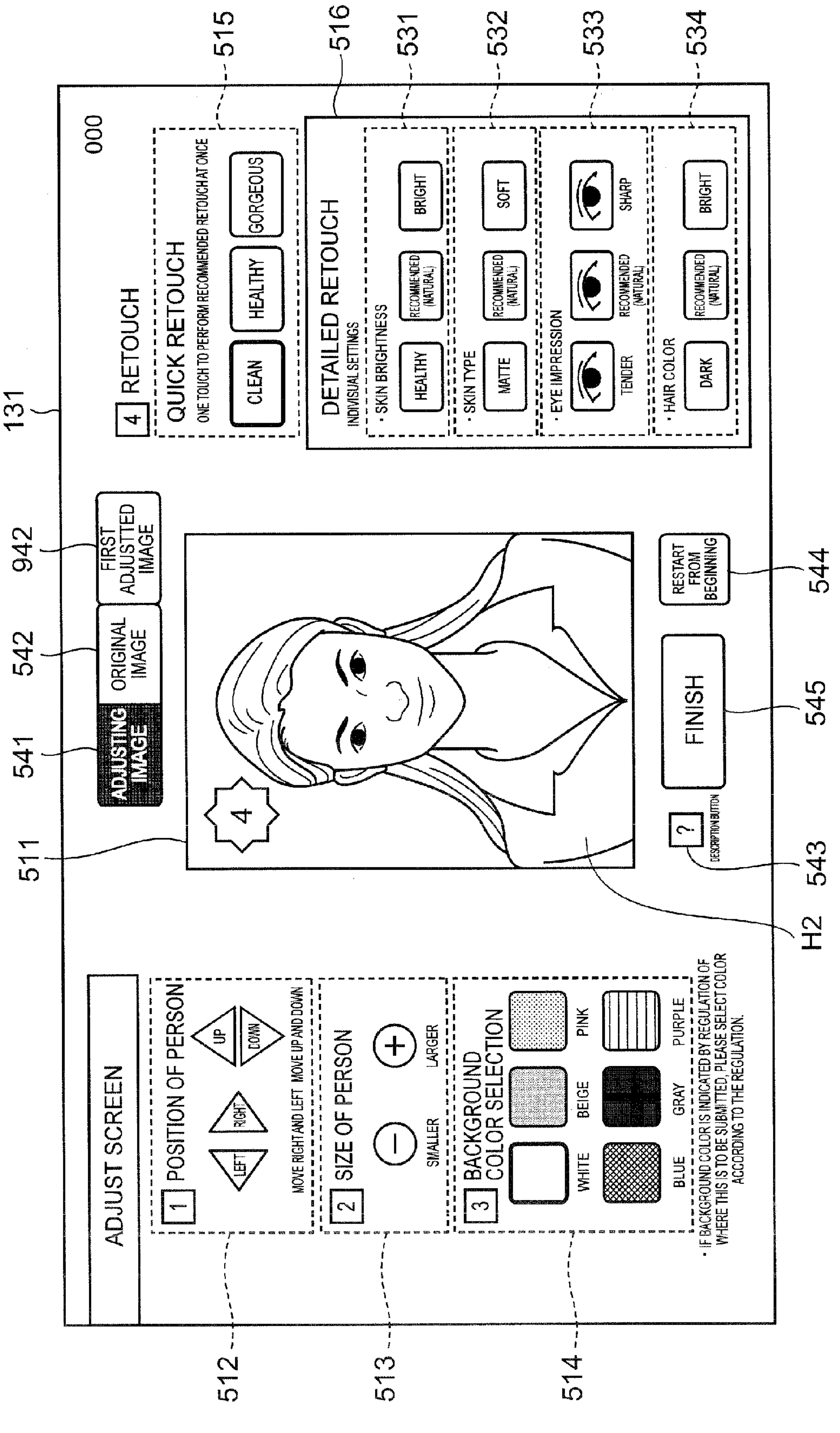
FIG. 70 is a drawing illustrating an example of the adjustment screen.

When the switching button 941 is operated, as shown in FIG. 70, the display in the adjustment screen is in the state where the second identification photograph image to be adjusted is displayed in the adjusted image display area 511. The user adjusts the second identification photograph image to be adjusted for the position and the size of the person, the background, and the picture condition.

In the adjustment screen of FIG. 70, the finish button 545 is displayed at the position at which the switching button 941 is displayed. The user can terminate the adjustment of the identification photograph image by operating the finish button 545.

A switching button 942 is displayed above the adjusted image display area 511 in addition to the during-adjustment button 541 and the before-adjustment button 542. The switching button 942 is the button operated to cause the first identification photograph image to be adjusted to be displayed in the adjusted image display area 511.

Variation 4

All the shot images acquired by the shootings may be used as the identification photograph images and all the identification photograph images may be adjusted.

Figure 71:
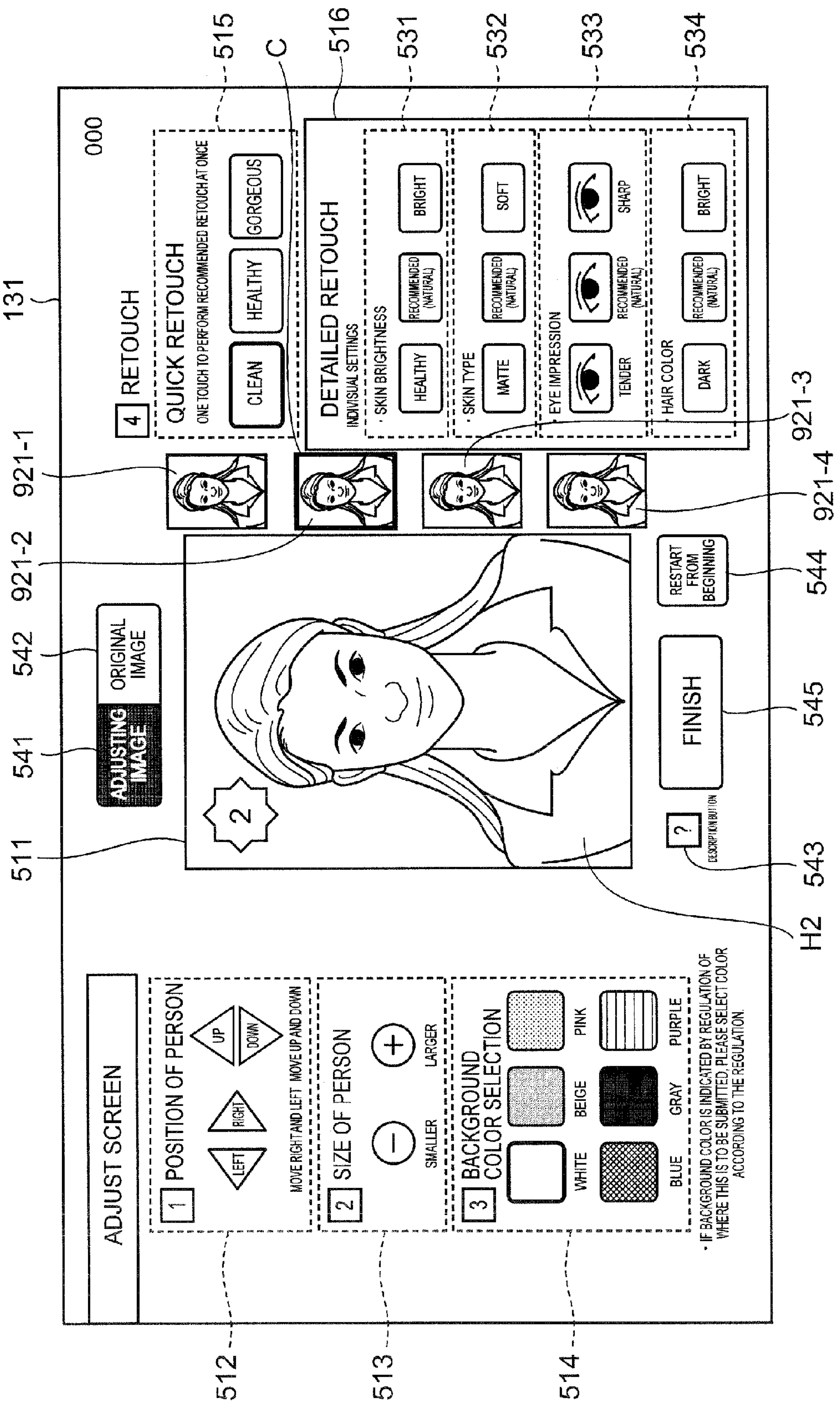
FIG. 71 is a drawing illustrating an example of the adjustment screen.

FIG. 71 is a drawing illustrating an example of the adjustment screen.

In the example of FIG. 71, the four shot images 921-1 to 921-4 are displayed side by side on the right of the adjusted image display area 511. The user can select the shot images to be adjusted from the shot images 921-1 to 921-4. For example, when the shot image 921-2 is selected that is the shot image acquired by the second shooting as indicated by surrounding the shot image by the cursor C, the adjusted image display area 511 in the adjustment screen has the selected shot image displayed therein as the identification photograph image to be adjusted.

The user can adjust the identification photograph images one by one by sequentially switching the identification photograph images to be adjusted. For example, a predetermined number of identification photograph images are selected from all of the identification photograph images after the adjustment, and the selected identification photograph images are printed on the sticker sheet.

As described above, all the shot images can be enabled to be adjusted as the identification photograph images.

The embodiment of the present invention is not limited to the above embodiment, and various changes can be made thereto within the scope not departing from the purview of the present invention. The present invention has been described using the above specific embodiment while other many variations, deformations, other uses of the specific embodiment are apparent for those skilled in the art. The present invention therefore is not limited to the specific disclosure herein and can be limited only by appended claims.

This application relates to Japanese Patent Application Nos. 2013-262920, 2013-262921, 2013-262922, and 2013-262923 filed on Dec. 19, 2013, and the contents of which are incorporated herein by reference.

What is claimed is:

1. An image processing apparatus having a photographing space where a shooting is performed and an image processing space where image processing of a shot image acquired by the shooting in the photographing space is performed, the image processing apparatus comprising:

a first display unit disposed in the photographing space, the first display unit displaying a course selection screen used for selecting either one of a first course for creating one type of identification photograph image and a second course for creating multiple types of edited images;

a shooting unit that performs a plurality of shootings of a user as an object to be shot to acquire a plurality of shot images;

a second display unit disposed in the image processing space, the second display unit displaying an adjustment screen used for adjusting the identification photograph image which is any one of the shot images to a user who has selected the first course and finished the shootings, and displaying an editing screen used for editing the plurality of shot images without displaying the adjustment screen to a user who has selected the second course and finished the shootings;

wherein the adjustment screen includes graphical elements for changing a size of the object in the identification photograph image;

wherein the editing screen enables at least one content change of a shot image that is not available to a user who has selected the first course and finished the shootings;

an adjusting unit that adjusts the identification photograph image according to an operation to the adjustment screen by the user; and an editing unit that edits the shot images to create the edited images according to an operation to the editing screen by the user.

2. The image processing apparatus according to claim 1, wherein when the user who has selected the first course finishes the shootings in the photographing space, the second display unit displays a first image selection screen used for selecting one shot image as the identification photograph image from the plurality of shot images acquired by the shootings, and after the one shot image is selected as the identification photograph image, the second display unit displays the adjustment screen.

3. The image processing apparatus according to claim 2, wherein the adjusting unit changes, according to an operation to the adjustment screen, a color of an area of a background of the identification photograph image to a color designated by the operation.

4. The image processing apparatus according to claim 2, wherein the adjusting unit adjusts at least one of a position and a size of the object shown in the identification photograph image according to an operation to the adjustment screen by the user, and the second display unit displays the identification photograph image in which the at least one of the position and the size of the object is adjusted.

5. The image processing apparatus according to claim 2, wherein the second display unit displays a guiding image for indicating an operation procedure in the adjustment screen.

6. The image processing apparatus according to claim 2, wherein the adjusting unit adjusts at least one of multiple types of picture conditions of the object, including brightness of a skin of the object, a skin type of the object, impression of eyes of the object, and a color of the hair of the object, according to an operation to the adjustment screen by the user.

7. The image processing apparatus according to claim 1, wherein when the user who has selected the second course finishes the shootings, the first display unit displays a second image selection screen used for selecting a shot image to be edited from the plurality of shot images acquired by the shootings.

8. The image processing apparatus according to claim 1, further comprising:

a printing unit that prints on a print medium at least one of the identification photograph image and the edited image.

9. The image processing apparatus according to claim 1, further comprising:

a communication device that outputs to an external apparatus at least one of image data of the identification photograph image and image data of the edited image.

10. The image processing apparatus according to claim 1, wherein the adjusting the identification photograph image is a process that includes at least one of adjustment of a position and adjustment of a size of the object in the identification photograph image.

11. The image processing apparatus according to claim 1, wherein the editing the shot image is a process that includes a process of combining a composite-use image selected by the user from a plurality of composite-use images prepared in advance, with the shot image at a position designated by the user following the selection of the composite-use image.

12. The image processing apparatus according to claim 1, wherein the adjusting unit adjusts at least one of a position of the object, a size of the object, and a color of a background of the object shown in the identification photograph image according to an operation to the adjustment screen by the user, and adjusts a combination of two or more types of multiple types of picture condition of the object including brightness of a skin of the object, a skin type of the object, and a color of the hair of the object according to one operation to the adjustment screen by the user.

13. The image processing apparatus according to claim 12, wherein the second display unit selects and displays on the adjustment screen one of the shot image after the adjustment of the picture condition and the shot image before the adjustment of the picture condition, according to an operation to the adjustment screen.

14. The image processing apparatus according to claim 1, further comprising:

a control device that controls the processing in the image processing space and the shooting in the photographing space, so as to perform, in parallel, the editing of the shot image in the image processing space by the user who has selected the second course and the shooting in the photographing space by the user who has selected the first course, and so as to perform, in parallel, the adjustment of the identification photograph image in the image processing space by the user who has selected the first course and the shooting in the photographing space by the user who has selected the second course.

15. The image processing apparatus according to claim 1, wherein the identification photograph image is an image showing the one user, and the edited image is an image showing a plurality of users.

16. The image processing apparatus according to claim 1, wherein the first course is a course for creating one type of identification photograph image for a single user;

wherein the second course is a course for creating multiple types of edited images for multiple users;

wherein the adjustment screen includes one identification photograph image to be adjusted and a button to be operated for selecting items for adjustment;

wherein the editing screen includes right and left regions, each of the right and left regions including the shot image to be edited and a button to be operated for selecting items for editing; and wherein the editing unit edits the shot images displayed, as an image to be edited, on the respective right and left regions of the editing screen according to operations to the buttons included in the right and left regions by the user, to create the edited images.

17. An image processing apparatus having a photographing space where a shooting is performed and an image processing space where image processing of a shot image acquired by the shooting in the photographing space is performed, the image processing apparatus comprising:

a first display unit disposed in the photographing space, the first display unit displaying a course selection screen used for selecting either one of a first course for creating one type of identification photograph image and a second course for creating multiple types of edited images;

a shooting unit that performs a plurality of shootings of a user as an object to be shot to acquire a plurality of shot images;

a second display unit disposed in the image processing space, the second display unit displaying an adjustment screen used for adjusting the identification photograph image which is any one of the shot images to a user who has selected the first course and finished the shootings, and displaying an editing screen used for editing the plurality of shot images without displaying the adjustment screen to a user who has selected the second course and finished the shootings;

an adjusting unit that adjusts the identification photograph image according to an operation to the adjustment screen by the user; and an editing unit that edits the shot images to create the edited images according to an operation to the editing screen by the user;

wherein, when the first course is selected, the first display unit displays a first guiding image indicating a position of a portion of a body, superimposing the first guiding image on a moving image captured by the shooting unit;

wherein the shooting unit shoots a still image at a predetermined timing after the first guiding image is displayed, to acquire the still image as the shot image; and wherein the second display unit displays a second guiding image indicating a position of the portion of the body, superimposing the second guiding image on the identification photograph image in the adjustment screen of the identification photograph image.

18. The image processing apparatus according to claim 17, wherein the second guiding image is an image indicating at least one of positions in a vertical direction and in a horizontal direction of the portion of the body.

* * * * *